(12) United States Patent
Miyata

(10) Patent No.: US 8,031,196 B2
(45) Date of Patent: Oct. 4, 2011

(54) DISPLAY, ELECTRONIC DEVICE, DATA TRANSMITTING METHOD, INFORMATION TERMINAL, HOST APPARATUS, PROGRAM, RECORDING MEDIUM

(75) Inventor: Kazuhiko Miyata, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 326 days.

(21) Appl. No.: 10/504,775

(22) PCT Filed: Jan. 28, 2003

(86) PCT No.: PCT/JP03/00809
§ 371 (c)(1),
(2), (4) Date: Aug. 17, 2004

(87) PCT Pub. No.: WO03/071785
PCT Pub. Date: Aug. 28, 2003

(65) Prior Publication Data
US 2005/0162422 A1 Jul. 28, 2005

(30) Foreign Application Priority Data

Feb. 19, 2002 (JP) ................................. 2002-042064
Feb. 19, 2002 (JP) ................................. 2002-042328

(51) Int. Cl.
*G06T 11/40* (2006.01)

(52) U.S. Cl. ........ 345/467; 715/725; 345/205; 382/165; 382/159; 382/170; 382/181

(58) Field of Classification Search .................. 345/467, 345/725, 205; 715/725; 382/165, 159, 170, 382/181; 348/14.03
See application file for complete search history.

(56) References Cited

U.S. PATENT DOCUMENTS

| | | | | |
|---|---|---|---|---|
| 5,043,723 A | * | 8/1991 | Araki et al. | 340/825.69 |
| 5,045,948 A | * | 9/1991 | Streck et al. | 348/734 |
| 5,455,570 A | * | 10/1995 | Cook et al. | 340/825.22 |
| 5,883,680 A | * | 3/1999 | Nykerk | 348/734 |
| 6,011,546 A | * | 1/2000 | Bertram | 715/700 |
| 6,141,688 A | * | 10/2000 | Bi et al. | 709/227 |
| 6,323,864 B1 | | 11/2001 | Kaul | |
| 6,335,722 B1 | * | 1/2002 | Tani et al. | 345/173 |
| 6,404,861 B1 | * | 6/2002 | Cohen et al. | 379/93.01 |
| 6,407,779 B1 | * | 6/2002 | Herz | 348/734 |
| 6,415,222 B1 | * | 7/2002 | Sato et al. | 701/208 |
| 6,466,233 B1 | | 10/2002 | Mitani | |
| 6,469,719 B1 | * | 10/2002 | Kino et al. | 715/810 |
| 6,483,510 B1 | * | 11/2002 | Jeong | 345/467 |
| 6,490,490 B1 | * | 12/2002 | Uchikubo et al. | 700/65 |
| 6,529,802 B1 | * | 3/2003 | Kawakita et al. | 700/245 |
| 6,630,800 B2 | * | 10/2003 | Weng | 315/291 |

(Continued)

FOREIGN PATENT DOCUMENTS

CN 1256457 A 6/2000

(Continued)

*Primary Examiner* — Javid Amini
(74) *Attorney, Agent, or Firm* — Harness, Dickey & Pierce, P.L.C.

(57) ABSTRACT

A display device comprises a display section, a pattern specifying code input section which receives a pattern specifying code externally, a pattern storage section which stores therein an image of a predetermined pattern, and a pattern display processing section which reads out the image of a pattern specified by the pattern specifying code from the pattern storage section and displays the image on the display section. With this arrangement, the load on a host to display an image can be reduced.

48 Claims, 36 Drawing Sheets

U.S. PATENT DOCUMENTS

| | | | |
|---|---|---|---|
| 6,772,394 B1* | 8/2004 | Kamada | 715/513 |
| RE38,600 E* | 9/2004 | Mankovitz | 348/473 |
| 6,882,712 B1* | 4/2005 | Iggulden et al. | 379/102.03 |
| 7,202,799 B2* | 4/2007 | Hsu et al. | 340/825.72 |
| 7,224,370 B1* | 5/2007 | Ye | 345/581 |
| 2001/0005830 A1* | 6/2001 | Kuroyanagi | 705/2 |
| 2001/0011953 A1* | 8/2001 | Shintani et al. | 340/825.22 |
| 2001/0017615 A1* | 8/2001 | Lin et al. | 345/173 |
| 2002/0075249 A1* | 6/2002 | Kubota et al. | 345/204 |
| 2002/0085128 A1* | 7/2002 | Stefanik | 348/734 |
| 2002/0092023 A1* | 7/2002 | Kaizu et al. | 725/58 |
| 2002/0185136 A1* | 12/2002 | Faries et al. | 128/849 |
| 2003/0003892 A1* | 1/2003 | Makinen | 455/345 |
| 2003/0046689 A1* | 3/2003 | Gaos | 725/34 |
| 2003/0093187 A1* | 5/2003 | Walker | 701/1 |
| 2003/0099456 A1 | 5/2003 | Ohmura et al. | |
| 2003/0120555 A1* | 6/2003 | Kitagawa | 705/26 |
| 2003/0141295 A1* | 7/2003 | Ishikawa et al. | 219/697 |
| 2004/0049317 A1* | 3/2004 | Matsuoka et al. | 700/245 |
| 2004/0125074 A1* | 7/2004 | Lin | 345/156 |
| 2004/0181366 A1* | 9/2004 | Urokohara | 702/182 |
| 2005/0162422 A1* | 7/2005 | Miyata | 345/440 |
| 2007/0067734 A1* | 3/2007 | Cunningham et al. | 715/779 |
| 2008/0148314 A1* | 6/2008 | Shintani et al. | 725/39 |

FOREIGN PATENT DOCUMENTS

| | | | |
|---|---|---|---|
| JP | 06-203113 | | 7/1994 |
| JP | 06-290091 | | 10/1994 |
| JP | 07-029010 | | 1/1995 |
| JP | 10-207671 | | 8/1998 |
| JP | 11-041363 | | 2/1999 |
| JP | 11-095740 | | 4/1999 |
| JP | 2000-207261 | | 7/2000 |
| JP | 2000-217171 | * | 8/2000 |
| JP | 2001-5584 | | 1/2001 |
| JP | 2001-005584 | * | 1/2001 |
| JP | 2001-51654 | | 2/2001 |
| JP | 2001-134414 | * | 5/2001 |
| JP | 2001-134414 (A) | | 5/2001 |
| JP | 2001134414 A | * | 5/2001 |
| JP | 2001-197412 | | 7/2001 |
| JP | 2002-16984 | | 1/2002 |

* cited by examiner

REQUEST FROM HOST

DISPLAY DEVICE

REQUEST FROM HOST

DISPLAY DEVICE

REQUEST FROM HOST

DIRECTION OF MOVEMENT

DISPLAY DEVICE

AFTER FINAL ADJUSTMENT

DISPLAY, ELECTRONIC DEVICE, DATA TRANSMITTING METHOD, INFORMATION TERMINAL, HOST APPARATUS, PROGRAM, RECORDING MEDIUM

TECHNICAL FIELD

The present invention relates to display devices.

BACKGROUND ART

There has been provided a display device which can be used as a remote controller for remotely controlling a plurality of electronic devices that can be hosts. In such a display device, a display screen is a touch panel, and the user can power on/off a host by touching the part showing "power", for example.

However, in the conventional display device, the host must supply, to the display device, image data itself of a pattern, such as "power" described above, essential to remote control for various types of devices, resulting in a heavy load on the host. In addition, since the image data itself is received and then displayed, for example, the "power" shared by the plurality of devices is placed at a different position depending upon the host, which is less convenient for the user.

DISCLOSURE OF INVENTION

The present invention has been achieved to solve the above problem, and an object of the present invention is to provide a display device which can reduce loads on a host for image display. Further, another object of the present invention is to provide a display device which increases its user friendliness.

In order to solve the above problem, a display device of the present invention includes: a display section; a pattern storage section which stores therein images of predetermined patterns; a pattern specifying code input section which externally receives a pattern specifying code; and a pattern display processing section which retrieves the image of the pattern specified by the pattern specifying code from the pattern storage section and then causes the display section to display the image thereon.

With this arrangement, for realization of displaying an image of a predetermined pattern on the display device, it is essential only that the pattern specifying code be supplied to the display device. This eliminates the need for providing image data of the pattern itself to the display device, thus significantly reducing the loads on an external host. In addition, it is possible for the host to freely set the position at which the pattern is to be displayed, so that the display device becomes easy to use.

Further, a data transmitting method of the present invention is a method including: in a display device (information terminal) including a storage device, an emulation process of causing a host (host apparatus) to recognize the storage device as an external file system, the storage device storing therein a substitution code which is a program read out as a code of a subroutine called in a program of the host and returns to the program of the host in a normal end state after execution of the subroutine; in the host, a program execution process of executing a program; a substitution code acquisition process of, during execution of the program, reading out a code of a subroutine from the storage device in a subroutine code read request process; and in the display device, a subroutine identification process of identifying a subroutine called by the program of the host in accordance with a subroutine code read instruction from the host.

According to the foregoing method, ① the display device causes the host to recognize the storage device of the display device as a file system. ② The host makes a read request to read out the code of the subroutine from the storage device of the display device. ③ The display device identifies a pattern specification in accordance with the subroutine read request from the host.

Thus, only by loading the code of the subroutine, the host can notify information that specifies a subroutine called by the host to the display device, without additional data transmission for notifying this information. For example, only by performing exactly the same reading operation as the operation of loading the code of the subroutine from a file system, which is provided in a conventional system, the host can notify information that specifies the subroutine called by the host to the display device. Then, the display device can perform various operations using this information.

Further, to emulate the storage device of the display device as a file system of the host, the host should be capable of communicating with the file system. That is, this eliminates the need for additional interface for data communications. This enables data transmission between devices realized by low-functionality hardware and software. Note that, even a low-functionality device usually has a function of reading out data from a file system of some kind to store program information and others. Of course, the foregoing data transmitting method can be applied to data transmission between a high-functionality device and a low-functionality device or data transmission between high-functionality devices.

Therefore, data transmission between devices becomes possible without development of a device driver for each device performing data transmission. This facilitates compatibility of hardware and software of the host. This software includes a software development tool, such as compiler. Further, operations can be distributed between devices by adding the above data transmission midway, so that it is possible to provide a higher-functionality system even with low-functionality hardware and software.

Note that, in the host, the substitution code, for example, only performs the operation of only transmitting coordinate data necessary for drawing to the display device. On the other hand, the operation originally planned by a subroutine is, for example, a button drawing processing itself of reading out a button drawing pattern of GUI from a memory by one dot in accordance with the description of this subroutine, directly transmitting one dot at a time to a display device, performing a proper pattern display, and fully completing the called drawing processing.

For a fuller understanding of the nature and advantages of the invention, reference should be made to the ensuing detailed description taken in conjunction with the accompanying drawings.

BEST MODE FOR CARRYING OUT THE INVENTION

First Embodiment

One embodiment of the present invention is described below with reference to FIGS. 1 through 17.

Figure 1:
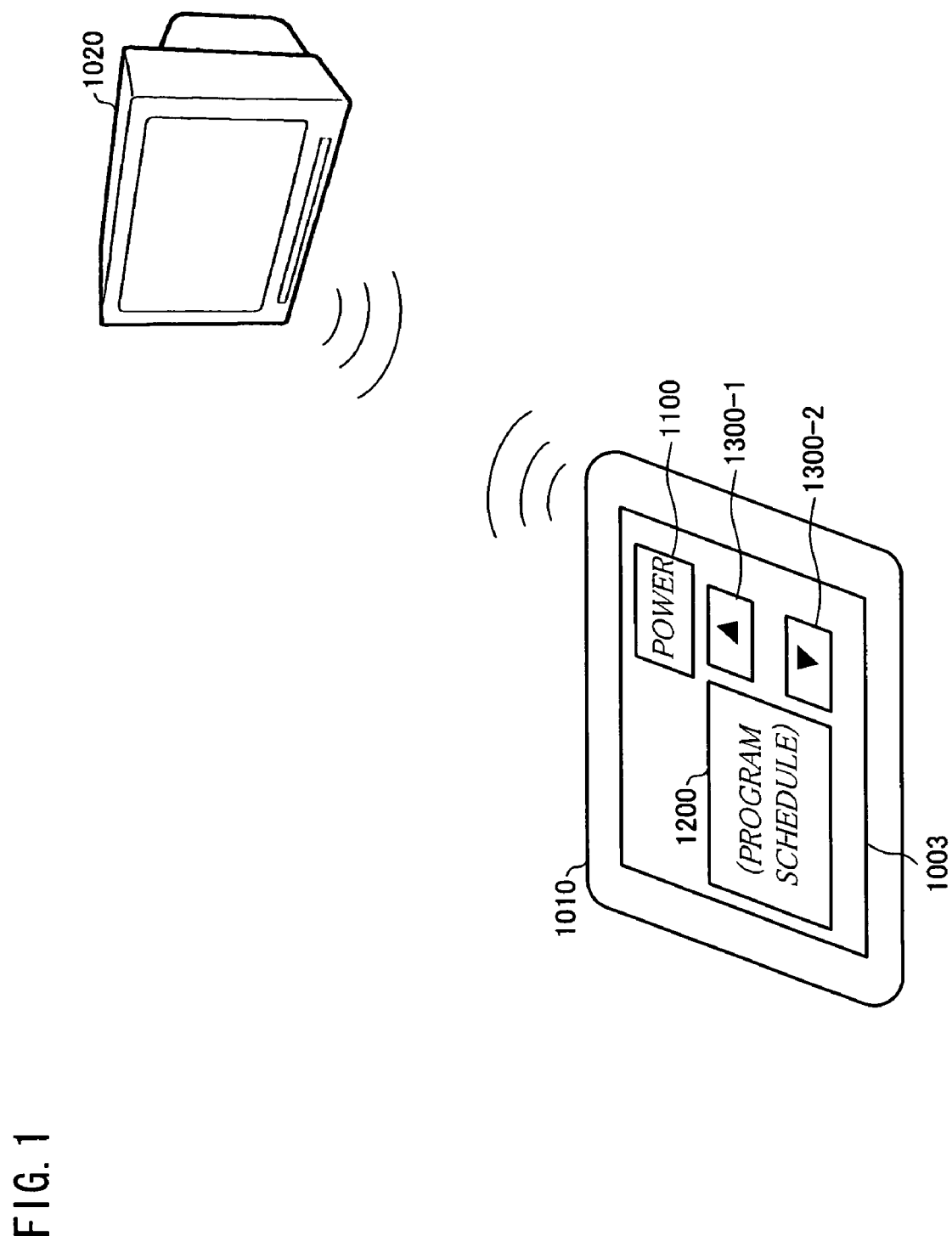
FIG. 1 is a schematic diagram of a display device of one embodiment of the present invention.
Figure 2:
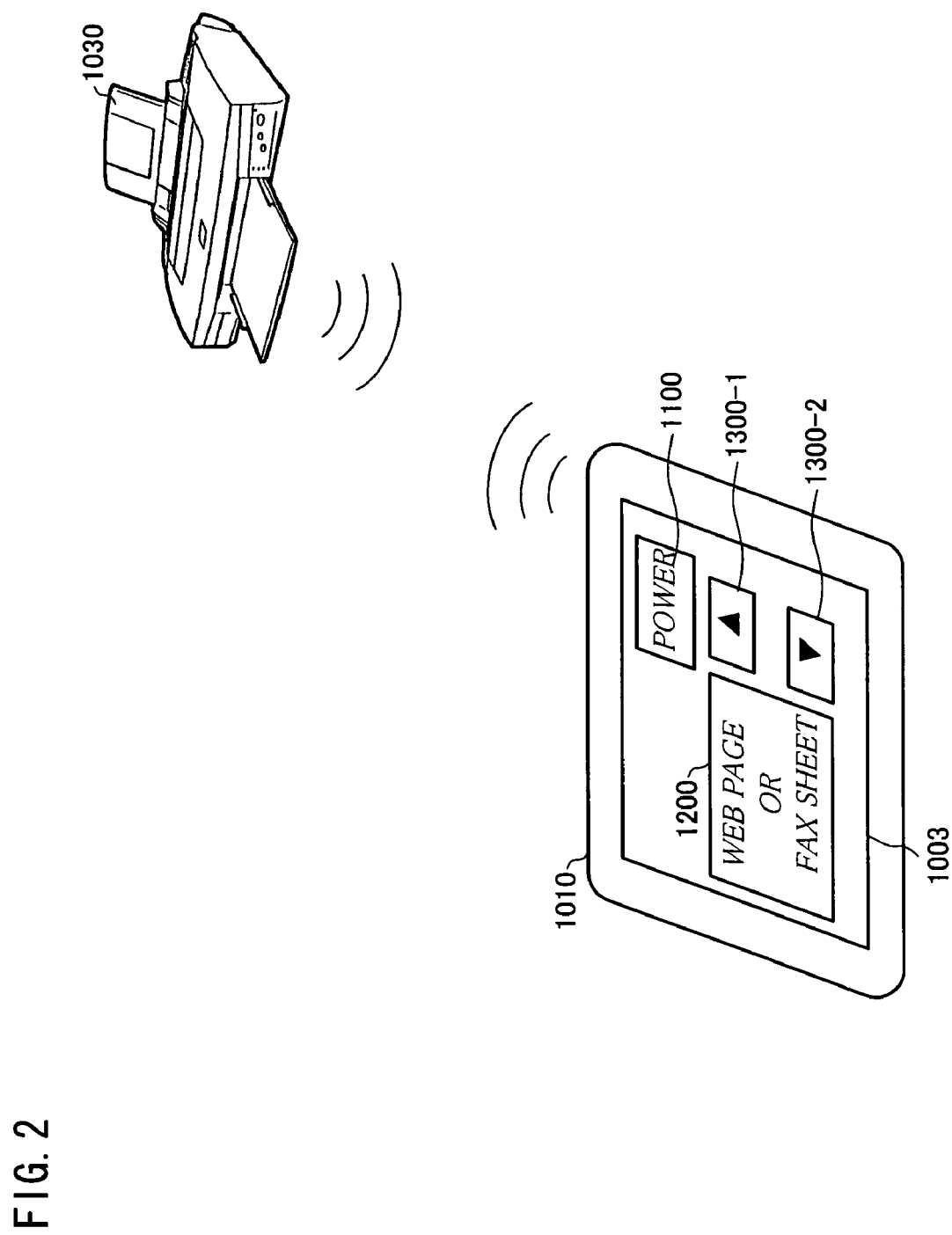
FIG. 2 is a schematic diagram of a display device of one embodiment of the present invention.

As illustrated in schematic diagrams of FIGS. 1 and 2, a display device 1010 can be used as a remote controller for remotely controlling various electronic devices, which are hosts, such as television receiver 1020 and facsimile transmission and reception apparatus 1030 capable of Internet access.

Further, the display device 1010 displays a power button 1100, a window 1200, a scroll buttons 1300-1 and 1300-2, and others on a display section 1003 in accordance with a code provided by the host. Note that, a screen of the display section 1003 has a touch panel operating, for example, in such a manner that a user's touch on a part of the screen where the power button 1100 is displayed transmits a signal for instructing to turn the power on/off from the display section 1003 to the host, and the host which receives this signal turns the power on/off.

Figure 3:
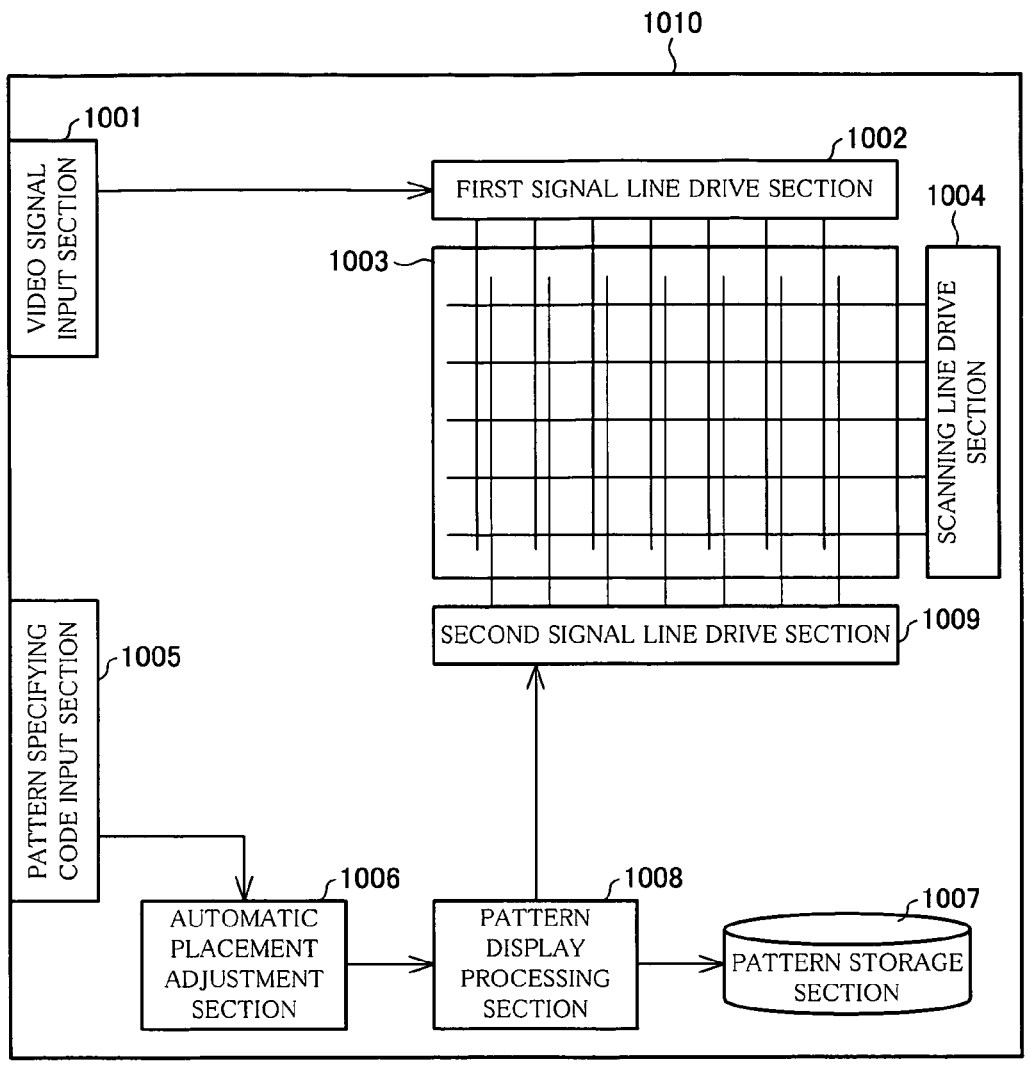
FIG. 3 is a block diagram of a display device of one embodiment of the present invention.

FIG. 3 is a block diagram schematically illustrating a configuration of the display device 1010. A video signal input section 1001 receives video signals from the host. A first signal line drive section 1002 drives signal lines of the display section 1003 in accordance with video signals received from the video signal input section 1001. A scanning line drive section 1004 drives scanning lines of the display section 1003.

A pattern specifying code input section 1005 receives a pattern specifying code outputted from the host. Here, the pattern specifying code received by the pattern specifying code input section 1005 specifies at least a pattern to be displayed. An automatic placement adjustment section 1006, when the pattern specifying code only specifies a pattern to be displayed, sets its display size and display position, and, when the pattern specifying code specifies display size and display position of the pattern to be displayed, adjusts the display size and display position as necessary. Further, the automatic placement adjustment section 1006 specifies the pattern to be displayed and its display size and display position to a pattern display processing section 1008.

A pattern storage section 1007 stores therein image data including a pattern with which the state of a device as the host is notified, and a pattern through which the user performs entry for the operation that he/she wants, such as power button, scroll buttons, window, and icons. Note that, the patterns that are stored in the pattern storage section 1007 may include character fonts.

The pattern display processing section 1008 generates image signals using image data stored in the pattern storage section 1007, so that an image of pattern or size specified by the automatic placement adjustment section 1006 is displayed at a specified position. A second signal line drive section 1009 drives signal lines of the display section 1003 in accordance with image signals generated by the pattern display processing section 1008.

Therefore, the host only needs to provide the pattern specifying code, not image data itself, to the display device 1010 so as to cause the display device 1010 to display an image of the predetermined pattern, so that the burdens on the host are reduced significantly.

The following will describe operations of the automatic placement adjustment section 1006. For example, as illustrated in FIG. 4, if the pattern specifying code from the host specifies to display the power button 1100 and the window 1200 for displaying a program schedule therein, and the power button 1100 is an object of automatic placement adjustment to be placed at a target position 1500 illustrated in FIG. 5, the power button 1100 is placed of a predetermined size at the target position 1500, and the window 1200 is placed of a size that can fit into the remaining space.

Figure 4:
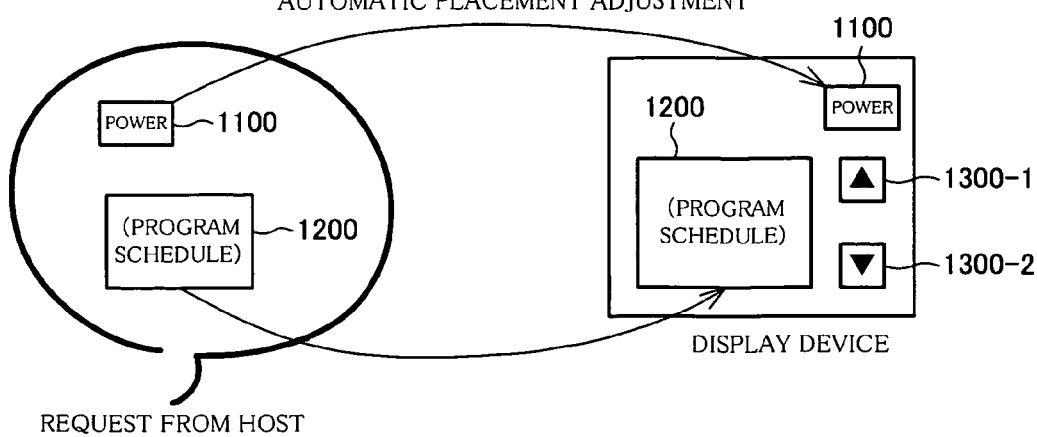
FIG. 4 is an explanatory diagram illustrating one example of placement adjustment performed by an automatic placement adjustment section.

Note that, as illustrated in FIG. 4, when the program schedule to be displayed in the window 1200 is greater in size than the window 1200 in the up and down directions, the automatic placement adjustment section 1006 automatically adds the scroll buttons 1300-1 and 1300-2 of respectively proper sizes at respectively proper positions so that the program schedule displayed in the window 1200 is scrolled up or down.

Figure 5:
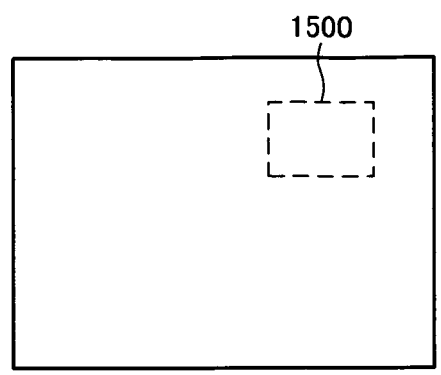
FIG. 5 is an explanatory diagram illustrating a target position at which a power button is displayed.
Figure 6:
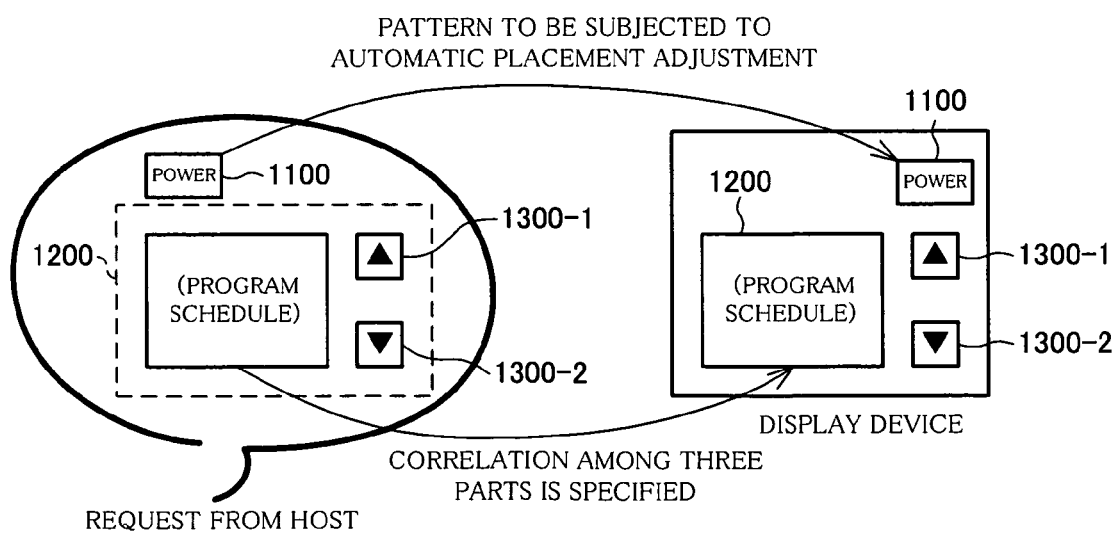
FIG. 6 is an explanatory diagram illustrating another example of placement adjustment performed by an automatic placement adjustment section.

Further, for example, as illustrated in FIG. 6, when the pattern specifying code from the host specifies to display the power button 1100, the window 1200 to display the program schedule therein, and the scroll buttons 1300-1 and 1300-2 to scroll the program schedule displayed in the window 1200, the relationship of location between the window 1200 and the scroll buttons 1300-1 and 1300-2 is specified, and the power button 1100 is an object of automatic placement adjustment to be placed at the target position 1500 illustrated in FIG. 5, the power button 1100 is placed of a predetermined size at the target position 1500, and the window 1200 and the scroll buttons 1300-1 and 1300-2 are placed of respective sizes that can fit into the remaining space and with the specified relationship of location.

Figure 7:
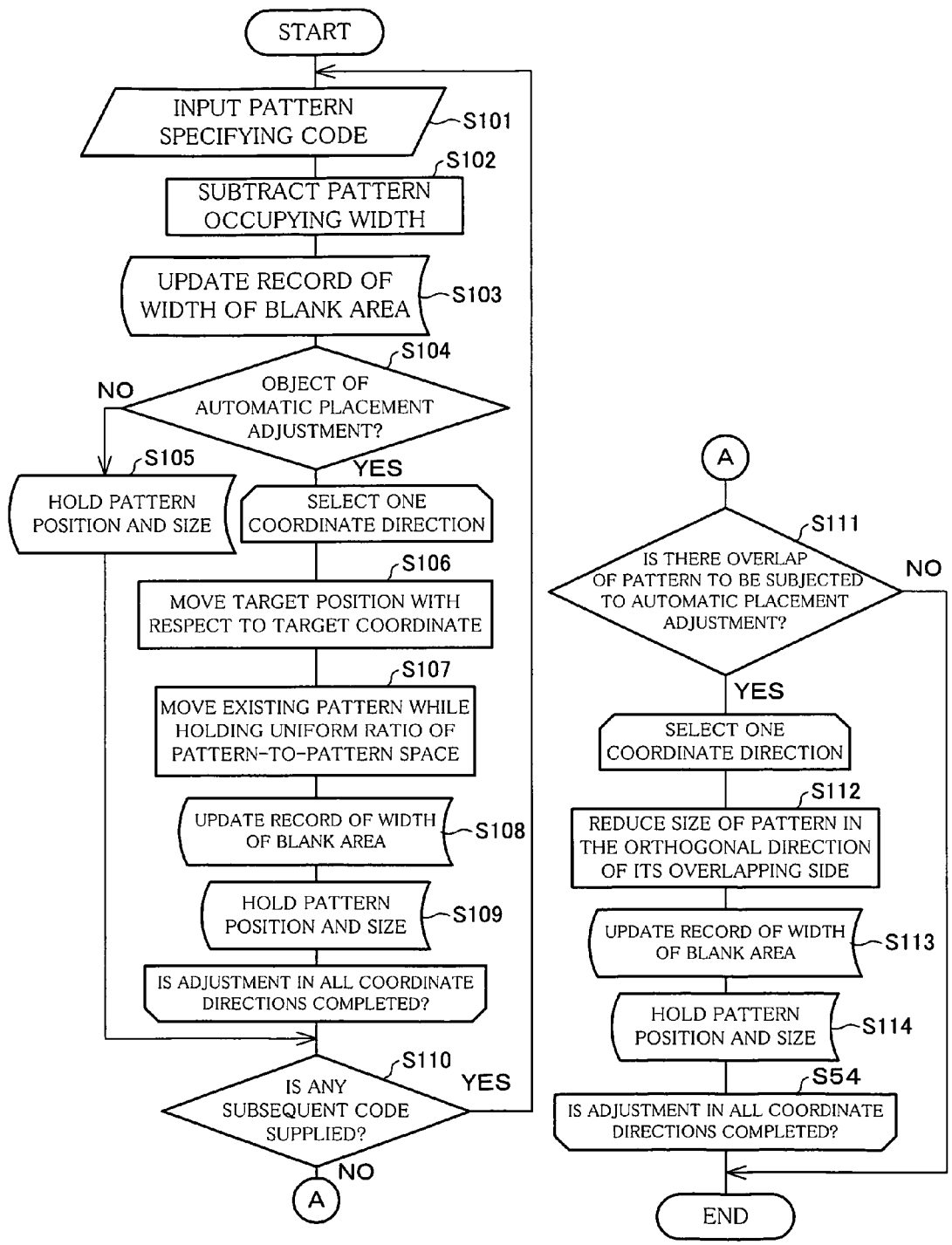
FIG. 7 is a flowchart illustrating operations of the automatic placement adjustment section when, in addition to a pattern to be displayed by a pattern specification code, a display size and a display position thereof are specified.

Here, referring to a flowchart of FIG. 7, the following will describe operations of the automatic placement adjustment section 100 when not only the pattern to be displayed in accordance with the pattern specifying code, but also the display size and display position of the pattern to be displayed are specified.

First, the pattern specifying code is received (S101). A width occupied in a display area by a pattern specified by the received pattern specifying code is subtracted from a current width of a blank area (the total sum of blank area) (S102). A record of the width of a blank area is updated according to a subtraction result in Step S102 (S103). Note that, a full-screen size is recorded as an initial value of the width of a blank area.

Next, if the pattern specified by the pattern specifying code is not an object of automatic placement adjustment ("NO" in S104), the size and position specified by the pattern specifying code is held (S105). On the other hand, if the pattern specified by the pattern specifying code is an object of automatic placement adjustment ("YES" in S104), the processing is performed, with respect to each coordinate direction, of moving the pattern to a target position (S106), moving existing patterns in the opposite direction to a direction in Step S106 by a distance allowed according to the width of a blank area while holding a uniform ratio of pattern-to-pattern space (S107), updating the record of the width of a blank area to a current width of a blank area (S108), and holding the size and position of the pattern (S109).

Note that, as to movement of the existing pattern in the Step S107, the existing pattern may be moved in such a manner that a previously specified minimum pattern-to-pattern space is left, or in such a manner that pattern-to-pattern spaces unused in the movement direction may be compressed at equal rate.

Then, if any subsequent code is received ("YES" in S110), the procedure returns to the Step S101 described earlier. On the other hand, if no subsequent code is received ("NO" in S110), and if the pattern that is an object of automatic placement adjustment has an overlapping portion with other pattern ("YES" in S111), the processing is performed, with respect to each coordinate direction, of reducing the size of the pattern in the orthogonal direction of its overlapping side (S112), updating the record of the width of a blank area to a current width of a blank area (S113), and holding the size and position of the pattern (S114).

With the above operations, for example, if the pattern specifying code specifies to display contents as illustrated in FIG. 8(*a*), and the power button 1100 is an object of automatic placement adjustment to be placed at the target position 1500 illustrated in FIG. 5, the power button 1100 is moved up so as to be placed at the target position with respect to the longitudinal direction, as illustrated in FIGS. 8(*b*) and 8(*c*), and the window 1200 and the scroll buttons 1300-1 and 1300-2, which are the existing patterns, are moved down while holding a uniform ratio of pattern-to-pattern space with respect to the longitudinal direction.

Figure 8A:
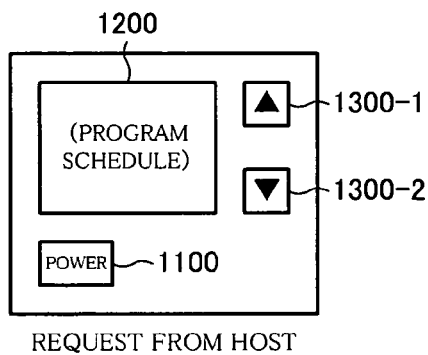
FIGS. 8(a)-8(f) are explanatory diagrams illustrating still another example of placement adjustment performed by the automatic placement adjustment section.
Figure 8B:
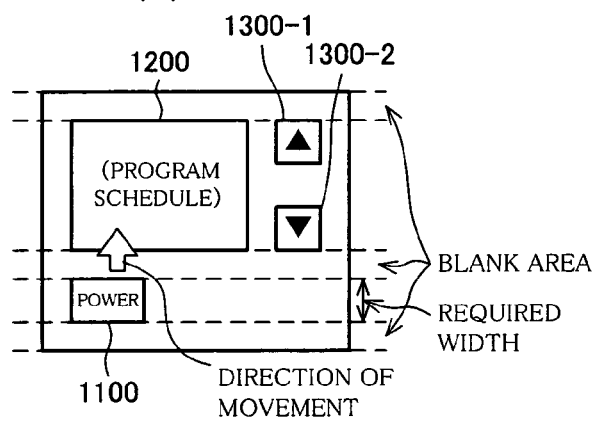
Figure 8C:
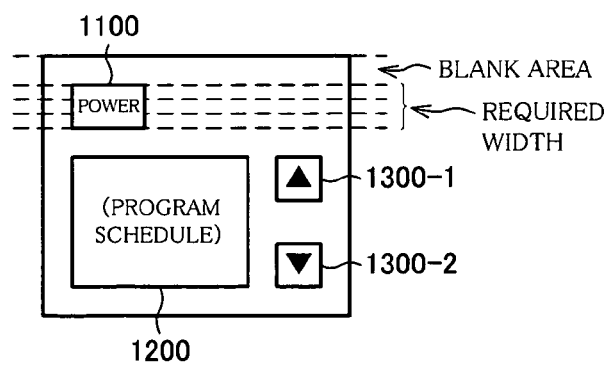
Figure 8D:
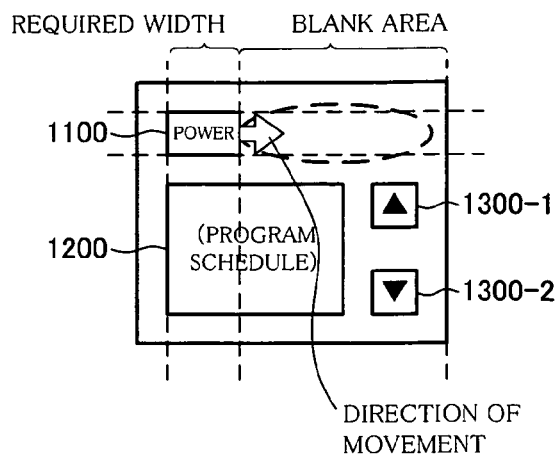
Figure 8E:
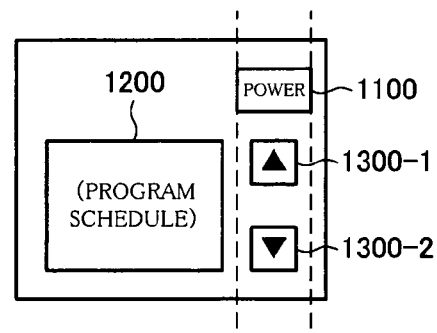
Figure 8F:
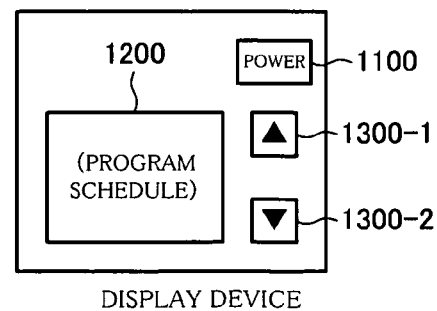

Next, as illustrated in FIGS. 8(d) and 8(e), the power button 1100 is moved toward the right so as to be placed at the target position with respect to the lateral direction. Note that, at this moment, since a uniform ratio of pattern-to-pattern space with respect to the lateral direction is being held, the window 1200 and the scroll buttons 1300-1 and 1300-2, which are the existing patterns, are not moved. As a result, a display illustrated in FIG. 8(f) is provided in the present display device.

Figure 9A:
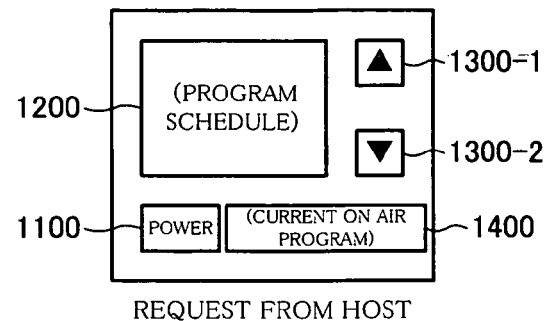
FIGS. 9(a)-9(c) are explanatory diagrams illustrating yet another example of placement adjustment performed by the automatic placement adjustment section.
Figure 9B:
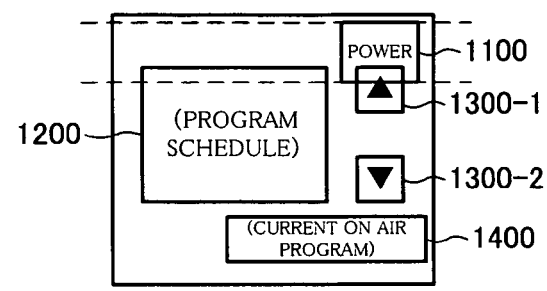
Figure 9C:
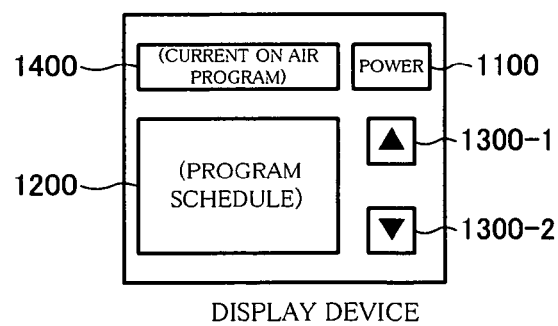
Figure 10:
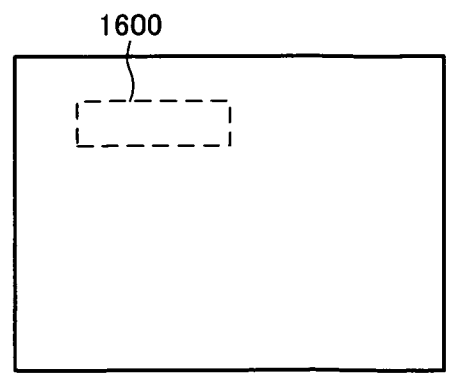
FIG. 10 is an explanatory diagram illustrating a target position at which a window is displayed.

Further, for example, if the pattern specifying code specifies to display contents as illustrated in FIG. 9(a), and the power button 1100 and a window 1400 for displaying a current on air program therein are objects of automatic placement adjustment to be placed at the target position 1500 illustrated in FIG. 5 and at a target position 1600 illustrated in FIG. 10, respectively, the power button 1100 and the window 1400, after temporarily placed as illustrated in FIG. 9(b), are displayed respectively at the target positions in the display device as illustrated in FIG. 9(c).

Note that, in the state of FIG. 9(b), the power button 100 and the scroll button 1300-1 overlap each other, and this state is temporarily stored at the point in time when automatic placement of the power button 1100 is completed. Then, it is assessed whether or not there are overlaps at the point in time when automatic placement of the window 1400 is completed, and if no overlap occurs, it can be judged that the automatic placements have been properly completed.

Figure 11A:
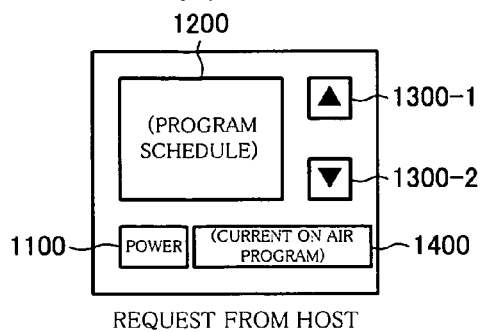
FIGS. 11(a)-11(f) are explanatory diagrams illustrating still another example of placement adjustment performed by the automatic placement adjustment section.
Figure 11B:
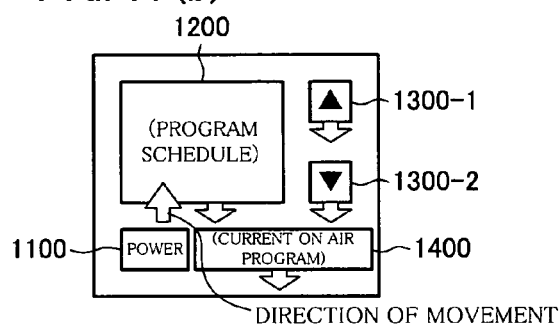
Figure 11C:
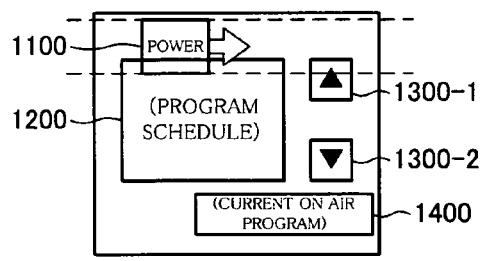

Further, for example, if the pattern specifying code specifies to display contents illustrated in FIG. 11(a), and the power button 1100 is an object of automatic placement adjustment to be placed at the target position 1500 illustrated in FIG. 5, as illustrated in FIGS. 11(b) and (c), the power button 1100 is moved up so as to be placed at the target position with respect to the longitudinal direction, and the window 1200, the scroll buttons 1300-1 and 1300-2, and the window 1400, which are existing patterns, are moved down while holding a uniform ratio of pattern-to-pattern space with respect to the longitudinal direction.

Figure 11D:
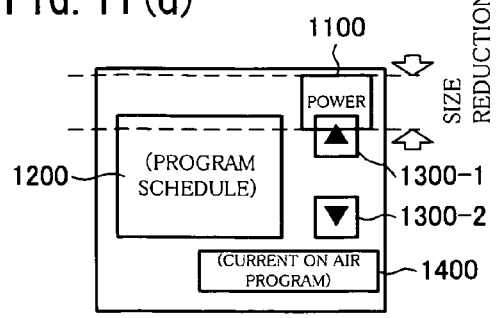

Next, as illustrated in FIG. 11(d), the power button 1100 is moved toward the right so as to be placed at the target position with respect to the lateral direction. Note that, at this moment, since a uniform ratio of pattern-to-pattern space with respect to the lateral direction is being held, the window 1200, the scroll buttons 1300-1 and 1300-2, and the window 1400, which are the existing patterns, are not moved.

Figure 11E:
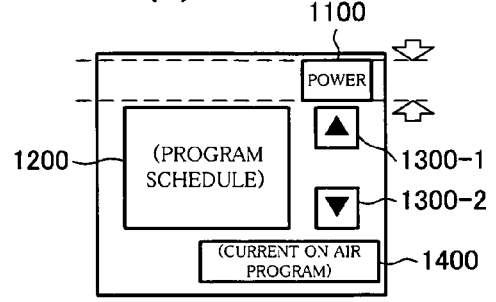
Figure 11F:
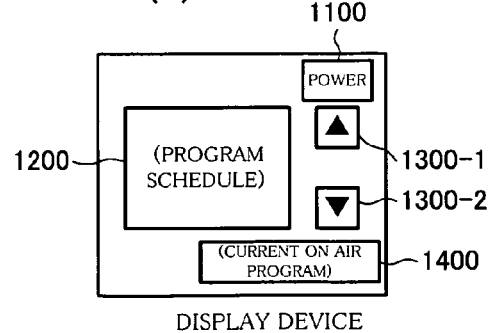

Since all movements are completed in the state of FIG. 11(d), and there is no room for adjustment inside the blank area for placement adjustment, as illustrated in FIG. 11(e), the power button 1100 is reduced in size in the longitudinal direction to complete the automatic placement adjustment. As a result, a display illustrated in FIG. 11(f) is performed in the present display device, and this makes it possible to provide a consistent pattern placement improving the ease-of-use for the user.

Figure 12:
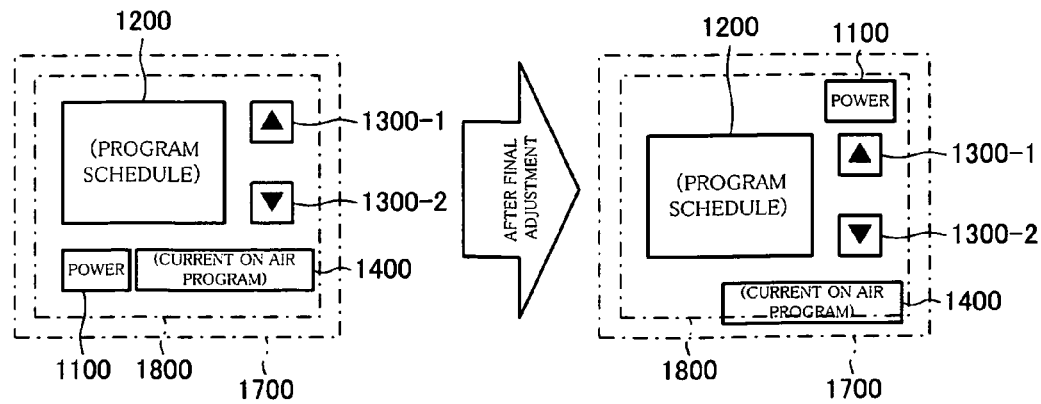
FIG. 12 is an explanatory diagram illustrating one example when a physically displayable area in a display section is greater than a display area that the pattern specifying code is designed for, and placement adjustment is performed within a whole of the physically displayable area in the display section.

Note that, as illustrated in FIG. 12, when a physically displayable area 1700 in the display section 1003 is made greater than a display area 1800 that the pattern specifying code (in other words, the host) indicates, and placement adjustment is performed within the whole of the physically displayable area 1700 in the display section 1003, it is not necessary to reduce the size of the pattern which is an object of automatic placement adjustment (the power button 1100 in FIG. 12), and the pattern which is an object of automatic placement adjustment can be always displayed of an ideal size at the target position. That is, an area between the area 1700 and the area 1800 is a reserve area for automatic placement not to be specified by the pattern specifying code from the host, and is an area used when there is not enough room for automatic placement adjustment.

Thus, in the present embodiment, the pattern that is an object of automatic placement adjustment is subjected to automatic placement adjustment so that the pattern is displayed at the target position set for that pattern. This makes it possible to realize such a function of constantly placing the pattern of the power button, for example, in the upper right of the screen, regardless of the host, thus improving the ease-of-use for the user.

Note that, conventionally, since image data itself of each pattern was received from the host for display of the pattern, the position at which the pattern of the power button, for example, was displayed might vary between when the host is a television receiver and when the host is a facsimile transmission and reception apparatus, due to variations in designers, variations in manufacturers, and variations in capabilities in the host. In this case, the user needed to look for the pattern of the power button, decreasing the ease-of-use for the user. As illustrated in FIGS. 1 and 2, the present invention can embody an easy-to-use and intuitive display by displaying an information pattern providing a basic function at about the same position, regardless of types of devices, functions, and manufactures.

The present embodiment includes a function of superimposing an image reproduced from an image signal generated by the pattern display processing section 1008 (hereinafter simply referred to as "pattern image") on an image reproduced from a video signal received externally by the video signal input section 1001 to display them on the display section 1003. The way of superimposing will be described below.

Figure 13:
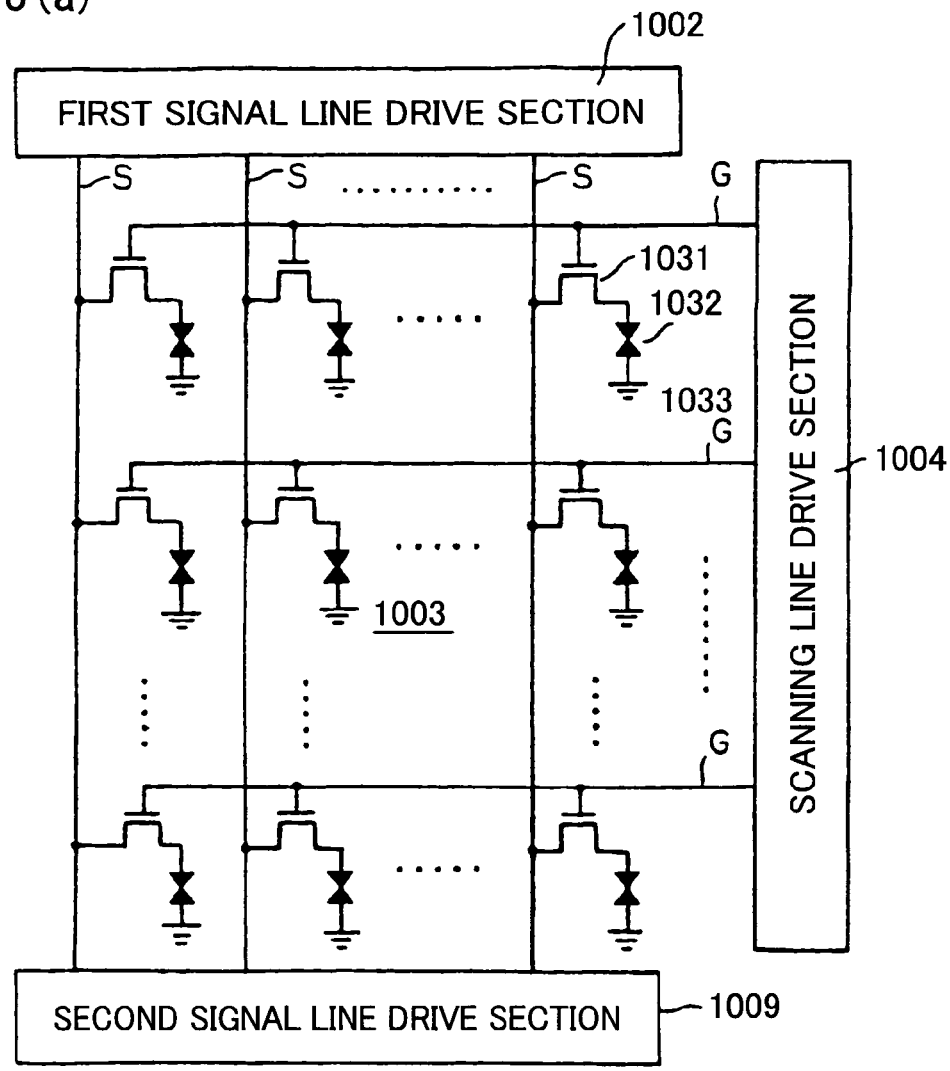
FIG. 13(a) is an explanatory diagram illustrating a display section used for a first method for superimposing a video signal and a pattern image both received from outside.
FIG. 13(b) is an explanatory diagram illustrating driving of signal lines in the display section illustrated in FIG. 13(a).
Figure 13:
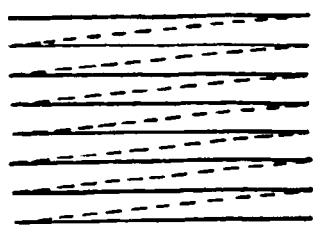

To begin with, a first example thereof will be described with reference to FIG. 13. Note that, the following description assumes that the display section 1003 is an active matrix liquid crystal panel using TFTs (thin-film transistors). Here, the display section 1003 will be described with reference to FIG. 13(a). A plurality of scanning lines G (gate lines) are arranged in parallel, and a plurality of signal lines (source lines) are arranged in parallel so as to be orthogonal to the scanning lines G.

In the vicinity of the intersection of the scanning line G and the signal line S provided are a TFT 1031 and a liquid crystal layer 1032. A gate of the TFT 1031 is connected to the corresponding scanning line G. The liquid crystal layer 1032 is connected to a drain of the corresponding TFT 1031 at its one end. The liquid crystal layer 1032 is connected to a counter electrode 1033 at its other end.

A scanning line drive section 1004 drives each of the scanning lines G during the corresponding horizontal scanning interval and horizontal blanking interval to turn ON the TFT 1031 connected to the scanning line G concerned. A first signal line drive section 1002 drives the signal line S in accordance with the video signals received by the video signal input section 1001. The first signal line drive section 1002 drives the signal line S just during horizontal blanking intervals represented by dashed lines in FIG. 13(b), not during horizontal scanning intervals represented by solid lines in FIG. 13(b).

With this arrangement, a video picture received externally and a pattern specified by an externally provided pattern specifying code are superimposed inside the display section 1003 after being generated as mutually different signal inputs.

Figure 14:
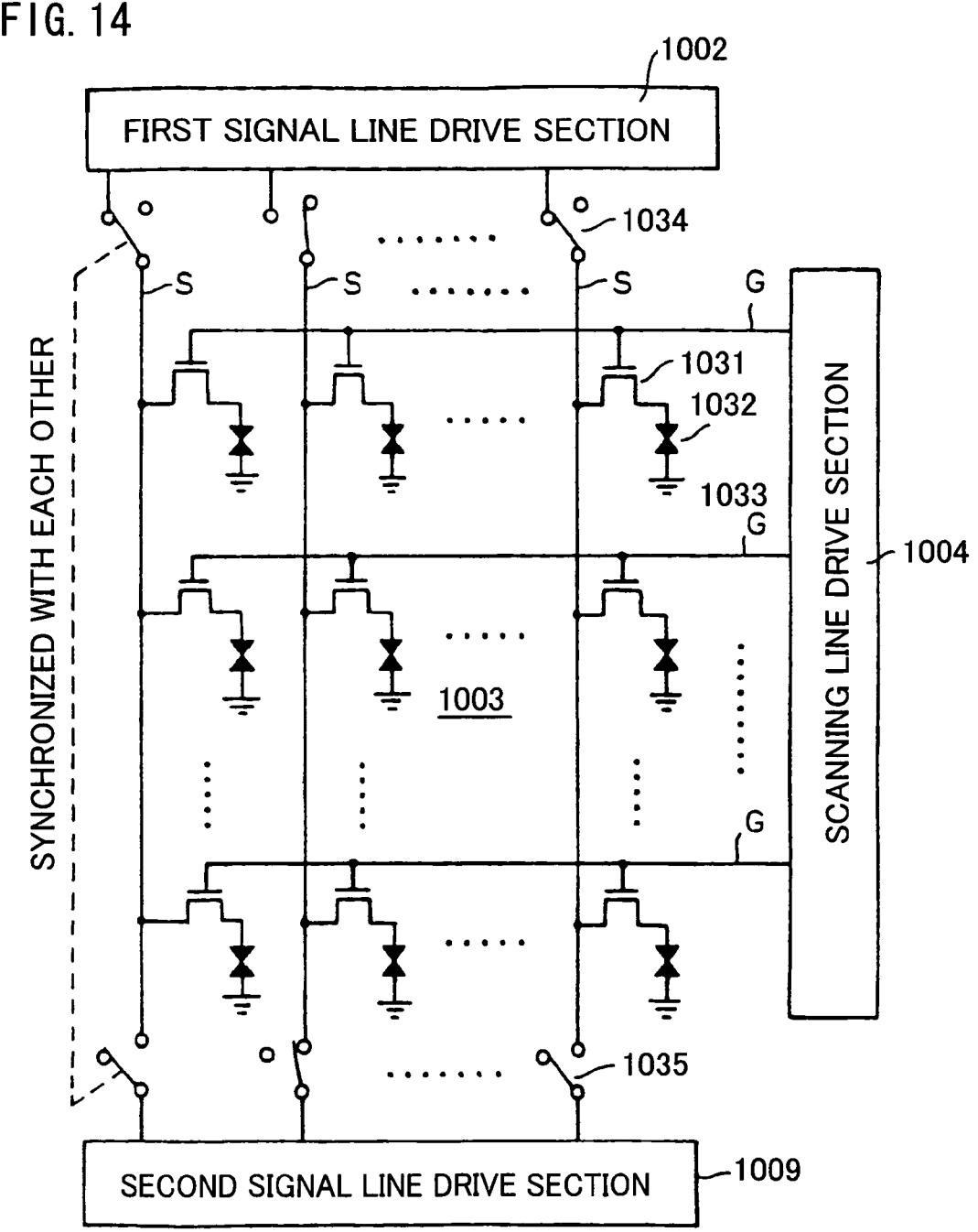
FIG. 14 is an explanatory diagram illustrating a second method for superimposing a video signal and a pattern image both received from outside.

A second example will be described with reference to FIG. 14. The scanning line drive section 1004 sequentially drives the scanning lines G one by one to turn ON the TFTs 1031 respectively connected to the scanning lines G. The first signal line drive section 1002 drives the signal lines S in accordance with video signals received by the video signal input section 1001. The second signal line drive section 1009 drives the signal lines S in accordance with image signals (e.g. image signals for a power button) provided by the pattern display processing section 1008.

Switches 1034 and 1035 are provided between each of the signal lines S and the first signal line drive section 1002 and between each of the signal lines S and the second signal line drive section 1009, respectively. The two switches 1034 and 1035 connected to the same signal line S synchronize with each other in the following manner: the switch 1034 opens and the switch 1035 closes in a dot included in the area where the pattern image is displayed; and on the other hand, the switch 1034 closes and the switch 1035 opens in a dot not included in the area where the pattern image is displayed.

With this arrangement, a video picture received externally and a pattern specified by an externally provided pattern specifying code are superimposed inside the display section after being generated as mutually different signal inputs. Note that, in this example, the video picture and the specified pattern are displayed in such a form that the specified pattern is written over the externally provided video picture. Further, switching of the switches 1034 and 1035 can be performed in accordance with image signals provided by the pattern display processing section 1008.

Figure 15:
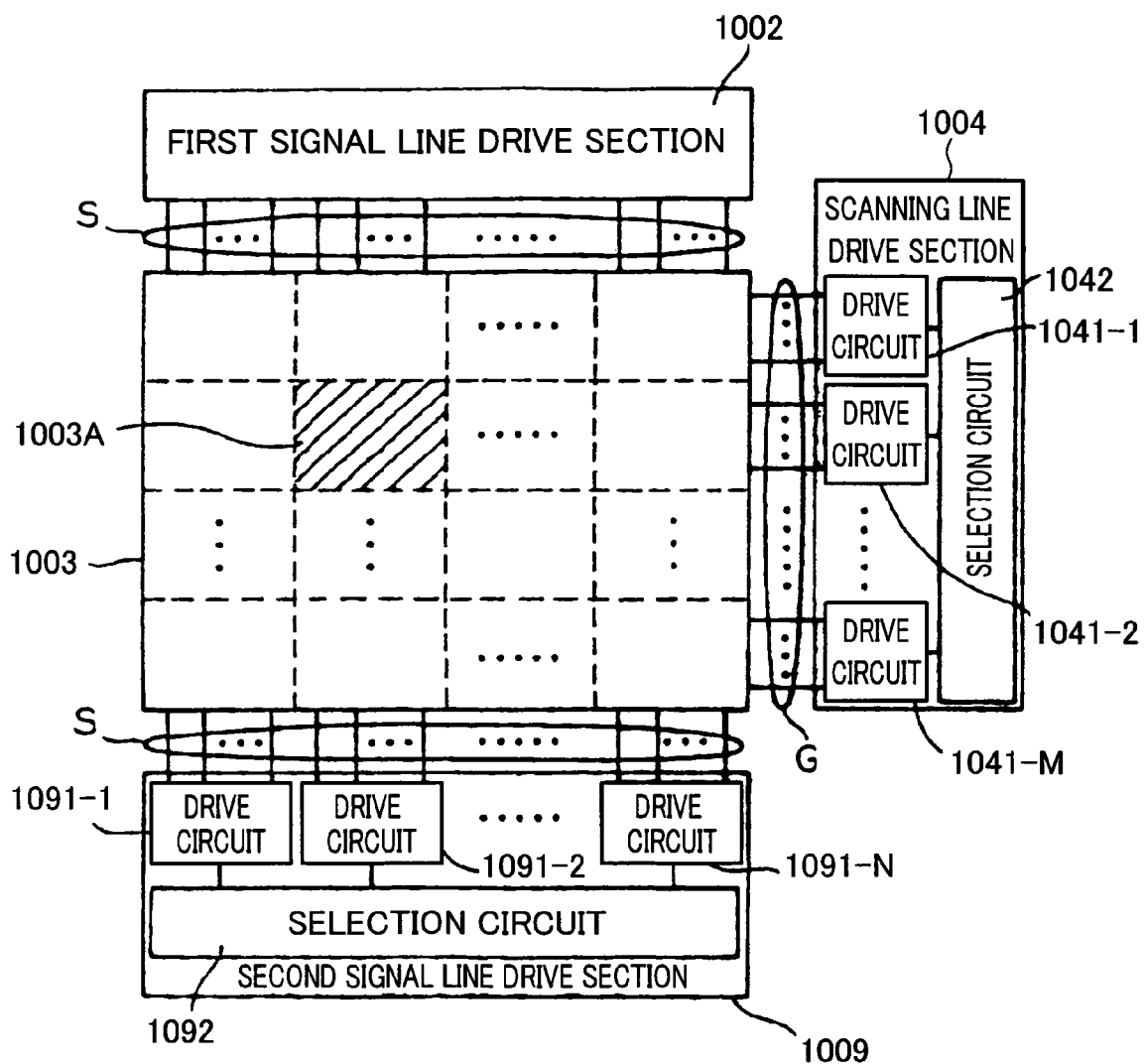
FIG. 15 is an explanatory diagram illustrating a third method for superimposing a video signal and a pattern image both received from outside.

In a third example, basically as in the first example, the first signal line drive section 1002 drives during horizontal scanning intervals, and the second signal line drive section 1009 drives during horizontal blanking intervals. As illustrated in FIG. 15, the second signal line drive section 1009 is constituted by N-number of drive circuits 1091-1, 1091-2, . . . , 1091-N and a selection circuit 92. Note that, the number of signal lines S that one drive circuit has should be equal to the number of patterns of the shortest width occupying the drive circuit.

The N-number of drive circuits 1091-1, 1091-2, . . . , 1091-N drive the respective signal lines S in the display section 1003 in accordance with image signals provided by the pattern display processing section 1008, and the selection circuit 1092 drives only the drive circuit required to display the pattern image, of the N-number of drive circuits 1091-1, 1091-2, . . . , 1091-N.

For example, in the case where the pattern specified by the pattern specifying code is placed in a display area 1003A diagonally shaded in FIG. 15, the second signal line drive section 1009 drives only the drive circuit 1091-2 corresponding to the display area 1003A, of the N-number of drive circuits 1091-1, 1091-2, . . . , 1091-N, during the horizontal blanking intervals corresponding to the display area 1003A.

With this arrangement, a video picture received externally and a pattern specified by an externally provided pattern specifying code are superimposed inside the display section after being generated as mutually different signal inputs.

Note that, if the number of patterns to be displayed is small, the pattern image may be drawn in an overwritten manner by driving only the drive circuit required to display the pattern image of the N-number of drive circuits 1091-1, 1091-2, . . . , 1091-N, constituting the second signal line drive section 1009, during vertical blanking intervals.

Further, if driving by the first signal line drive section 1002 can be stopped, for example, in the case when video signals supplied to the first signal line drive section 1002 are for a static image or the like, the pattern image may be drawn by driving only the drive circuit required to display the pattern image of the N-number of drive circuits 1091-1, 1091-2, . . . , 1091-N constituting the second signal line drive section 1009, during horizontal scanning intervals, not during horizontal blanking intervals.

Further, as illustrated in FIG. 15, it may be arranged such that the scanning line drive section 1004 is constituted by M-number of drive circuits 1041-1, 1041-2, . . . , 1041-M and a selection circuit 1042, and the selection circuit 1042 effects the operation of the drive circuit required for display of the M-number of drive circuits 1041-1, 1041-2, . . . , 1041-M. This arrangement allows image display partially in the display section 1003, for example, image display only in the display area 1003A diagonally shaded in FIG. 15, thus realizing extensive displays.

Further, as with the second signal line drive section 1009, it may be arranged such that the first signal line drive section 1002 is constituted by N-number of drive circuits and a selection circuit which selectively drives the N-number of drive circuits, and during each of the horizontal scanning intervals, the drive circuit in the first signal line drive section 1002 is driven in the area where no pattern image is displayed, and the drive circuit in the second signal line drive section 1009 is driven in the area where the pattern image is displayed.

Figure 16:
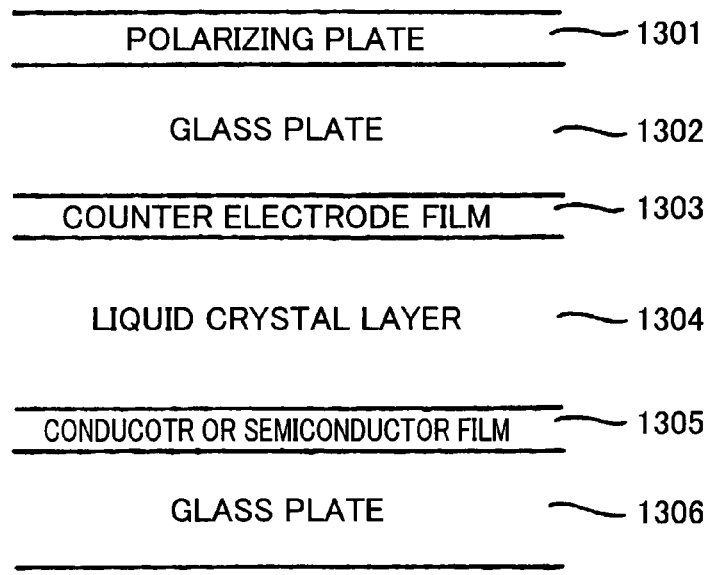
FIG. 16 is a cross-sectional diagram of a display section in a liquid crystal-based display scheme.

Here, in the case of a liquid crystal-based display mode, for example, the display section 1003, as a cross-sectional view thereof is illustrated in FIG. 16, is composed of a polarizing plate 1301, a glass plate 1302, a counter electrode film 1303, a liquid crystal layer 1304, a thin-film substrate 1305 realized by conductor or semiconductor, and a glass substrate 1306, and the thin-film substrate 305 is provided with circuits of the display section 1003 such as TFT (thin-film transistors).

Figure 17:
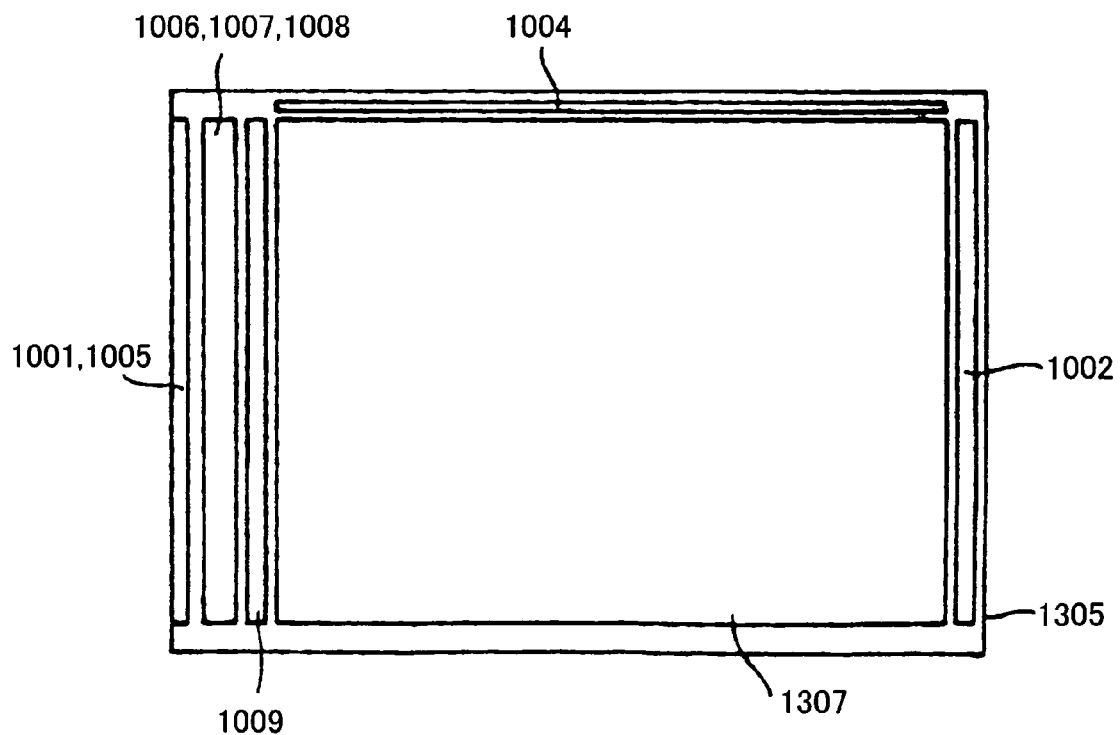
FIG. 17 is an explanatory diagram illustrating an example of how the components are placed when all of a video signal input section, a first signal line drive section, a scanning line drive section, a pattern specifying code input section, an automatic placement adjustment section, a pattern display processing section, a pattern storage section, and a second signal line drive section are provided on a thin-film substrate together with a circuit of the display section.

The thin-film substrate 1305 may be provided with at least one of the video signal input section 1001, the first signal line drive section 1002, the scanning line drive section 1004, the pattern specifying code input section 1005, the automatic placement adjustment section 1006, the pattern storage section 1007, the pattern display processing section 1008, and the second signal line drive section 1009. This arrangement can provide a further thinner and smaller display device. Note that, FIG. 17 illustrates an example of how the components are placed when all of the video signal input section 1001, the first signal line drive section 1002, the scanning line drive section 1004, the pattern specifying code input section 1005, the automatic placement adjustment section 1006, the pattern storage section 1007, the pattern display processing section 1008, and the second signal line drive section 1009 are provided on the thin-film substrate 1305 together with a circuit 1307 of the display section 1003.

Note that, in the present embodiment, an object of the display device is the one capable of remotely controlling the host. However, the display device may be the one which is incapable of remotely controlling the host and which just displays a pattern image in response to the instruction provided from the host. Further, the display device may be the one which does not include the automatic placement adjustment section 1006, but places all of the patterns specified by the host as the host has specified. Further, the display device may be arranged such that the host cannot set a display position of the pattern.

For various types of electronic devices, such as television receiver, facsimile transmission and reception apparatus, portable telephone, picture-frame-like liquid crystal display device, and character-recognition and sound-production device, with a display device of the present embodiment, providing the pattern specifying code to the display device is all they need to cause the display device to display an image of a predetermined pattern, thus reducing the loads on the electronic devices and allowing them to efficiently perform other operations. In addition, it is possible to provide a user interface having excellent usability.

Note that, a display device of the present invention may be arranged so as to include: a display section; a pattern storage section which stores therein images of predetermined patterns; a pattern specifying code input section which externally receives a pattern specifying code; and a pattern display processing section which retrieves the image of the pattern specified by the pattern specifying code from the pattern storage section and then causes the display section to display the image thereon.

With this arrangement, according to the foregoing display device, for realization of displaying an image of a predetermined pattern on the display device, it is essential only that the pattern specifying code be supplied to the display device. This eliminates the need for providing image data of the pattern itself to the display device, thus significantly reducing the loads on the host (external device).

In addition, according to the foregoing display device, it is possible for the host to freely set the position at which the pattern is to be displayed, so that the display device becomes easy to use.

Further, the pattern storage section may store therein a character font. Also, the pattern storage section may store therein a pattern with which a status of a device as a host is notified to a user, and a pattern through which the user performs entry for operation.

Still further, the pattern display processing section may cause the image of the pattern specified by the pattern specifying code to be displayed at a position specified by the pattern specifying code.

Yet further, an automatic placement adjustment section may be included which, in displaying an image of a pattern which is an object of automatic placement adjustment of the patterns stored in the pattern storage section, adjusts a display position of the image in accordance with a predetermined rule.

In this case, for example, a target position may be set for each pattern which is the object of automatic placement adjustment, and the automatic placement adjustment section may perform placement adjustment so that the image of the pattern, which is the object of automatic placement adjustment, is displayed at the target position.

With this arrangement, according to the foregoing display device, the pattern that is an object of automatic placement adjustment is subjected to automatic placement adjustment so that the pattern is displayed at the target position set for the pattern. This makes it possible to display the pattern of the same kind constantly at the same position, regardless of the host, thus improving the ease-of-use for the user.

Further, a physically displayable area in the display section may be greater than a display area that the pattern specifying code is designed for, and the automatic placement adjustment section may adjust a display position for the image of the pattern, which is an object of automatic adjustment, within a whole of the physically displayable area in the display section.

Still further, it may be arranged such that a video signal input section which receives a video signal from outside is included, and by independently driving the display section with the video signal received externally and an image signal of the pattern specified by the pattern specifying code, an image displayed in accordance with the video signal received externally by the video signal input section and the image of the pattern specified by the pattern specifying code are superimposed.

In this case, the display area in the display section may be divided into a plurality of sections, and of the plurality of divided sections, at least one section required to display the image of the pattern specified by the pattern specifying code may be driven, so as to perform the superimposition.

With this arrangement, according to the foregoing display device, it is possible to superimpose the image received externally and the image of the pattern externally specified by the code.

Further, at least one of the pattern storage section, the pattern display processing section, and the automatic placement adjustment section may be provided on a conductor or semiconductor thin film which is a component of the display section.

With this arrangement, according to the foregoing display device, circuits other than the display section are provided on a conductor or semiconductor thin film substrate which is a component of the display section, thereby facilitating reduction in thickness and size of the display device.

Second Embodiment

The present embodiment will describe in detail a method of transmitting data between the host and the remote controller described in the First Embodiment. That is, the present embodiment relates to a method of transmitting data between devices of limited communication functions, and more specifically, the present embodiment relates to an information terminal and a host apparatus which carry out this data transmitting method, a program for the data transmitting method, and a computer-readable recording medium containing the program.

First, the background of the present embodiment will be described below.

Conventionally, as to television sets and audio devices, multiple devices were controlled by one remote controller. Recently, there has been demand for displaying an operation screen adopting GUI (Graphic User Interface) on not only a device body but also a remote controller. Also, there is demand for controlling programs for remote control in terms of design and control, for version upgrade of programs for device control and programs for remote control.

In addition, in designing and executing the GUI, a technique used for shortening a development period and an execution time of the program and reducing an execution size of the program, is a technique of selectively using a part of libraries collecting previously prepared subroutines for drawing of respective drawing components used repeatedly. These libraries, which are provided as soft development tools, together with a compiler and others, are designed as software targeting for a typical display device provided on the environment for software and GUI development.

Generally, for data transmission with a new device, a device driver of exclusive use for the new device must be developed. Specifically, for preparation of multiple remote controllers capable of controlling a new television set, a device driver for every-remote controller must be developed. In many cases, a control program of the television set must be also developed for every remote controller.

In view of this, establishment of standard specifications for communications between a device, such as television set, and a remote controller is considered. This makes it possible to share one remote controller among a plurality of devices only by developing respective device drivers compliant with a uniform standard for the device such as television set, and the remote controller.

Note that, Japanese Laid-Open Patent Application No. 1999/41363 (Tokukaihei 11-41363; published on Feb. 12, 1999) discloses an information system which presents, to the user, data outputted from devices (air-conditioning apparatus, water heater, gas meter, and microwave oven) with a uniform user interface. In this information system, data transmitted from the devices are processed by respective programs corresponding to the devices in an information terminal, and reports with a uniform form are generated in accordance with a result of the processing.

The above publication describes that communications between the devices and the information terminal can be realized by wired communication means such as home bus system (the Electronic Industries Association of Japan standard, the Radio Engineering and Electronics Association Standards, ET-2101 "Home Bus System", September, 1988) or the existing technique such as wireless communication means.

Further, Japanese Laid-Open Patent Application No. 1994/290091 (Tokukaihei 6-290091; published on Oct. 18, 1994) discloses a file system. Still further, Japanese Laid-Open Patent Application No. 2000/207261 (Tokukai 2000-207261; published on Jul. 28, 2000) discloses a file system. Yet further, Japanese Laid-Open Patent Application No. 1995/29010 (Tokukaihei 7-29010; published on Jan. 31, 1995) discloses a neural network. Further, U.S. patent application Publication No. 2002/0075249 (published on Jun. 20, 2000) discloses a multidriver.

However, even if standard specifications for hardware and software are established regarding data transmission between a device and a remote controller, a device driver compliant with the standard specifications must be newly developed.

In addition, the standard specifications pose the limitations to hardware and/or software of a device and a remote controller, which might hamper flexible designs. Further, although a sophisticated GUI needs a sophisticated image processing, a device, such as television set, and its remote controller have low-functionality hardware and software as a control device. Controlling and image processing that become sophisticated every year are performed in either a television set or a remote controller, thus increasing the loads on the devices. However, these devices cannot contain a high-functionality information processor in terms of the cost of power consumption and others.

Moreover, for varying OSs, the respective soft development tools, such as compiler, of exclusive use for the OSs must be used. That is, it is not easy to ensure compatibility of hardware and software. For example, development for a new device driver is needed to change software designed for a display device contained in a device body to software in use for a display device contained in a remote controller.

In view of this, in an information terminal 1 and a host apparatus of the present embodiment performs the following process. As illustrated in FIG. 1, in the information terminal 1 (equivalent to a display device 1010 in the First Embodiment), an I/O emulation section 11 causes the host apparatus to recognize a file information storage section 4 as an external file system. The file information storage section 4 stores therein a substitution code 4a that is a program which is read out as a code of a subroutine called in the program of the host apparatus, and normally completes the subroutine concerned. Upon receipt of a read request of the substitution code 4a from the host apparatus, in the information terminal 1, a file allocator activation signal converter 12 identifies a subroutine executed by the program of the host apparatus in accordance with a read instruction of the substitution code 4a from the host apparatus, and performs a concurrent processing inside the information terminal 1.

This makes it possible to perform device-to-device data transmissions, without development of a device driver designed for each device at a data receiving end. That is, it is possible to provide such a data transmitting method, and an information terminal and a host apparatus which perform this data transmitting method. Moreover, it becomes possible to provide a data transmission program realizing the data transmitting method, and a computer-readable recording medium containing the data transmission program.

The following will describe in details the present embodiment with reference to FIGS. 18 through 41.

In the present embodiment, the following description is given based on data transmission between a host apparatus 100 that is a television set (FIG. 27) or a facsimile machine (FIG. 28) and the information terminal 1 that is a remote controller operated by a user for control of the host apparatus 100. Particularly, the following description is given based on data transmission for control of GUI (Graphical User Interface) in the information terminal 1.

Note that, the host apparatus 100 has at least an I/O interface to which a file system can be added outside the host apparatus. Further, an OS (Operating System) of both the information terminal 1 and the host apparatus 100 may be an non-embedded OS or an embedded OS. Moreover, the information terminal 1 may include a wired logic circuit.

In the present embodiment, the "subroutine" refers to a partial program for instructing a computer to perform some specific operations. A "code of subroutine" refers to a group of codes itself read out from a file system (storage device). The host apparatus 100 can issue the instruction for reading out a code of a subroutine from the file information storage section 4 of the information terminal 1 (subroutine code read instruction), wherein the subroutine has the same name as a subroutine used when the host apparatus 100 executes processing, and the code of the subroutine achieves processing equivalent to the processing of the host apparatus 100, using hardware of the information terminal 1. This subroutine code read instruction may contain specification of entry corresponding to the type of the file system.

Figure 18:
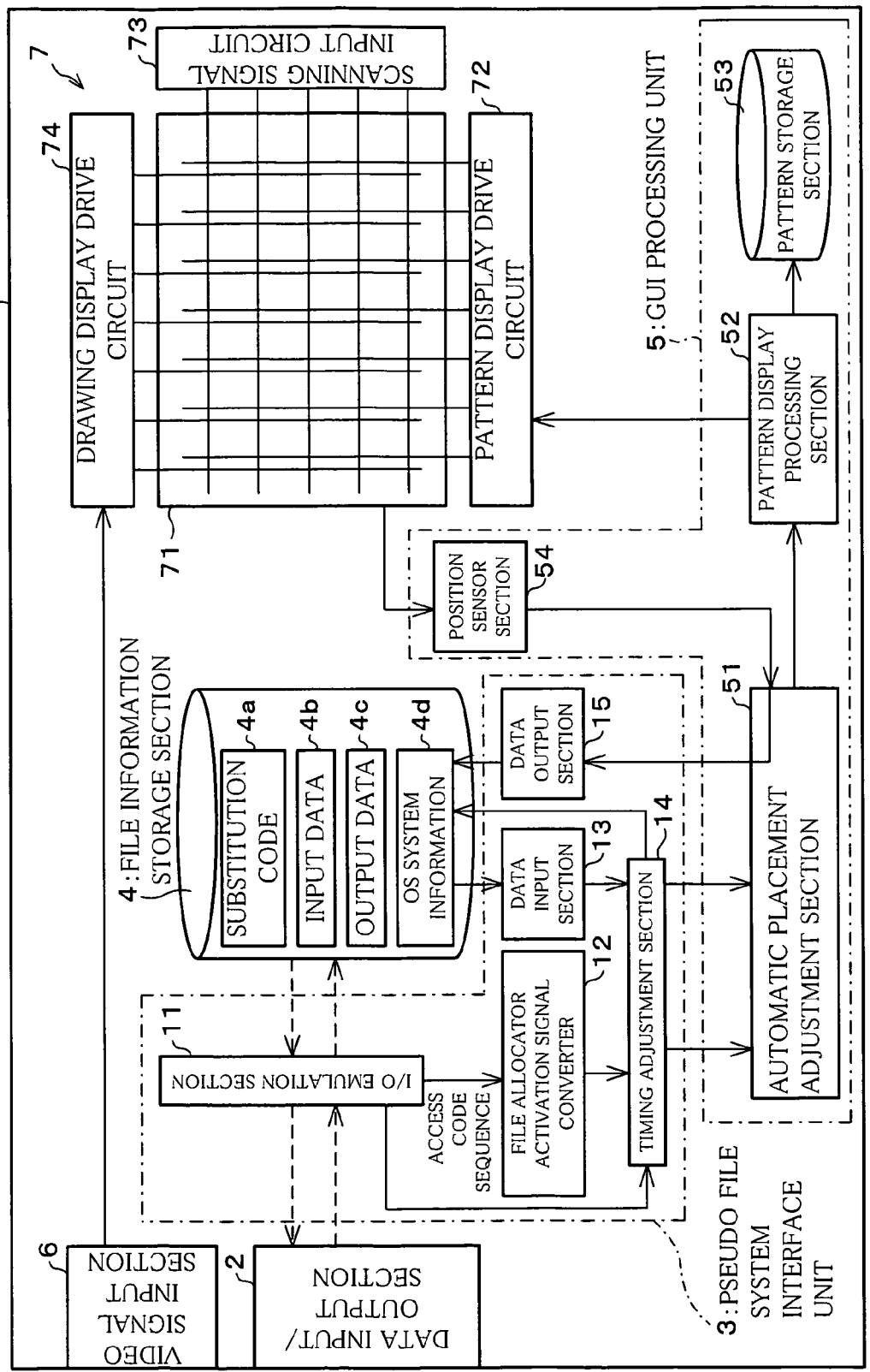
FIG. 18 is a block diagram illustrating a schematic configuration of an information terminal according to one embodiment of the present invention.

As illustrated in FIG. 18, the information terminal 1 includes a data input/output section 2, a pseudo file system interface unit 3, the file information storage section (storage device) 4, a GUI processing unit 5, a video signal input section 6, and a display section (display means) 7.

The data input/output section 2 is connected to an external input/output section 104 of the host apparatus 100, as described later. For the data input/output section 2, which is an interface of the file information storage section 4, an interface for normal storage device, e.g. IDE (Integrated Drive Electronics) or SCSI (Small Computer System Interface) can be applied.

The pseudo file system interface unit 3 includes the I/O emulation section (emulation means) 11, the file allocator activation signal converter (subroutine identification means) 12, a data input section (data input means) 13, a timing adjustment section 14, and a data output section (positional information recording means) 15.

The I/O emulation section 11 generates or receives a signal so as to cause the host apparatus 100 to recognize the file information storage section 4 as a externally connected file system (storage device). For example, the I/O emulation section 11 realizes the signal generation and reception by changing assignment of signal lines provided from the data input/output section 2 in accordance with the standard of a used storage device.

The file allocator activation signal converter 12 identifies a subroutine that a program of the host apparatus 100 executes, in accordance with read-out of a software module file (library) from the host apparatus 100 and the subroutine code read instruction stored and recorded at a particular location in the software module file (subroutine identification process). Specifically, the file allocator activation signal converter 12 acquires from the I/O emulation section 11 an access code sequence transmitted as the subroutine code read instruction from the host apparatus 100, and identifies the subroutine in accordance with the access code sequence thus acquired.

The access code sequence may be physical location information specifying a storage location of the subroutine in the file information storage section 4 of the information terminal 1, virtual location information indicating a virtual storage location, or a character string specifying the subroutine (library file name and subroutine name). Note that, the physical location information may be absolute location information or relative location information relative to a top position of the library file, for example. Further, the location information of the subroutine may be specified at once, or may be specified, after the top position of the library file is specified, by permutation information based on chain information to an address or a sector where the subroutine code is stored.

Further, in the present embodiment, the file allocator activation signal converter 12 identifies a GUI drawing component specified as a subroutine on the basis of the input of the access code sequence, and then outputs a drive voltage signal to a suitable drawing circuit.

Figure 19:
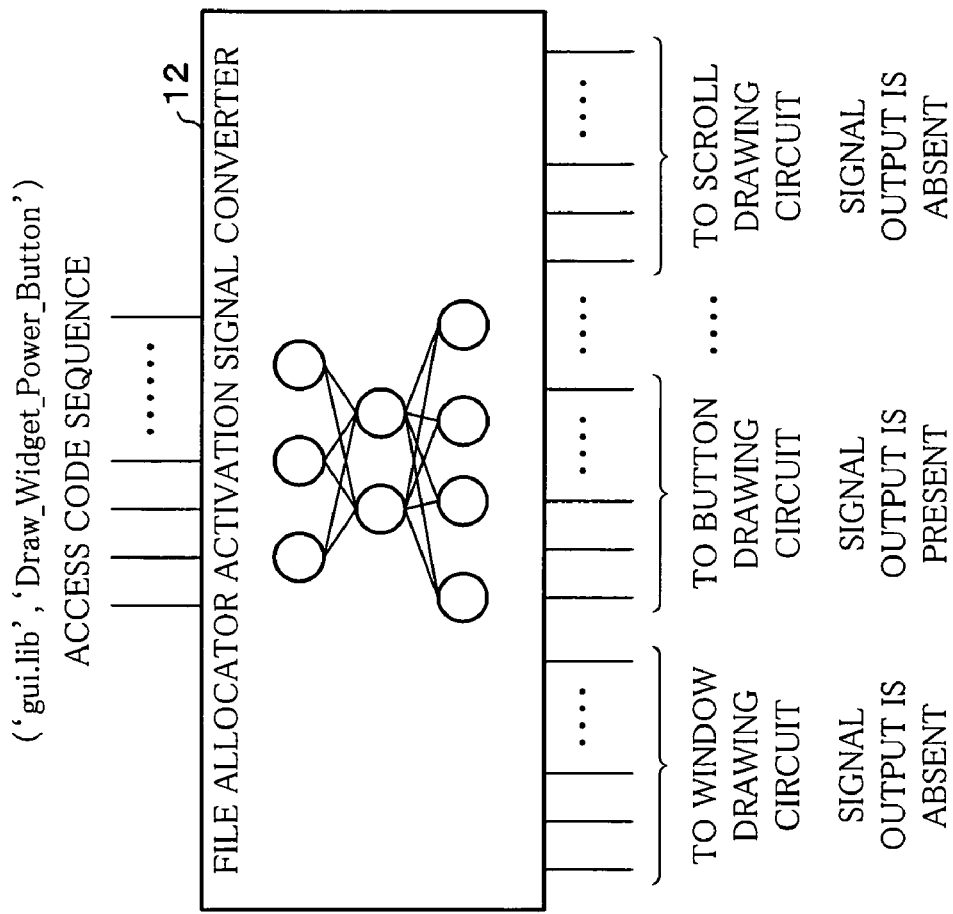
FIG. 19 is a block diagram illustrating one example of the arrangement of a file allocator activation signal converter in the information terminal illustrated in FIG. 18.

For example, as illustrated in FIG. 19, the file allocator activation signal converter 12 outputs a voltage signal only to a circuit which draws Power_Button on the basis of the input of the access code sequence ("gui.lib", "Draw_Widget_Power_Button").

Figure 20:
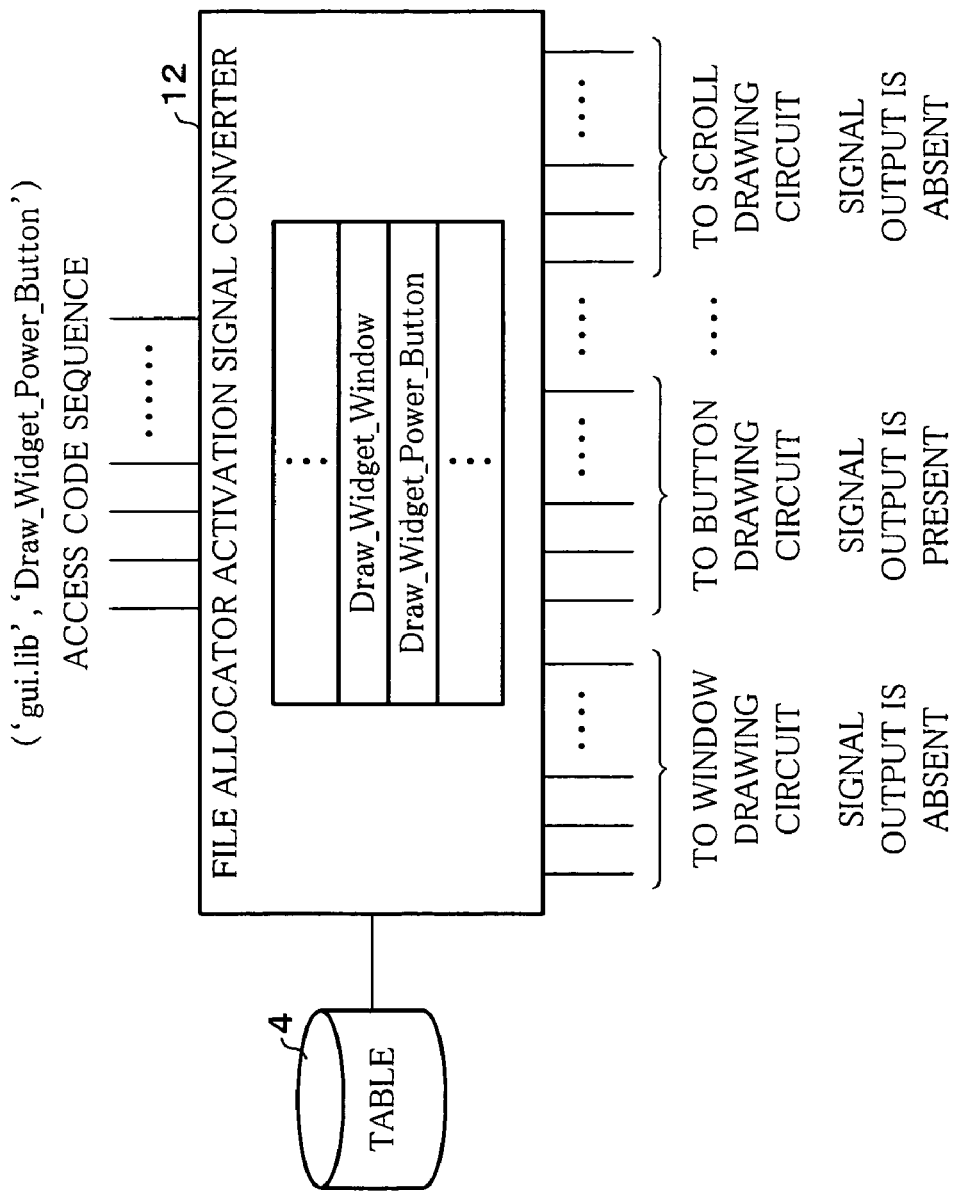
FIG. 20 is a block diagram illustrating another example of the arrangement of a file allocator activation signal converter in the information terminal illustrated in FIG. 18.

Note that, as illustrated in FIG. 19, the file allocator activation signal converter 12 can be realized by a neural network composed of multiplayer perceptrons having been learned in advance. Also, as illustrated in FIG. 20, the file allocator activation signal converter 12 can have such an arrangement so as to refer to a lookup table. This lookup table is stored in the file information storage section 4.

The data input section 13 reads out input data 4b written into the file information storage section 4 by the host apparatus 100. In contrast to the data input section 13, the data output section 15 writes user-pointing positional information sensed by a position sensor section 54 described later, as output data 4c, into the file information storage section 4.

The timing adjustment section 14 outputs: information obtained by the file allocator activation signal converter 12 as a result of identification of the subroutine called by the host apparatus 100; and the input data 4b that the data input section 13 reads out from the file information storage section 4, at an appropriate timing. In FIG. 18, the timing adjustment section 14 supplies them to an automatic placement adjustment section 51 of the GUI processing unit 5.

At the same time, the timing adjustment section 14 outputs the substitution code 4a, at an appropriate timing, in accordance with a timing of the subroutine read request from the host apparatus 100.

Further, when using a subroutine for reading out positional information on a position where the user points (substitution code 4a), the timing adjustment section 14 instructs the timing of generating the substitution code 4a that contains data which is recorded in the output data 4c by the position sensor section 15 at the timing when the read request is made from the host apparatus 100.

The file information storage section 4 is a nonvolatile information storage device, such as memory, which stores therein information necessary for the information terminal 1 to serve a function as a remote controller controlling the host apparatus 100. The file information storage section 4 has storage regions respectively allocated to the substitution code 4a, the input data 4b, the output data 4c, and an OS system information 4d. Note that, storage regions for the input data 4b, the output data 4c, and the OS system information 4d can be omitted as appropriate depending upon specifications on the host apparatus 100 and its program, and others.

The input data 4b is written by the host apparatus 100 and read out by the data input section 13. Further, the output data 4c is written by the data output section 15 and read out by the host apparatus 100.

The substitution code 4a is a code of a program which is read out as a code of a subroutine called in the program executed by the host apparatus 100, and normally completes the subroutine concerned. This substitution code 4a is stored in advance in the file information storage section 4.

Specifically, contents of the substitution code 4a are as follows.

(1) Data Transmission from the Host Apparatus 100 to the Information Terminal 1

When the host apparatus 100 calls a subroutine for performing the process of transmitting data from the host apparatus 100 to the information terminal 1 (e.g. subroutine originally aiming that the host apparatus 100 transmits some GUI component to a display device), the substitution code 4a to be read out from the file information storage section 4 is a program that causes the host apparatus 100 to execute the process of writing data stored in a memory 102 or a file system 103 of the host apparatus 100 (FIG. 22) into the input data 4b of the file information storage section 4 of the information terminal 1 when the host apparatus 100 executes the subroutine.

With this arrangement, in executing the subroutine, the host apparatus 100 writes data of the host apparatus 100 as the input data 4b into the file information storage section 4 of the information terminal 1 in accordance with the substitution code 4a having been loaded from the file information storage section 4. Specifically, for example, this makes it possible to provide coordinate position information showing the GUI component displayed by the called subroutine, to the information terminal apparatus 1. Then, the data input section 13 reads out the input data 4b, whereby data of the host apparatus 100 are transmitted to the information terminal 1 (data input process).

(2) Data Transmission from the Information Terminal 1 to the Host Apparatus 100

When the host apparatus 100 calls a subroutine for performing the process of transmitting data from the information terminal 1 to the host apparatus 100 (e.g. subroutine originally aiming that the host apparatus 100 controls a pointing device to obtain current positional information), the substitution code 4a to be read out from the file information storage section 4 is a program that causes the host apparatus 100 to execute the process of reading out the output data 4c stored in the file information storage section 4 of the information terminal 1 when the host apparatus 100 executes the subroutine.

With this arrangement, in executing the subroutine, the host apparatus 100 reads out the output data 4c from the file information storage section 4 of the information terminal 1 in accordance with the substitution code 4a having been loaded from the file information storage section 4, whereby data of the information terminal 1 are transmitted to the host apparatus 100 (data output process). Note that, the output data 4c is written by the data output section 15 any time, and data at the point when the timing adjustment section 14 determines in accordance with a timing of a read request from the host apparatus 100 is used.

The pseudo file system interface unit 3 may include a substitution code generation section (not shown) which, when the host apparatus 100 calls the subroutine for performing the process of transmitting data from the information terminal 1 to the host apparatus 100, generates a code containing the output data 4c and a program for the host apparatus 100 reading out the output data 4c, as the substitution code 4a read out from the file information storage section 4.

With this arrangement, in executing the subroutine, the host apparatus 100 can read out data contained in the substitution code 4a in accordance with the substitution code 4a (second data output process). That is, since the output data 4c is already embedded in the substitution code 4a, the host apparatus 100 need not access the information terminal 1 to read out the output data 4c, in processing the subroutine.

Note that, the substitution code 4a stored in the file information storage section 4 may be a code having different contents for each subroutine or a code for common use among a plurality of subroutines.

Here, in the I/O emulation section 11, location information of the substitution code 4a in the file information storage section 4 is set in advance for each subroutine name. Note that, this location information is artificial information, so that the substitution code 4a actually read out as a code of a subroutine can be allocated in the I/O emulation section 11.

Therefore, for example, if a code read out as a substance of a subroutine is a process routine for only performing data write/read, it is possible to perform a code sharing and to set so that the same substitution code is read out for a plurality of subroutines.

This makes it possible to realize a smaller memory of a software module file (e.g. GUI library) stored in the file information storage section 4 of the information terminal 1.

For the OS system information 4d, selectable data, such as information on definition of plural OS file systems, are stored in advance so that the arrangement of the I/O emulation section 11 can be altered depending on OS types of the host apparatus 100 or standard types of an interface of a used storage device.

With this arrangement, a control circuit of the information terminal 1 can be used by various kinds of existing host apparatuses 1, without changing a program and an OS of the host apparatus 100, the type of a storage device intended during a design stage for the program of the host apparatus 100, and others.

Note that, as with the I/O emulation section 11, the timing adjustment section 14 may be altered its arrangement as necessary. Also, it is possible to provide a converter for converting a shape of a connector, a level converter for matching with an input signal level, and others, in the data input/output section 2.

Further, the file information storage section 4 stores therein data of the lookup table used by the file allocator activation signal converter 12.

The GUI processing unit 5 generates drawing data of a GUI component which controls the host apparatus 100, in accordance with information obtained by the I/O emulation section 11 as a result of identification of the subroutine called by the host apparatus 100 (i.e. pattern specification), and the input data 4b that the data input section 3 reads out from the file information storage section 4 (i.e. parameter of the pattern specification), and causes the display section 7 to display the drawing data.

The video signal input section 6, which is connected to a video signal output section 105 (FIG. 22) of the host apparatus 100, receives a normal video signal.

Note that, the GUI processing unit 5, the video signal input section 6, and the display section 7 will be described later.

Figure 21:
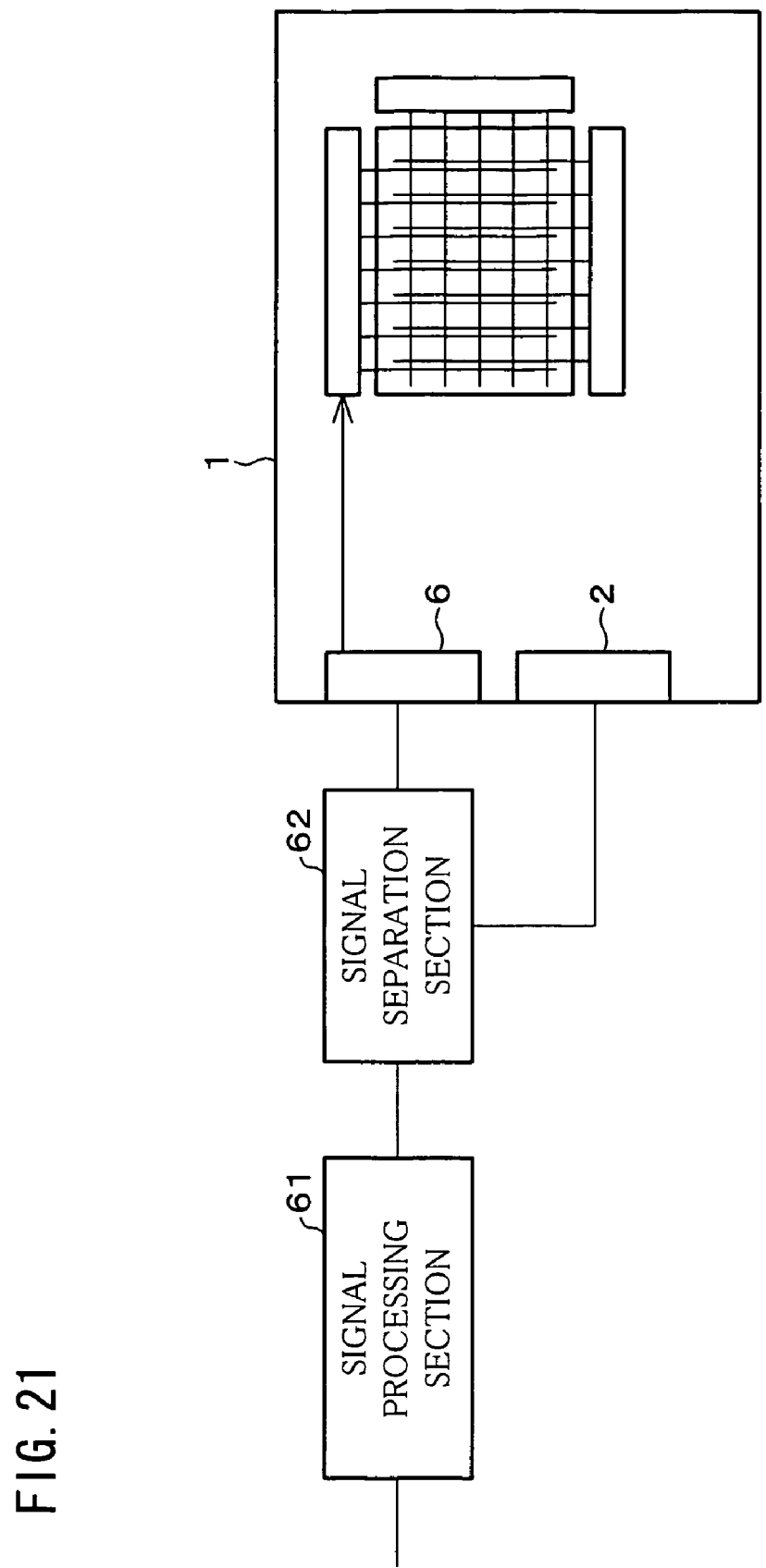
FIG. 21 is a block diagram illustrating one example of a transmission line of the information terminal illustrated in FIG. 18.

As illustrated in FIG. 21, a data signal and a video signal from the host apparatus 100 can be transmitted to the information terminal 1 through a single transmission line. In this case, before an input terminal of the information terminal 1, a wireless or wired signal processing section 61 and a signal separation section 62, following the signal processing section 61, which separates between the data signal and the video signal should be provided so that the separated data signal and video signal are supplied to the data input/output section 2 and the video signal input section 6, respectively.

Figure 22:
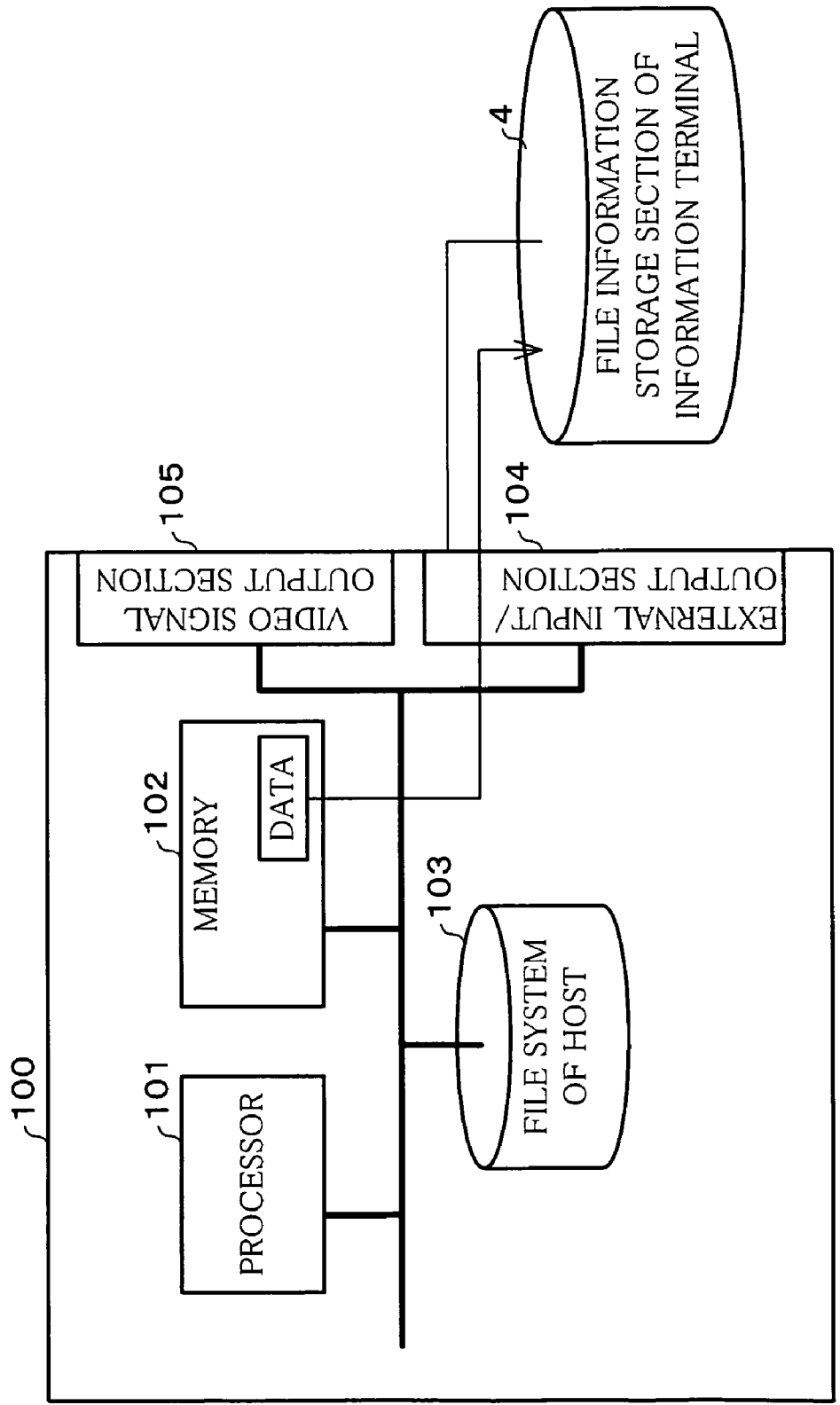
FIG. 22 is a block diagram illustrating a schematic configuration of a host apparatus according to one embodiment of the present invention.

Next, referring to FIG. 22, a schematic configuration of the host apparatus 100 will be described below. As illustrated in FIG. 22, the host apparatus 100 includes a processor (program execution means, substitution code acquisition means, and link setting means) 101, the memory 102, the file system 103, the external input/output section 104, and the video signal output section 105 which are connected through a bus line.

In the host apparatus 100 and the information terminal 1, the external input/output section 104, such as I/O port, and the video signal output section 105 are connected to the data input/output section 2 and the video signal input section 6, respectively. Further, the host apparatus 100 recognizes the information terminal 1 as an external file system. Note that, swap data, bit image data, and other data of the memory 102 can be transmitted through a transmission line from the memory 102 of the host apparatus 100 to the information terminal 1.

In the host apparatus 100, an OS kernel operates. Further, in the host apparatus 100, the processor 101 executes a program loaded to the memory 102 from the file system 103. This program has a structure of calling a subroutine from a main routine. In the program, to dynamically load a code that is a substance of a subroutine at the time of execution, a storage location of the code, i.e. file system and file name is set in advance as link information. Therefore, in the program of the host apparatus 100, inside the link information, the file information storage section 4 of the information terminal 1 is set in advance as a file system storing therein a library containing subroutines.

In the present embodiment, the foregoing program executed by the host apparatus 100 is a program presenting a graphic user interface which controls the host apparatus 100, and provides an instruction for drawing a component making up the screen by calling a subroutine.

Note that, the link information may be set so as to be changeable. That is, the host apparatus 100 may include a link information setting section (link setting means) (not shown) which sets the information terminal 1 as a storage file system storing therein the library containing subroutines in the link information. The setting of the link information may be realized as a program processing, or may be realized by selecting a file system storing therein a library to have a link with from among file systems, at the time of preparing the program.

With this arrangement, by changing the link information, it is possible to change a destination device to which data are to be transmitted. For example, upon receipt of information for starting operation of the host apparatus 100 from the information terminal 1, the link information setting section may set the link information in the file information storage section 4 of the information terminal 1.

Next, referring to FIGS. 23 through 26, processing of data transmission between the host apparatus 100 and the information terminal 1 will be described in detail.

Note that, the following description referring to FIGS. 23 through 26 will be given by taking the case when the program calls a pattern drawing subroutine from a main routine, as an example. However, a data transmitting method according to the present invention is applicable to any subroutine. Further, a code of the main routine illustrated in FIG. 23 is a simulated code for explanation and actually varies depending upon a processor, an OS, a programming language, and others.

Figure 23:
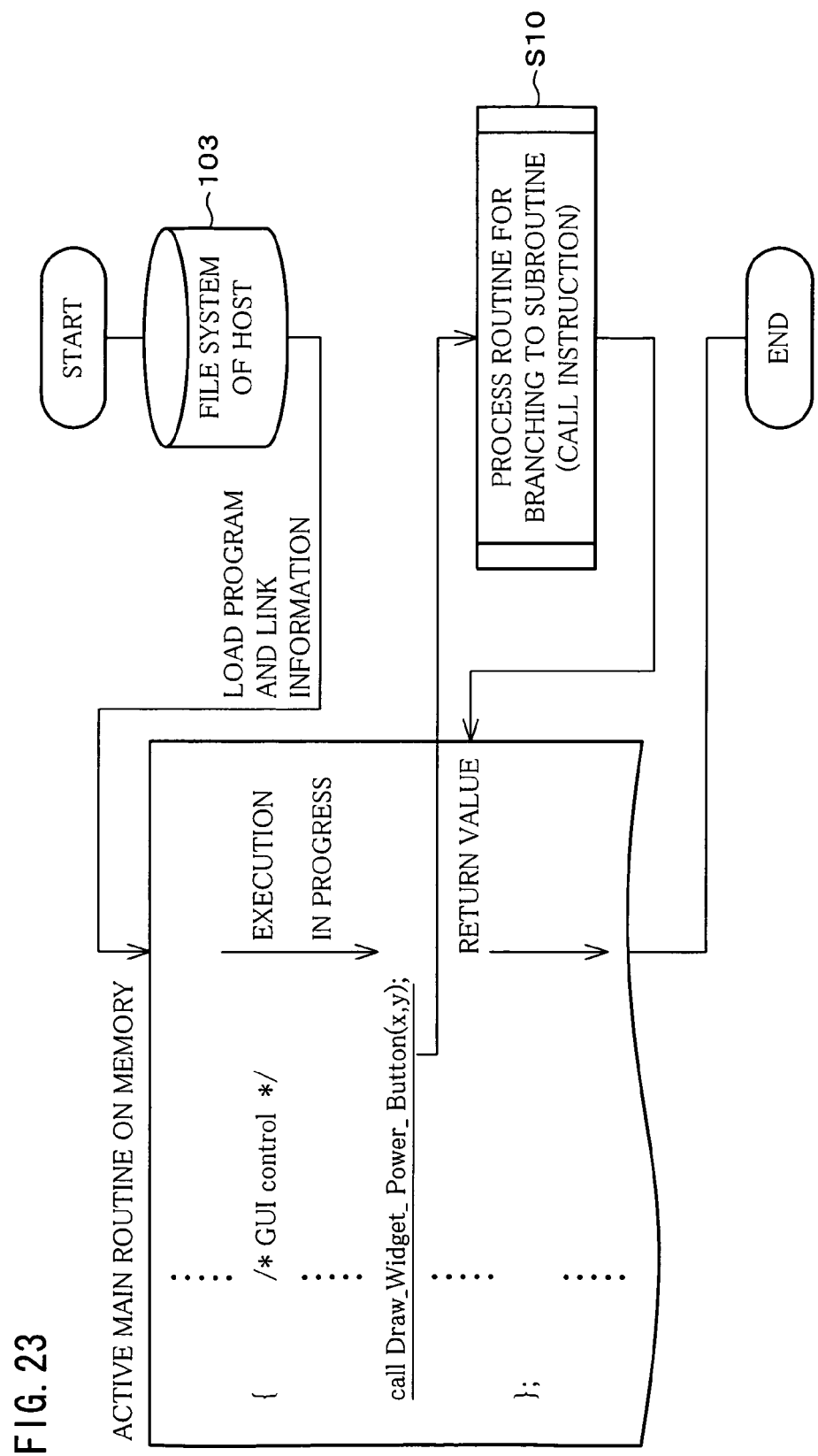
FIG. 23 is a schematic diagram illustrating processing of a program in the host apparatus illustrated in FIG. 22.

As illustrated in FIG. 23, the host apparatus 100 first loads a main program and the link information from the file system 103 to the memory 102 and sequentially executes them (program execution process). This program is a program for causing the information terminal 1 to present a GUI and causing the user to operate the host apparatus 100 using the GUI. Further, in this program, an instruction for drawing a pattern of the GUI is executed by calling a subroutine. This subroutine is designed such that at the time of executing the subroutine, a code that is a substance of this subroutine (the code is contained inside a software module file (library) which is stored in a file system) is dynamically loaded from the file system specified by the link information.

When executing a process of calling a subroutine process during execution of the foregoing program, the host apparatus 100 branches to the subroutine handling (S10). Note that, this subroutine handling will be described in detail later. Then, upon completion of handling the subroutine, the host apparatus 100 returns to the main routine and executes the program.

Figure 24:
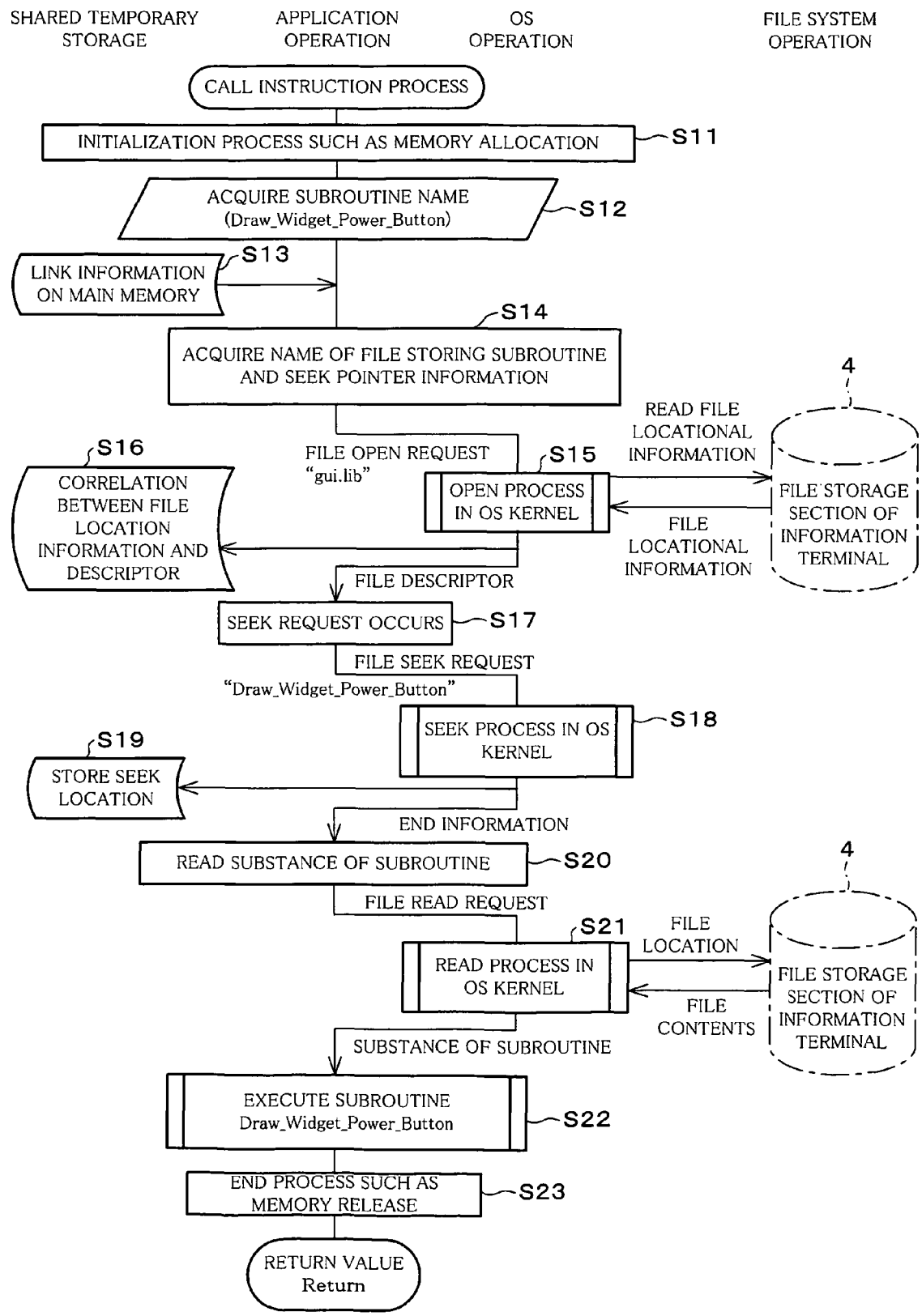
FIG. 24 is a flowchart illustrating processing of a subroutine in the host apparatus illustrated in FIG. 22.

Next, referring to FIG. 24, the following will describe a process of handling a subroutine called by the main routine in the host apparatus 100. Note that, this process is performed by the application program and the OS kernel. The steps S12 through S21 are equivalent to a substitution code acquisition process.

In call instruction process, an initialization process such as memory allocation for the subroutine is performed (S11). Then, a subroutine name, "Draw_Widget_Power_Button", is acquired (S12). Further, the link information having been loaded together with the program (main routine) from the memory 102 is acquired (S13). Next, a name of a file storing therein a subroutine, "gui.lib", and seek pointer information are acquired (S14). Thereafter, the application issues an open request of a library file "gui.lib" to the OS kernel.

Next, the OS kernel processes the open request of the library file "gui.lib" (S15). Specifically, the OS kernel having received the file open request instructs the file system specified by the link information to read out file location information, and acquires the file location information. Thereafter, the OS kernel stores in the memory 102 a correlation between the file location information on the location of the target library file and a file descriptor that can algebraically handle the file location information (S16).

Here, in Step S15, if the link information has been set in the file information storage section 4 of the information terminal 1, at the time when the OS kernel opens the file, the host apparatus 100 requests the I/O emulation section 11 to read out the file location information. In response to this request, the I/O emulation section 11 emulates so that the file information storage section 4 operates as a file system of the host apparatus 100, and then returns the file location information (emulation process).

Further, if the link information has been set in the file information storage section 4 of the information terminal 1, the OS kernel acquires the library file from the external file information storage section 4. On the other hand, if the link information is set in the file system 103 of the host apparatus 100, the OS kernel acquires the library file from the internal file system 103.

Next, using the file descriptor, the application issues a file seek request of a module "Draw_Widget_Power_Button" to the OS kernel (S17). In response to this file seek request, the OS kernel performs a seek process (S18), and stores a seek location in the memory 102 (S19).

Next, using the seek location, the application issues a file read request for reading a substance of the module "Draw_Widget_Power_Button" of the subroutine, to the OS kernel (S20).

Subsequently, the OS kernel handles the file read request of the module "Draw_Widget_Power_Button" of the subroutine (S21). Specifically, the OS kernel having received the file read request reads out data from a storage location of the file information storage section 4, specified by the seek location, and loads the read data into a region of the subroutine in the memory 102.

Here, in Step S21, at the time when the OS kernel reads a file, a file read request is made from the host apparatus 100 to the I/O emulation section 11 of the information terminal 1. In response to this request, the I/O emulation section 11 emulates so that the file information storage section 4 operates as a file system of the host apparatus 100, and then returns the contents of the file (emulation process).

Next, the application executes a code of the subroutine "Draw_Widget_Power_Button" in the memory 102 (S22), and when the code execution is completed, the application performs an ending process such as memory release and returns to the main routine (S23).

As explained referring to FIG. 18, the code that the OS kernel acquires from the file information storage section 4 in the Step S21 is stored as the substitution code 4a in advance so as to be read out upon specification of the library file name "gui.lib" and the subroutine name "Draw_Widget_Power_Button".

Further, if the subroutine is the one requiring data transmission from the host apparatus 100 to the information terminal 1, the contents of the code is a program that the host apparatus 100 writes the input data 4b into the file information storage section 4 of the information terminal 1, and if the subroutine is the one requiring data transmission from the information terminal 1 to the host apparatus 100, the contents of the code is a program that the host apparatus 100 reads out the output data 4c in the file information storage section 4 of the information terminal 1.

Figure 25:
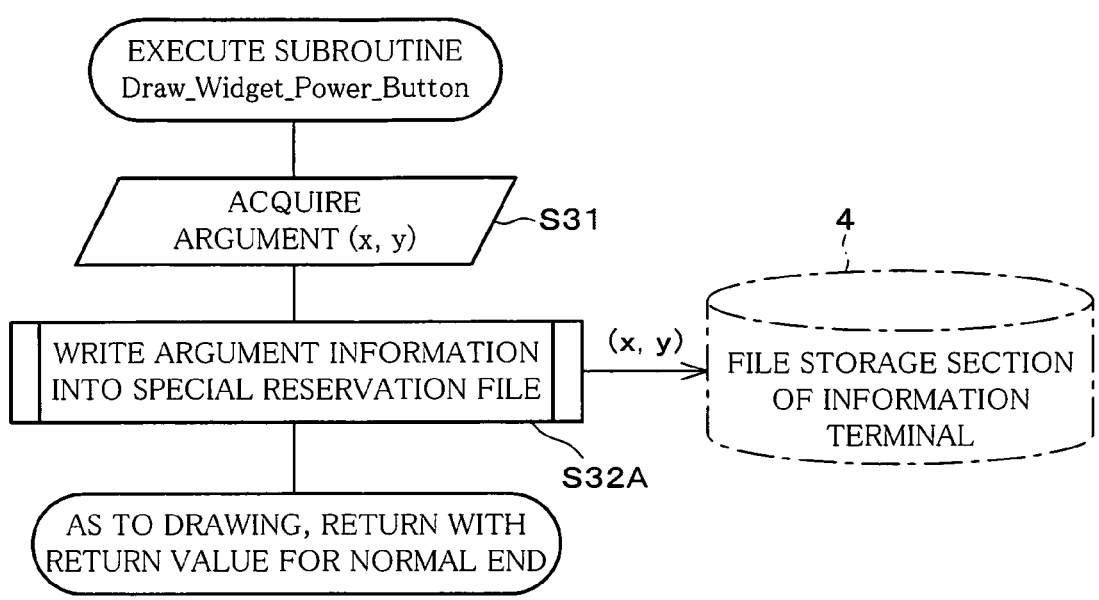
FIG. 25 is a flowchart illustrating processing of a subroutine in the host apparatus illustrated in FIG. 22.

For example, FIG. 25 is a flowchart showing the steps for handling the patter drawing subroutine "Draw_Widget_Power_Button" called in the GUI program in accordance with the code having been read out from the file information storage section 4.

In this case, the subroutine first acquires information (x, y), which is a parameter of pattern drawing, including a drawing position of a pattern and a pattern size from the memory 102 (S31). Next, the information (x, y) is written into a special reservation file (input data 4b) in the file information storage section 4 of the information terminal 1 (S32A). Then, after completion of writing of the information (x, y), as to drawing, return to the main routine is carried out with a return value for normal end.

Note that, the information (parameter) to be transmitted may be provided as an argument of the subroutine "Draw_Widget_Power_Button" or stored in a reference-possible region in the memory 102 or the file system 103.

Further, the code read out as a substance of the subroutine (substitution code 4a) does not contain a code for practical drawing. As will be described later, this is because the information terminal 1 includes the GUI processing unit 5 which performs pattern drawing in accordance with the pattern specifying code identified from a library name and a subroutine name.

Further, the above processing of the subroutine may be performed to not only the subroutine "Draw_Widget_Power_Button" but also all pattern drawing subroutines in the GUI program. That is, a code to be acquired from the information terminal 1 that is an external file system may be of the same code sequence in all subroutines. As a result, since there are no differences in a substance of the code among the called various subroutines, the host apparatus 100 performs the same processing (e.g. transmission of an argument).

Therefore, for the information terminal 1, pattern drawing is realized with simply writing the argument into the input data 4b by execution of the code of the substitution by the host apparatus since the pattern drawing process starts when the host apparatus 100 reads out the code of the subroutine.

Figure 26:
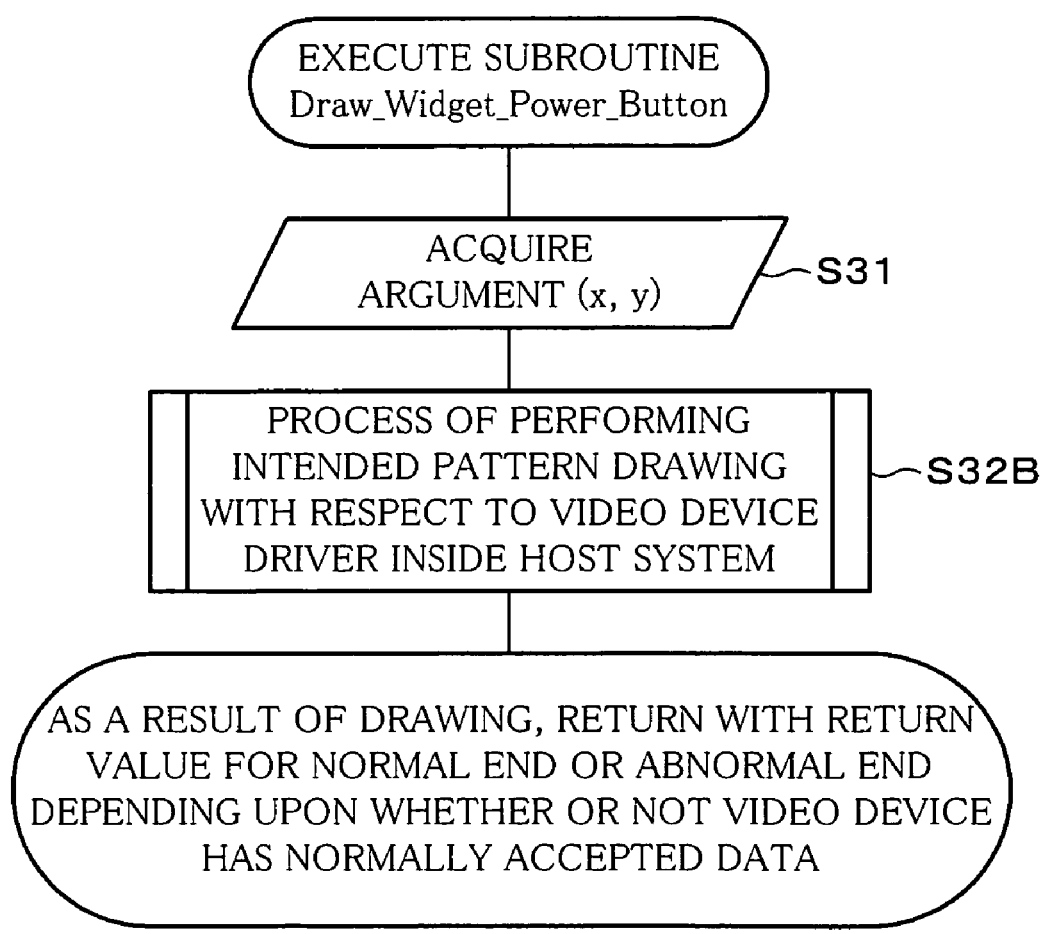
FIG. 26 is a flowchart illustrating processing of a subroutine in the host apparatus illustrated in FIG. 22.
Figure 27:
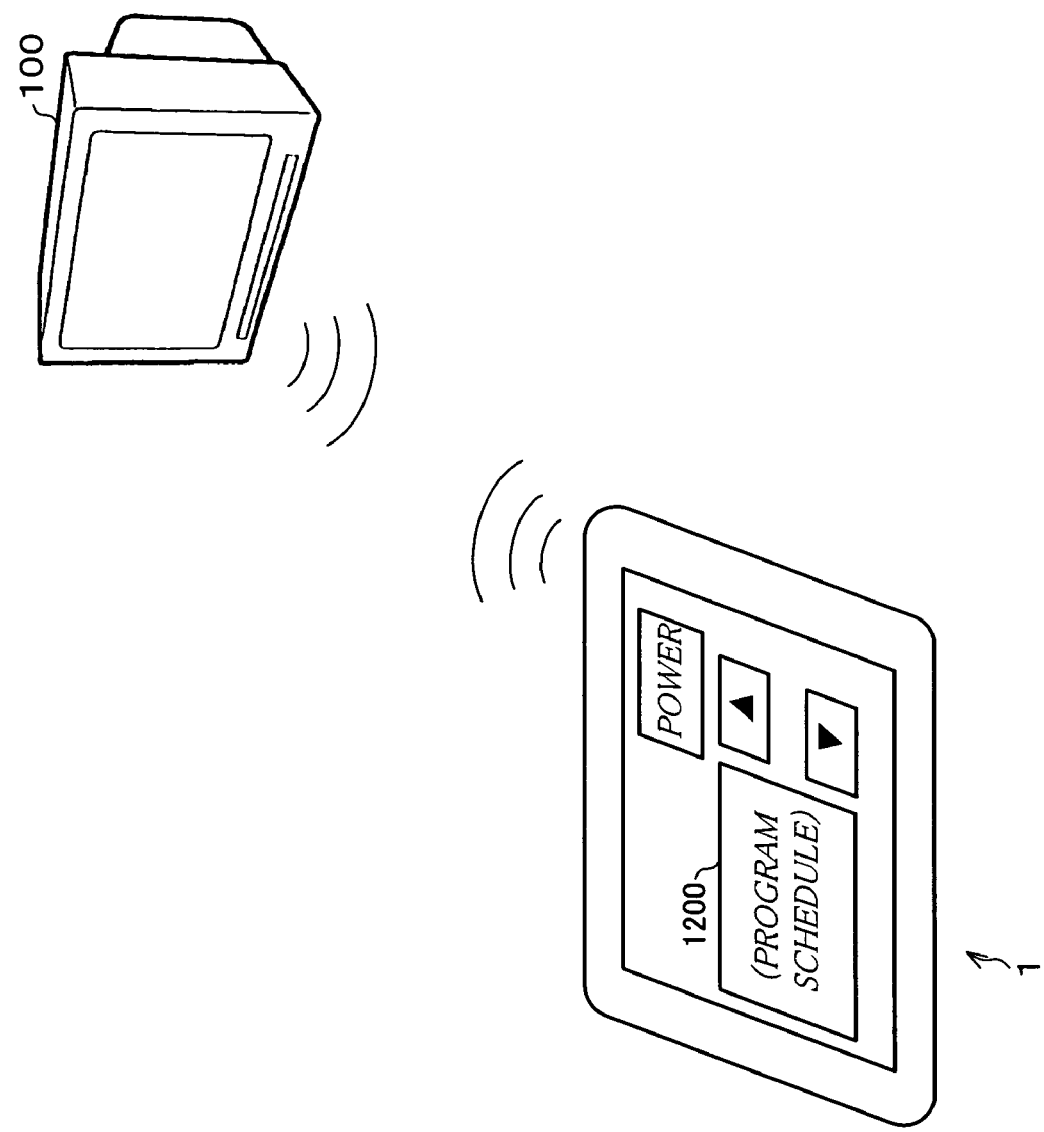
FIG. 27 is an explanatory view illustrating an example of applying the host apparatus illustrated in FIG. 22 and the information terminal illustrated in FIG. 18 to a television set and a remote controller, respectively.
Figure 28:
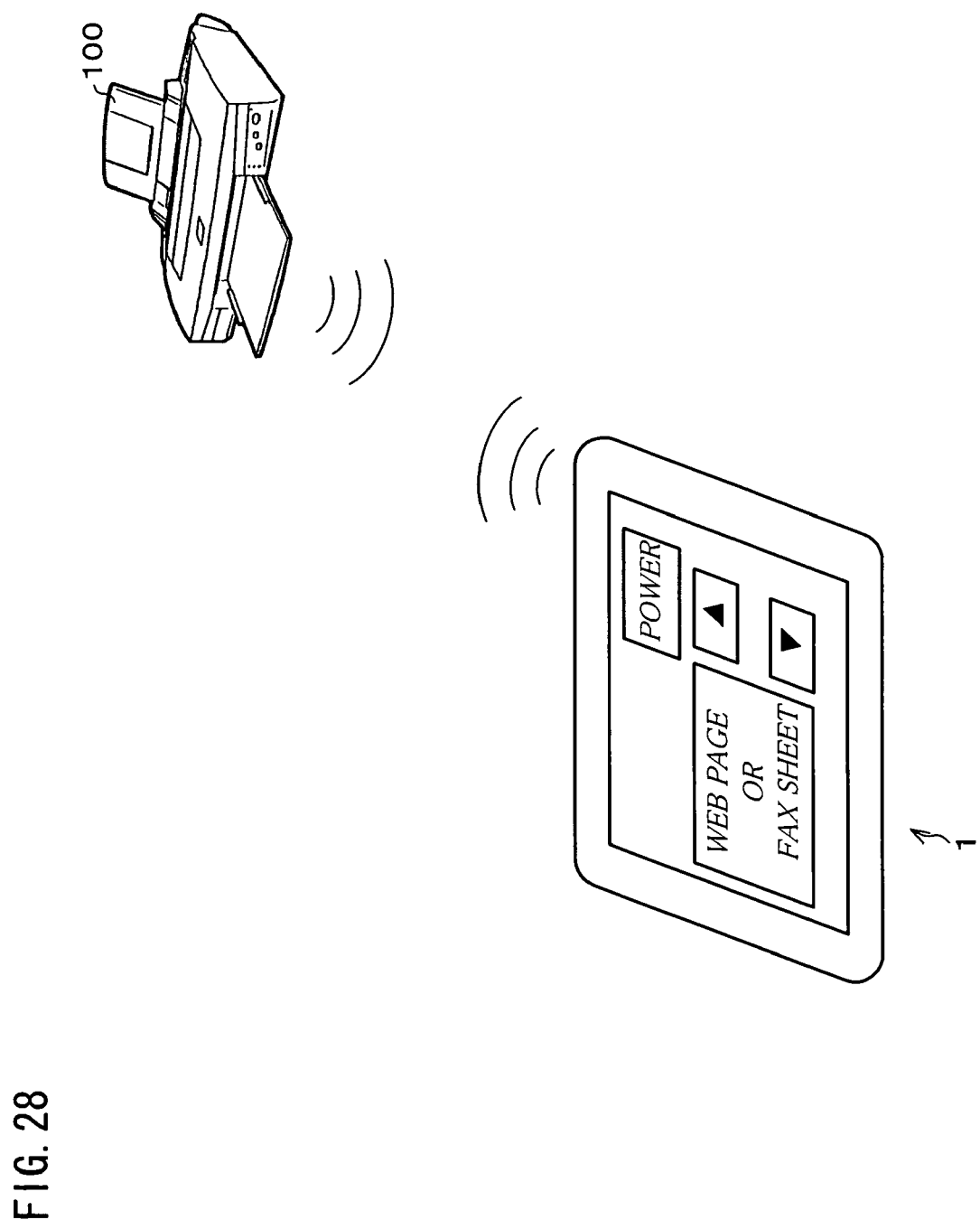
FIG. 28 is an explanatory view illustrating an example of applying the host apparatus illustrated in FIG. 22 and the information terminal illustrated in FIG. 18 to a facsimile machine and a remote controller, respectively.

Meanwhile, FIG. 26 is a flowchart showing the steps for handling the pattern drawing subroutine "Draw_Widget_Power_Button" called in the GUI program in accordance with the code read out from the file system 103 inside the host apparatus 100.

In this case, the application first acquires information (x, y), which is a parameter of pattern drawing, including a drawing position of a pattern and a pattern size from the memory 102 (S31). Next, using the information (x, y), an intended pattern drawing is performed with respect to a video device driver inside a system of the host apparatus 100 (S32B). Then, after completion of the pattern drawing, return to the main routine is carried out with a return value for normal end or abnormal end depending upon whether or not a video device driver has normally accepted a drawing processing.

Here, in the GUI drawing processing in the information terminal 1 illustrated in FIG. 25, operation of fully and normally completing GUI drawing inside the information terminal 1 is validated and assured in advance, which brings the effect of significantly reducing a software design error and a system trouble that would be caused when the GUI drawing is introduced into the host apparatus 100 as illustrated in FIG. 26.

Note that, information (parameter) to be transmitted may be provided as an argument of the subroutine "Draw_Widget_Power_Button" or stored in a reference-possible region in the memory 102 or the file system 103. This arrangement is the same as that in FIG. 25.

Further, the code read out as a substance of the subroutine contains a code for practical drawing. Therefore, in the case where a code is acquired from the internal file system 103, a code sequence and the contents of processing vary from one subroutine to another.

Thus, if the link information has been set in the file information storage section 4 of the information terminal 1, the OS kernel acquires the library file from the external file information storage section 4. On the other hand, if the link information has been set in the file system 103 of the host apparatus 100, the OS kernel acquires the library file from the internal file system 103. Therefore, depending upon the link information, it is selected whether reading is performed from the file system of the host apparatus 100 or from the external storage device, e.g. the storage device of the information terminal 1, but the same program can be used.

Further, if the subroutine called in the program of the host apparatus 100 is the one requiring data transmission from the information terminal 1 to the host apparatus 100, the application reads out the output data 4c in the file information storage section 4 to use it as a return value of the subroutine or to store it in a reference-possible region of the memory 102 or the file system 103.

Further, if the code is acquired from the information terminal 1 that is an external file system, the code sequence may be the same in all of the subroutines which acquire data. As a result, although the called subroutines are different, each of the subroutines has substantially the same code, so that the same processing is performed in the host apparatus 100.

The following will describe application examples of the present invention with reference to FIG. 18 and FIGS. 27 through 41

As illustrated in FIG. 18, the GUI processing unit 5 of the information terminal 1 includes the automatic placement adjustment section (pattern adjustment means and reverse converting means) 51, a pattern display processing section (pattern display processing means) 52, a pattern storage section (pattern storage means) 53, and a position sensor section (position sensing means) 54. Note that, each of the processing sections in the GUI processing unit 5 may be contained as a circuit in the information terminal 1.

The automatic placement adjustment section 51 performs changes in pattern position and pattern size of the GUI component in accordance with a function of an apparatus to be controlled (host apparatus 100) and notification information. Specifically, the automatic placement adjustment section 51 performs pattern placement adjustment in accordance with a predetermined rule to place similar information at a similar position on various display screens so that the user can intuitively know the information. Incidentally, in the information terminal 1, the operation of the automatic placement adjustment section 51 can be selected so that the component is placed as the host apparatus 100 specifies without changes in position and size of the component. Note that, a specific processing of the automatic placement adjustment section 51 will be described in detail later.

The pattern display processing section 52 extracts image data of the component from the pattern storage section 53 in accordance with a signal (specification code) supplied from the automatic placement adjustment section 51, and outputs a display signal for displaying on the display panel 71. Note that, a specification code for specifying a pattern to be displayed is set to be of a sufficiently short data length, compared to length of drawing data of a pattern. Further, the pattern display processing section 52 can display the pattern on the display panel 71 at any position.

The pattern storage section 53 stores therein drawing data of a pattern that is a GUI component. For example, the patter storage section 53 stores therein data of drawing component (object), such as an icon, used to perform notification of the host apparatus 100's status and operation entry. Also, the pattern storage section 53 stores therein data of character shape (font).

The position sensor section 54 generates and outputs positional information in accordance with a position input signal from the user, detected by a pointing device (not shown) that the information terminal 1 includes.

Further, the display section 7 of the information terminal 1 includes the display panel 71, a pattern display drive circuit 72, a scanning signal input circuit 73, and a picture display drive circuit 74.

The display panel 71 shows a GUI pattern based on input from the data input/output section 2 and a video signal based on input from the video signal input section 6. For the display panel 71, although a normal display device is available, a LCD (liquid crystal display), especially a thin display panel using CG silicon (continuous-grain silicon) is suitable. Note that, the display panel 71 may be provided with a touch panel as a pointing device on its display surface.

The pattern display drive circuit 72 drives a signal electrode of the display panel 71 in accordance with the display signal generated by the pattern display processing section 52. Further, the picture display drive circuit 74 drives the signal electrode of the display panel 71 in accordance with a video signal received from the video signal input section 6. Meanwhile, the scanning signal input circuit 73 is used for display by the pattern display drive circuit 72 and display by the picture display drive circuit 74.

Thus, in the information terminal 1, the GUI pattern based on input from the data input/output section 2 and the video signal based on input from the video signal input section 6 are independently processed and combined with each other to be displayed on the display panel 71.

Next, a pattern placement adjustment process of the automatic placement adjustment section 51 will be described in detail.

Figure 29:
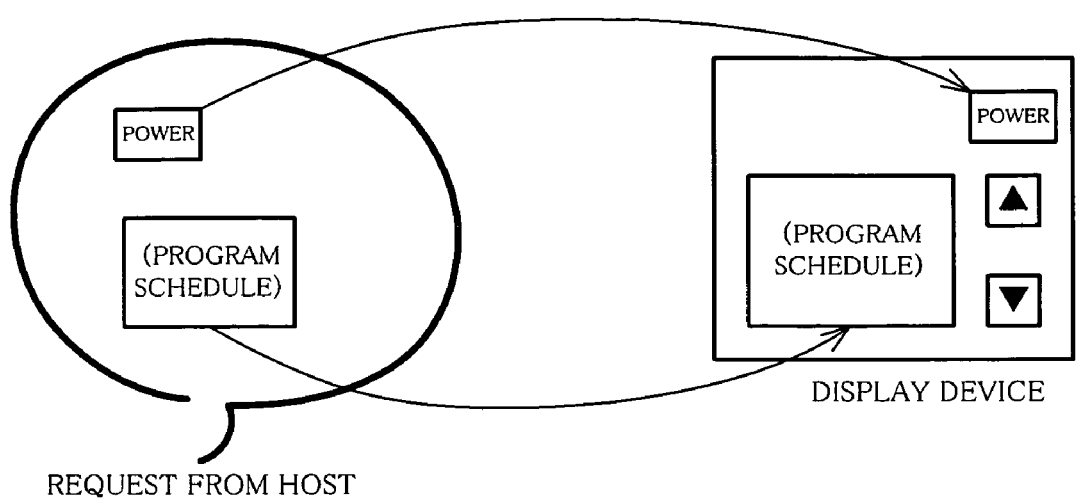
FIG. 29 is an explanatory view illustrating an automatic placement adjustment process of GUI patterns in the information terminal illustrated in FIG. 18.

FIG. 29 is an explanatory view illustrating the case where there is no specification of a pattern position and pattern size by the host apparatus 100.

In this case, the host apparatus 100 provides a drawing instruction of a component (power, program schedule) by calling a subroutine of the component. In the information terminal 1, the I/O emulation section 11 generates an access code sequence, in response to a code read request from the host apparatus 100, and supplies the generated access code sequence to the file allocator activation signal converter 12. The file allocator activation signal converter 12 identifies a component specified by the drawing instruction from the access code sequence, and performs output to a drawing circuit for the component concerned in the GUI processing unit 5 (FIG. 19 and FIG. 20).

In FIG. 29, since there is no specification of pattern position and pattern size by the host apparatus 100, the input data 4b is not written into the file information storage section 4 even when a code of a subroutine is executed. Therefore, the data input/output section 13 outputs an invalid value. Note that, under the circumstance where it is known in advance that a parameter for drawing is not specified in the information terminal 1, a code in which a process of writing to the input data 4b is omitted may be loaded into the host apparatus 100.

Further, respective libraries for a subroutine of specifying the position and size and a subroutine of not specifying the position and size may be used defining by different names. In this case, the file allocator activation signal converter 12 may select a circuit to drive between a circuit for a subroutine of referring to the input data 4b and a circuit for a subroutine of not referring to the input data 4b.

In this regard, in the case of a system where the host apparatus 100 performs all of the drawing processes, a procedure for optimization, such as introduction of no unnecessary subroutines, is necessary to reduce a storage size of the library. On the contrary, the present invention can omit this procedure since the present invention relies on only the file information storage section 4 inside the information terminal 1. Therefore, it is possible to improve design productivity of design for a system constituted by the host apparatus 100 and the information terminal 1.

Thereafter, the timing adjustment section 14 supplies a drawing signal of the component outputted from the file allocator activation signal converter 12 and the parameter (invalid value in FIG. 29) outputted from the data input/output section 13 to the automatic placement adjustment section 51 at an appropriate timing.

Next, the automatic placement adjustment section 51 changes shape and position of the component in accordance with a predetermined rule. The automatic placement adjustment section 51 may perform the change in accordance with a GUI system which the user often uses. Then, the automatic placement adjustment section 51 records a changed position of the component. Here, in FIG. 29, the automatic placement adjustment section 51 places "power" in the top-right of the screen and "program schedule" in the lower part from the center of the screen. Further, the automatic placement adjustment section 51 additionally places scroll buttons on the right side of the screen since "program schedule" is large in size.

Finally, the pattern display processing section 52 generates a display signal with reference to image data from the pattern storage section 53, in accordance with the changed position by the automatic placement adjustment section 51, and performs displays on the display section 7.

Figure 30:
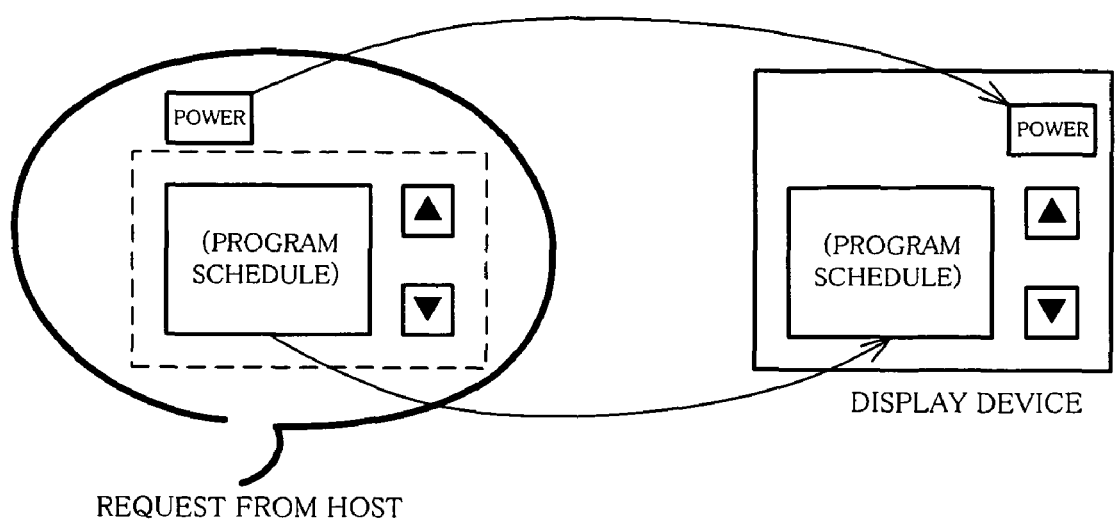
FIG. 30 is an explanatory view illustrating an automatic placement adjustment process of GUI patterns in the information terminal illustrated in FIG. 18.

Next, FIG. 30 is an explanatory view illustrating the case where the host apparatus 100 specifies a pattern size and correlation between some components, but does not specifies a pattern position.

As is the case with FIG. 29, the host apparatus 100 implements a drawing instruction of a component (power, program schedule) by calling a subroutine of the component. In the information terminal 1, a component specified by the drawing instruction from the host apparatus 100 is identified.

In FIG. 30, since the host apparatus 100 specifies the pattern size and the correlation between some components, the host apparatus 100 executes a code of a subroutine and writes a parameter into the input data 4b of the file information storage section 4. Then, the data input section 13 reads out the parameter. Note that, an invalid value is outputted with respect to the parameter that is not specified. Thereafter, the timing adjustment section 14 supplies a drawing signal of the component outputted from the file allocator activation signal converter 12 and the parameter outputted from the data input/output section 13 to the automatic placement adjustment section 51 at an appropriate timing.

Next, the automatic placement adjustment section 51 changes shape and position of the component in accordance with a predetermined rule. The automatic placement adjustment section 51 may perform the change in accordance with a GUI system which the user often uses. Then, the automatic placement adjustment section 51 records a changed position of the component.

Here, in FIG. 30, the automatic placement adjustment section 51 places "power" in the top-right of the screen and "program schedule" in the lower part from the center of the screen. Note that, "program schedule" and "scroll buttons" on the right thereof are placed collectively as one group. Finally, the pattern display processing section 52 generates a display signal and performs displays on the display section 7, which is the same as the arrangement in FIG. 29.

Figure 31:
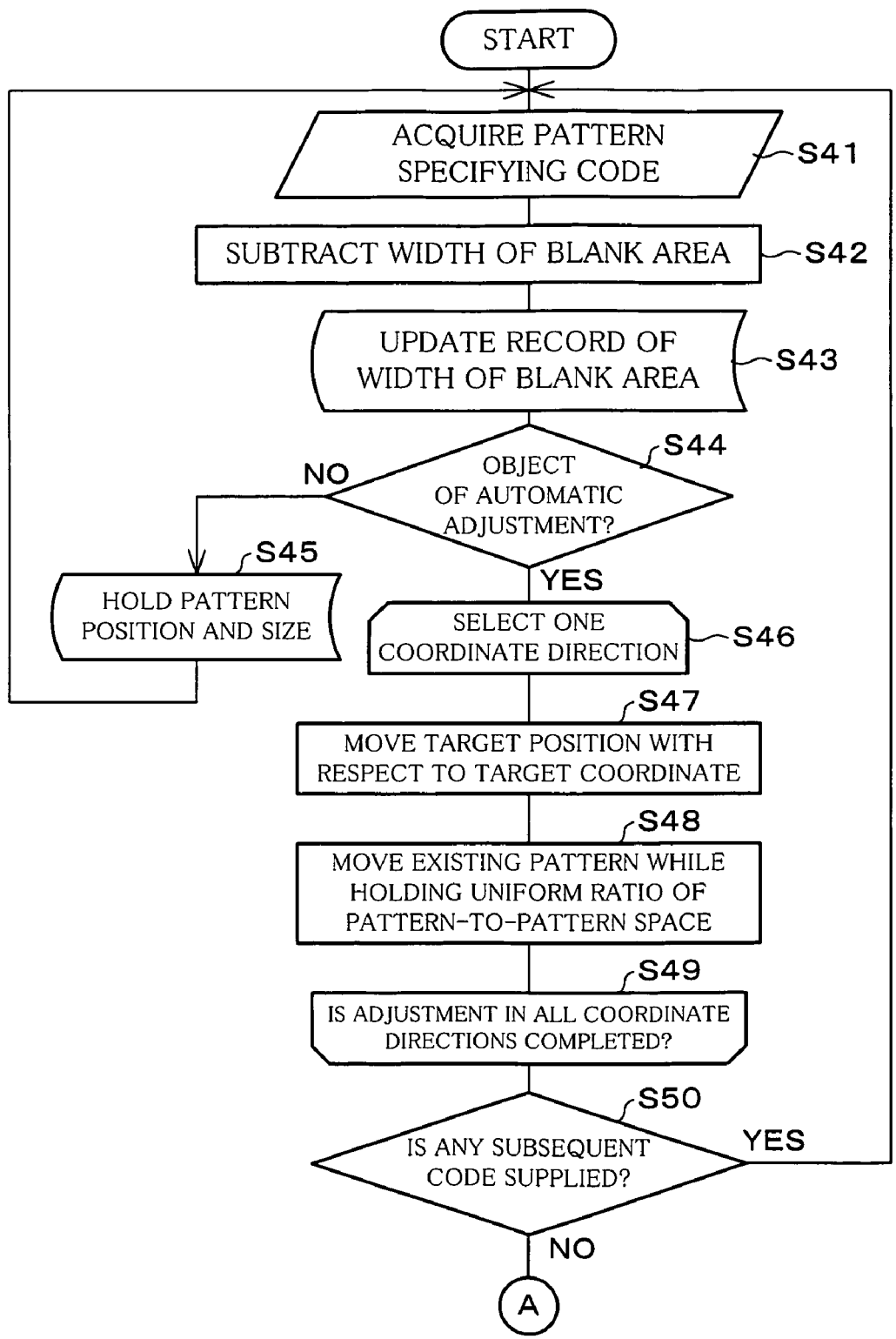
FIG. 31 is a first half of a flowchart of automatic placement adjustment process of GUI patterns in the information terminal illustrated in FIG. 18.
Figure 32:
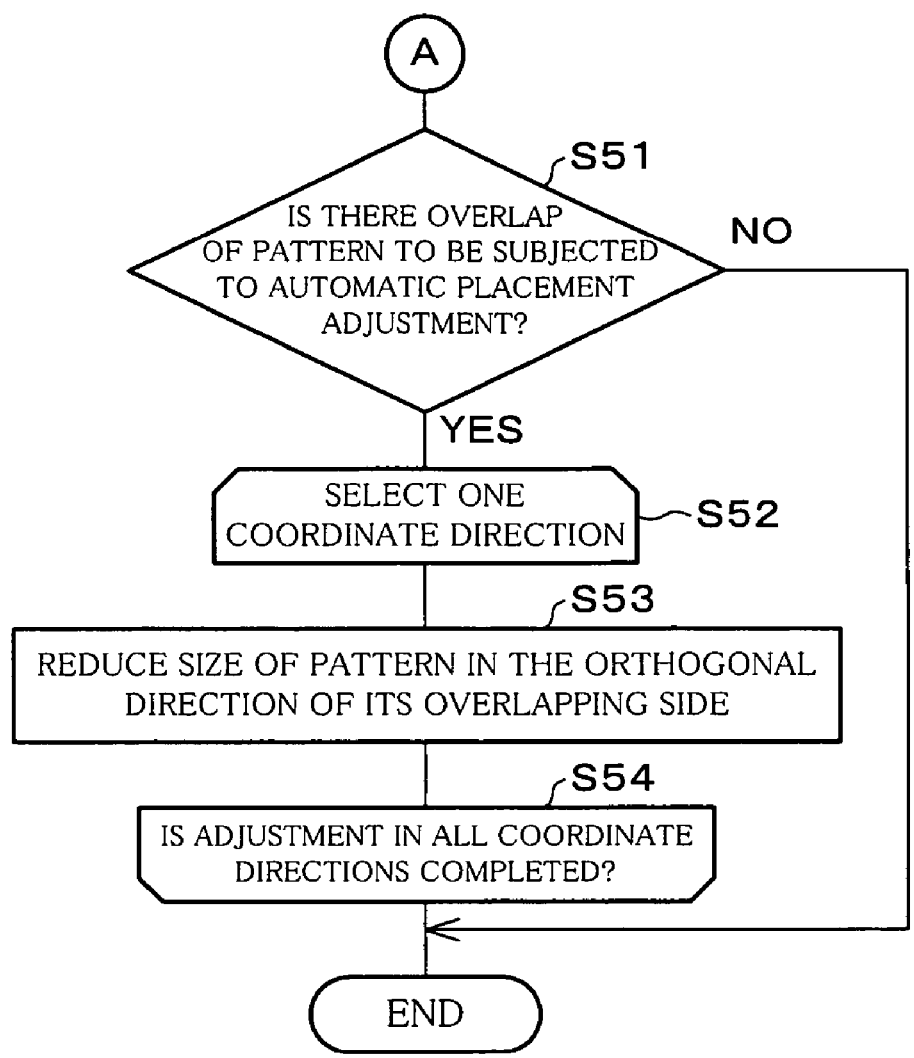
FIG. 32 is a latter half of a flowchart of automatic placement adjustment process of GUI patterns in the information terminal illustrated in FIG. 18.

FIG. 31 and FIG. 32 are flowcharts illustrating the steps for changing the shape and position of the component by the automatic placement adjustment section 51.

First, the pattern specifying code is acquired. Here, the pattern specifying code is an identifier of the component identified from the access code sequence (S41). Further, a width of blank area is subtracted from a full-screen size as an initial value (S42), and a record of the width of blank area is updated (S43). That is, a result of subtraction of a pattern occupying width from the full-screen size is stored. Here, the pattern occupying width is set in advance or is specified by the host apparatus 100.

Next, it is judged whether or not the component to be processed is a pattern to be subjected to automatic adjustment (S44), and if the component is not a pattern to be subjected to automatic adjustment (NO), its pattern position and size are held.

On the other hand, in Step S44, if the component is a pattern to be subjected to automatic adjustment (YES), ① one coordinate direction is selected, ② a target position with respect to a target coordinate is moved, and ③ an existing pattern is moved while holding a uniform ratio of pattern-to-pattern space that is a determined space between patterns (S48). The processes in steps S46 through S48 are repeated until adjustments in all coordinate directions are completed (S49).

Next, if any subsequent code is received (YES), the process goes back to step S41 to handle that code, and if no subsequent code is received (NO), the process goes to step S51.

In step S51, it is judged whether or not there is overlap of a pattern to be subjected to automatic adjustment, and if there is no overlap (NO), automatic adjustment is completed. On the other hand, if there is overlap (YES), ① one coordinate direction is selected (S52), and ② the size of the pattern is reduced in the orthogonal direction of its overlapping side (S53). The processes in these steps S52 and S53 are repeated until adjustments in all coordinate directions are completed (S54).

Note that, in Step S42, in the case where the process of subtracting a width of blank area is realized by hardware, only a signal voltage corresponding to a pattern width should be decreased from a reference voltage.

The following will describe concrete examples of the steps for the automatic placement adjustment section 51 changing the shape and position of the component with reference to FIGS. 33 through 36. Note that, in FIGS. 33 through 36, in the automatic placement adjustment section 51, only the pattern position and shape of "power" is set. That is, in FIGS. 33 through 36, the "power" that the user frequently uses is moved to the position in the top-right of the screen, which is often used by the user, and other components which are not objects of automatic adjustment are appropriately adjusted.

Figure 33:
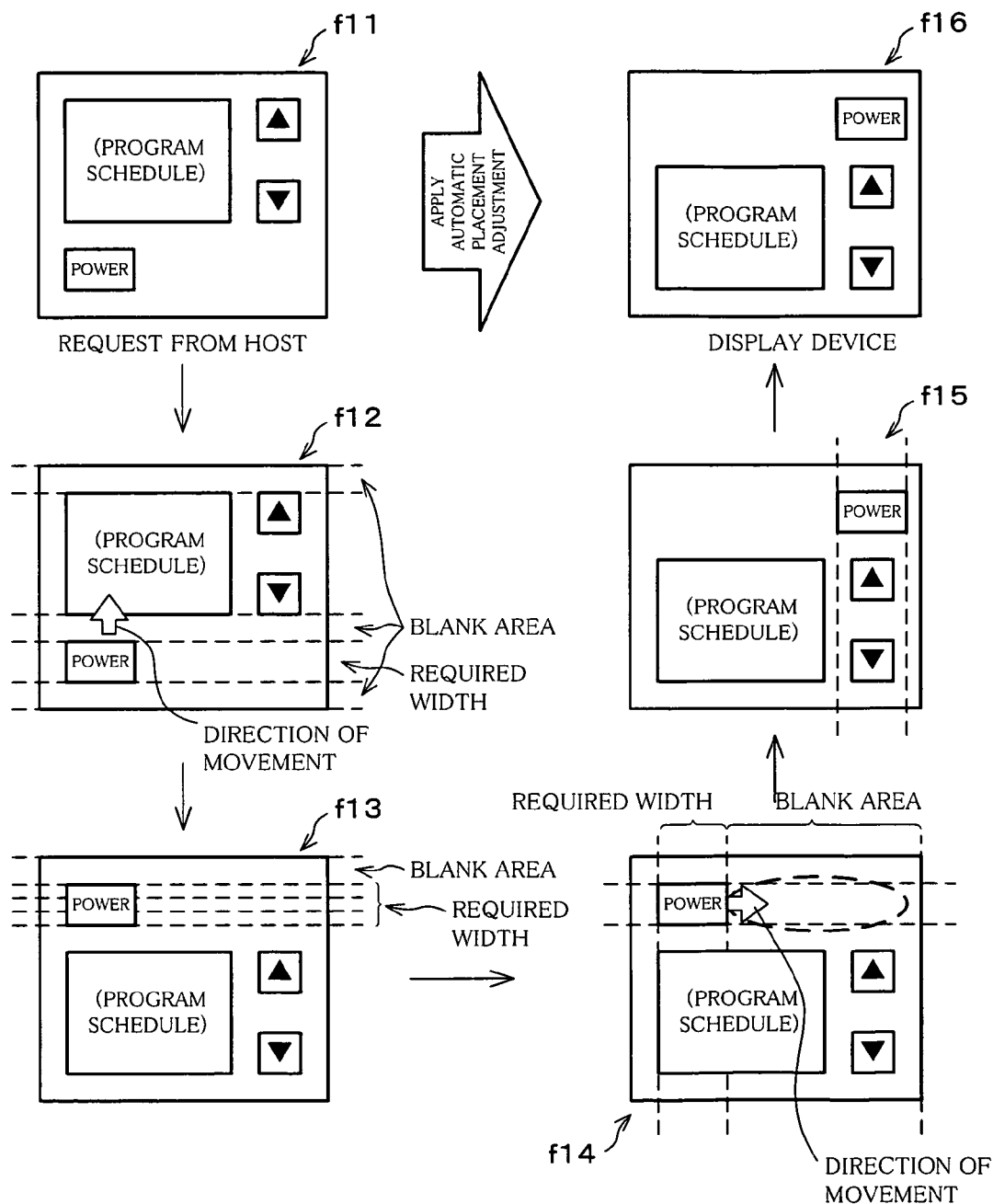
FIG. 33 is an explanatory view illustrating an automatic placement adjustment process of GUI patterns in the information terminal illustrated in FIG. 18.

In FIG. 33, a layout f11 shows a state specified by the host apparatus 100. The automatic placement adjustment section 51 having acquired the layout f11 first selects the longitudinal direction as an adjustment direction, and changes the pattern positions of the "power" and "program schedule" (f12 and f13). Then, the automatic placement adjustment section 51 selects the lateral direction as the adjustment direction and changes the pattern position of the "power" (f14 and f15). This results in change to the state of a target layout f16.

Figure 34:
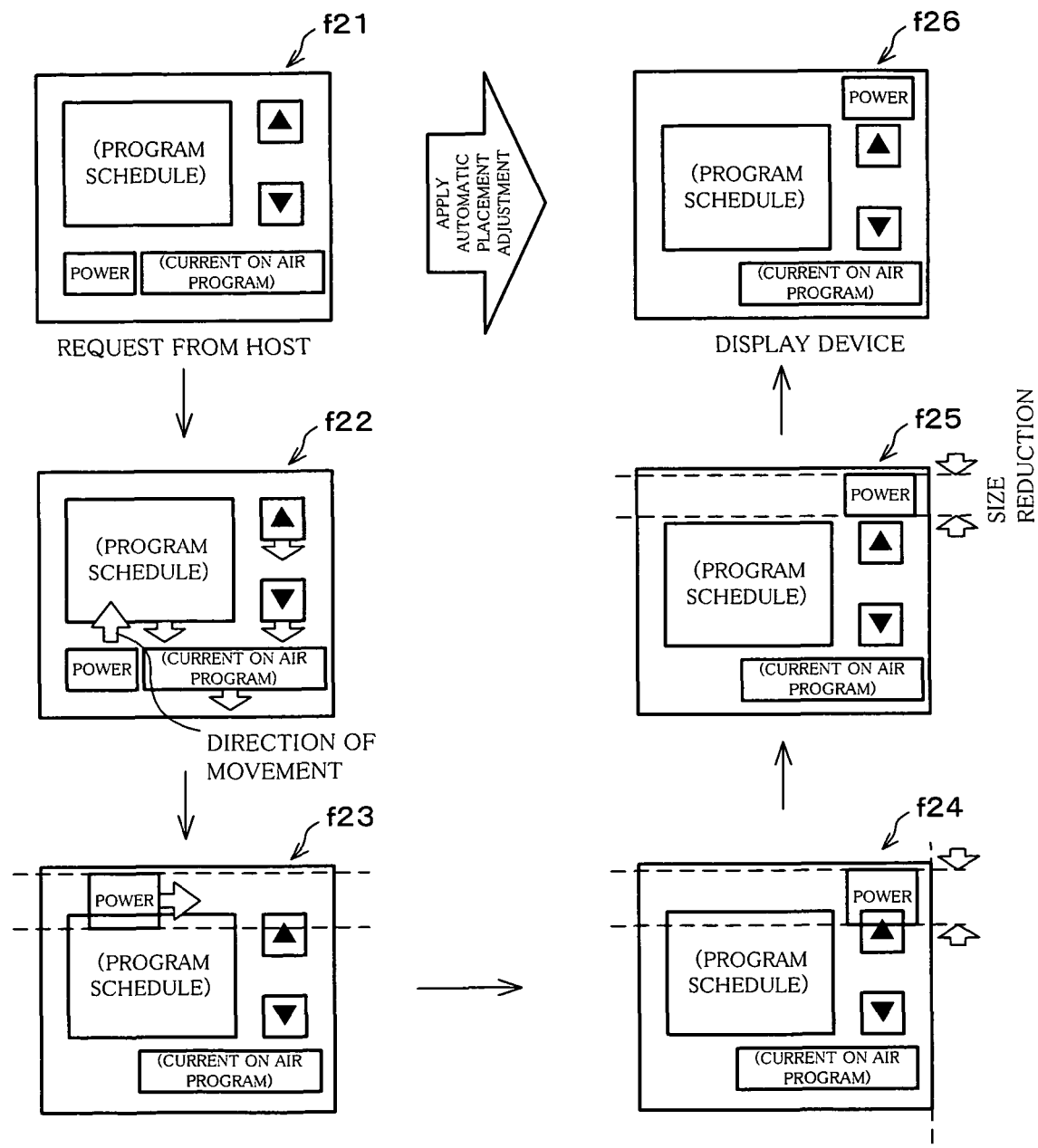
FIG. 34 is an explanatory view illustrating an automatic placement adjustment process of GUI patterns in the information terminal illustrated in FIG. 18.

Next, in FIG. 34, a layout f21 shows a state specified by the host apparatus 100. The automatic placement adjustment section 51 having acquired the layout f21 first selects the longitudinal direction as an adjustment direction, and moves the pattern of "power" upward and moves the patterns of "program schedule" and "current on air program" downward (f22 and f23). Then, the automatic placement adjustment section 51 selects the lateral direction as the adjustment direction and changes the pattern position of "power" (f24). In the layout f24, the pattern of "program schedule" cannot be moved downward since the pattern of "current on air program" exists. This causes overlap of the patterns of "program schedule" and "power". Then, the automatic placement adjustment section 51 reduces the size of the pattern of "power" in the longitudinal direction (f25) to bring close to the target layout f16 (f26).

Figure 35:
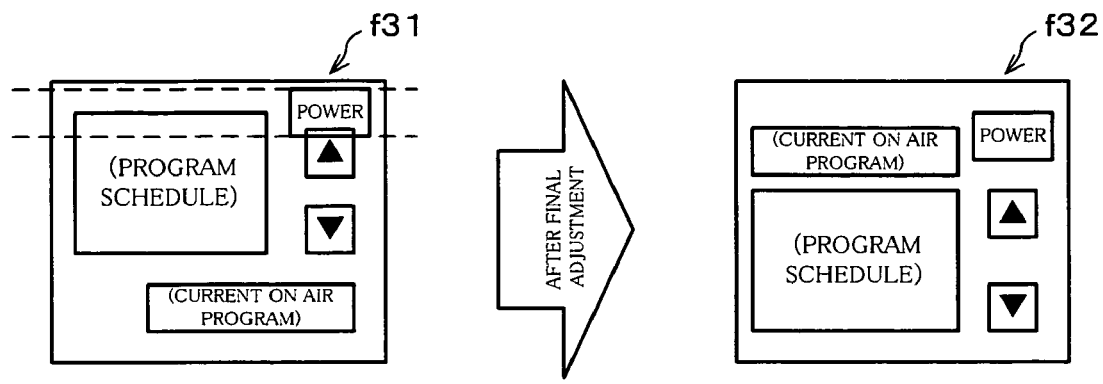
FIG. 35 is an explanatory view illustrating an automatic placement adjustment process of GUI patterns in the information terminal illustrated in FIG. 18.

Next, a layout f31 in FIG. 35 is the same as the layout f24 in FIG. 34. Also, the automatic placement adjustment section 51 can move the pattern of "current on air program" since there is blank area in the top-left of the layout f31. This enables change to a target position, without reduction of the pattern size of the "power" (f32).

Figure 36:
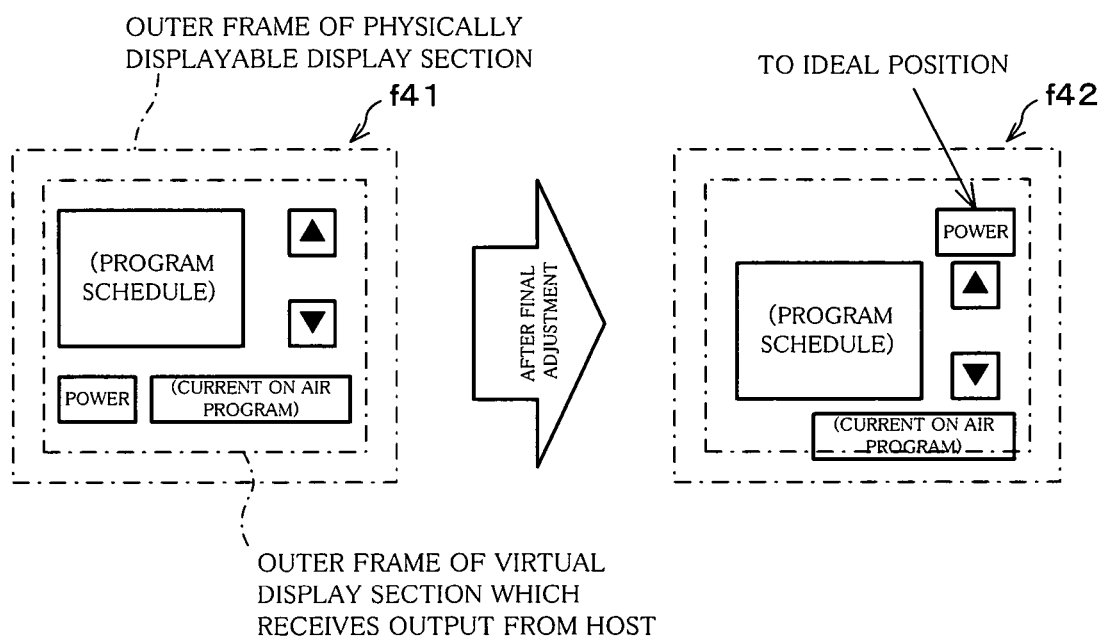
FIG. 36 is an explanatory view illustrating an automatic placement adjustment process of GUI patterns in the information terminal illustrated in FIG. 18.

Further, as illustrated in FIG. 36, the display panel 71 has a virtual display-allowed area which allows drawing by the host apparatus 100, set in a physically displayable area (f41). Normally, a pattern is not displayed outside the display allowed area. However, as a result of pattern placement by the automatic placement adjustment section 51, if the pattern extends off the display allowed area to the displayable area, the display section 7 performs display of a pattern in displayable area. This realizes displays in consonance with a request from the host apparatus 100 wherever possible, without size reduction of patterns.

Thus, the display panel 71 is provided with an area that is reserved for placement adjustment (reserved area), whereby the automatic placement adjustment section 51 can perform pattern placement adjustment using this reserved area at the time of placing similar information at a similar position according to a GUI system that the user often uses.

Further, the automatic placement adjustment section 51 may store positional information of the pattern, corresponding information on an original pattern position to information on a changed pattern position after adjustment. With this arrangement, the automatic placement adjustment section 51 performs reverse conversion with respect to positional information entered by the user via a pointing device, detected by the position sensor section 54, to reverse the changed pattern position to the original pattern position specified by the host apparatus 100. Therefore, when the data output section 15 stores the reverse-converted positional information as the output data 4*c* in the file information storage section 4, pointing information of the user can be transmitted to the host apparatus 100.

Figure 37:
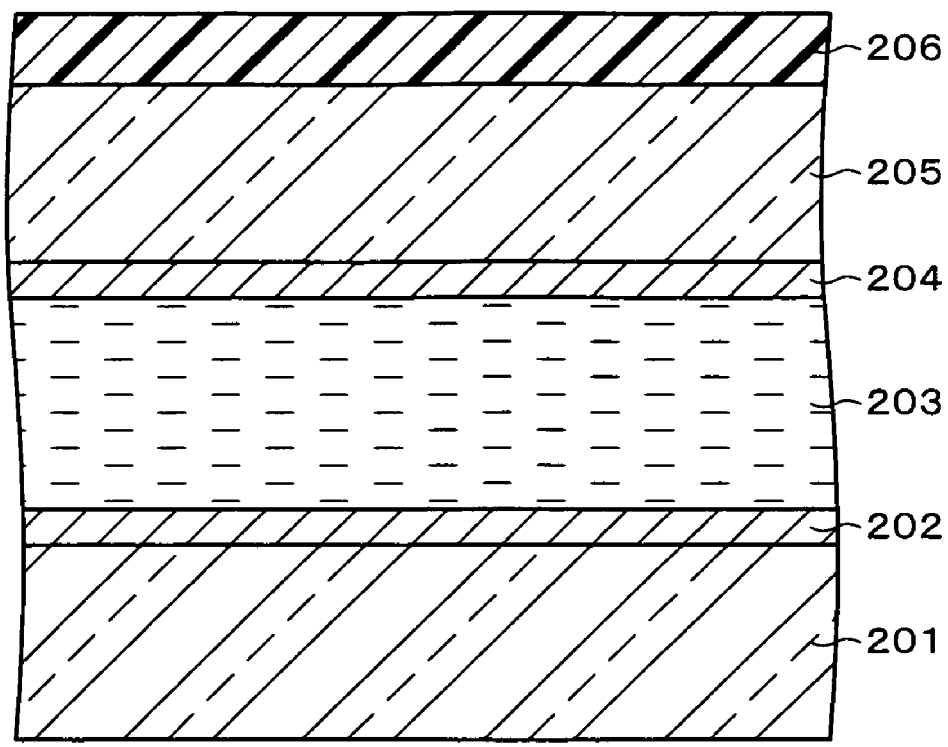
FIG. 37 is a cross-sectional view of a liquid crystal display panel using CG silicon.

Next, FIG. 37 is a cross-sectional view of a liquid crystal display panel using CG silicon (continuous-grain silicon). As illustrated in FIG. 37, the above liquid crystal display panel includes a glass plate 201, a circuit forming film 202, a liquid crystal layer 203, a counter electrode film 204, a glass plate 205, and a polarizing plate 206 which are stacked in order. On the circuit forming film 202, a TFT and its peripheral circuitry are provided. Further, the circuit forming film 202 is made of CG silicon.

Since CG silicon is used for the circuit forming layer 202, the foregoing liquid crystal display panel can have drive circuits provided on a substrate that forms liquid crystal pixels. This realizes a thin display panel, which is suitable for the display panel 71 of the information terminal 1.

Figure 38:
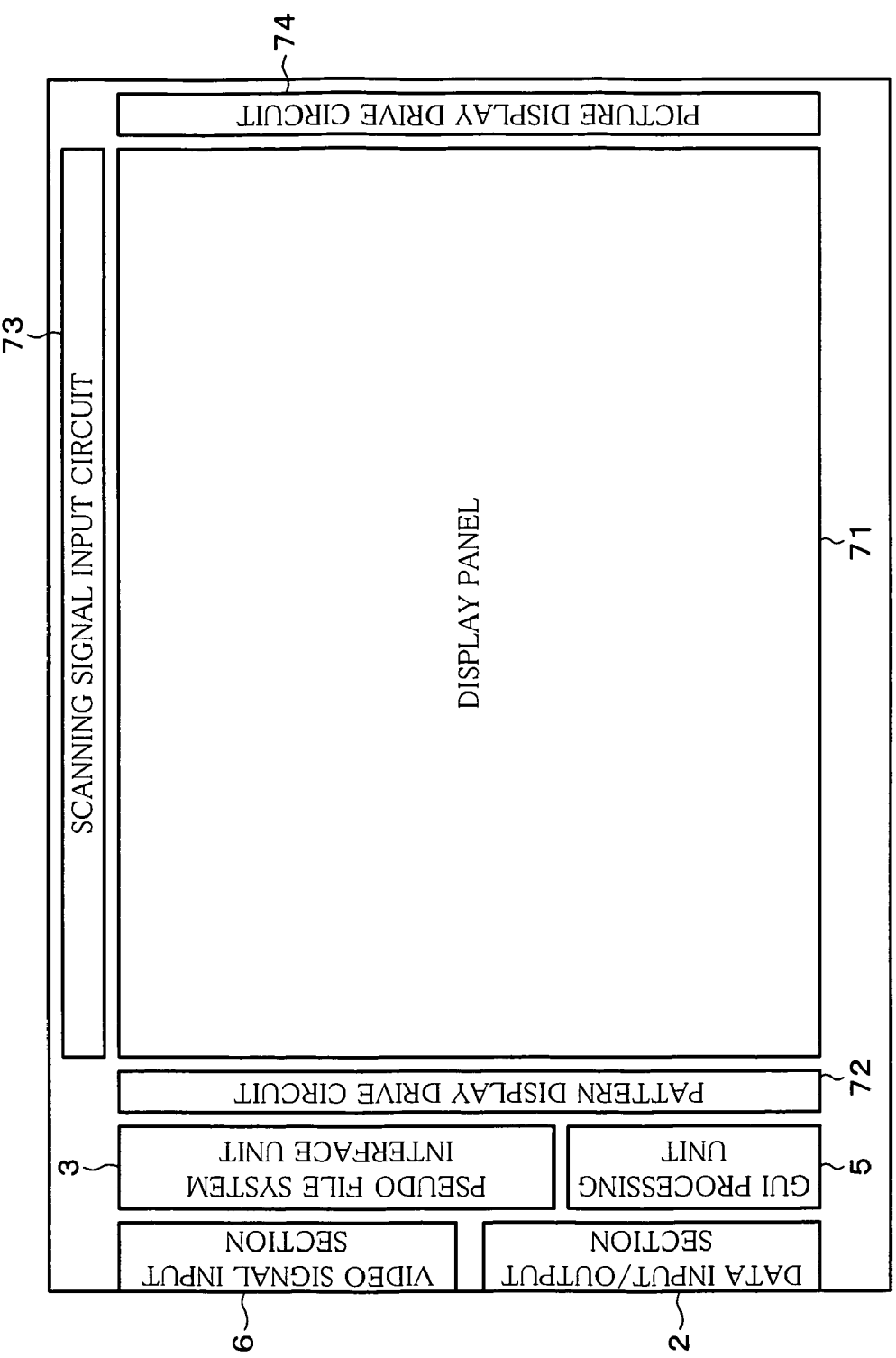
FIG. 38 is an explanatory view illustrating an example of how circuits are provided in the information terminal illustrated in FIG. 18.

Further, as illustrated in FIG. 38, the information terminal 1 may have varying combinations or all of the pseudo file system interface unit 3, the GUI processing unit 5, a group of drive circuits in the display section 7, the data input/output section 2, and the video signal input section 6 directly provided on the conductor or semiconductor thin film of the display panel 71.

With this arrangement, in the case where the information terminal 1 is served as a remote controller or the like, the information terminal 1 can be an extremely thin card-type remote controller having a high-level interface function.

In the display section 7 of the information terminal 1, a display signal for displaying a pattern is generated independently from a video signal supplied from the video signal input section 6, and thereafter is combined with the video signal inside the display panel 71. Note that, a "driver" in FIGS. 39 through 41 is hardware for driving a pixel and is irrelevant to the device driver (software) described earlier.

Figure 39:
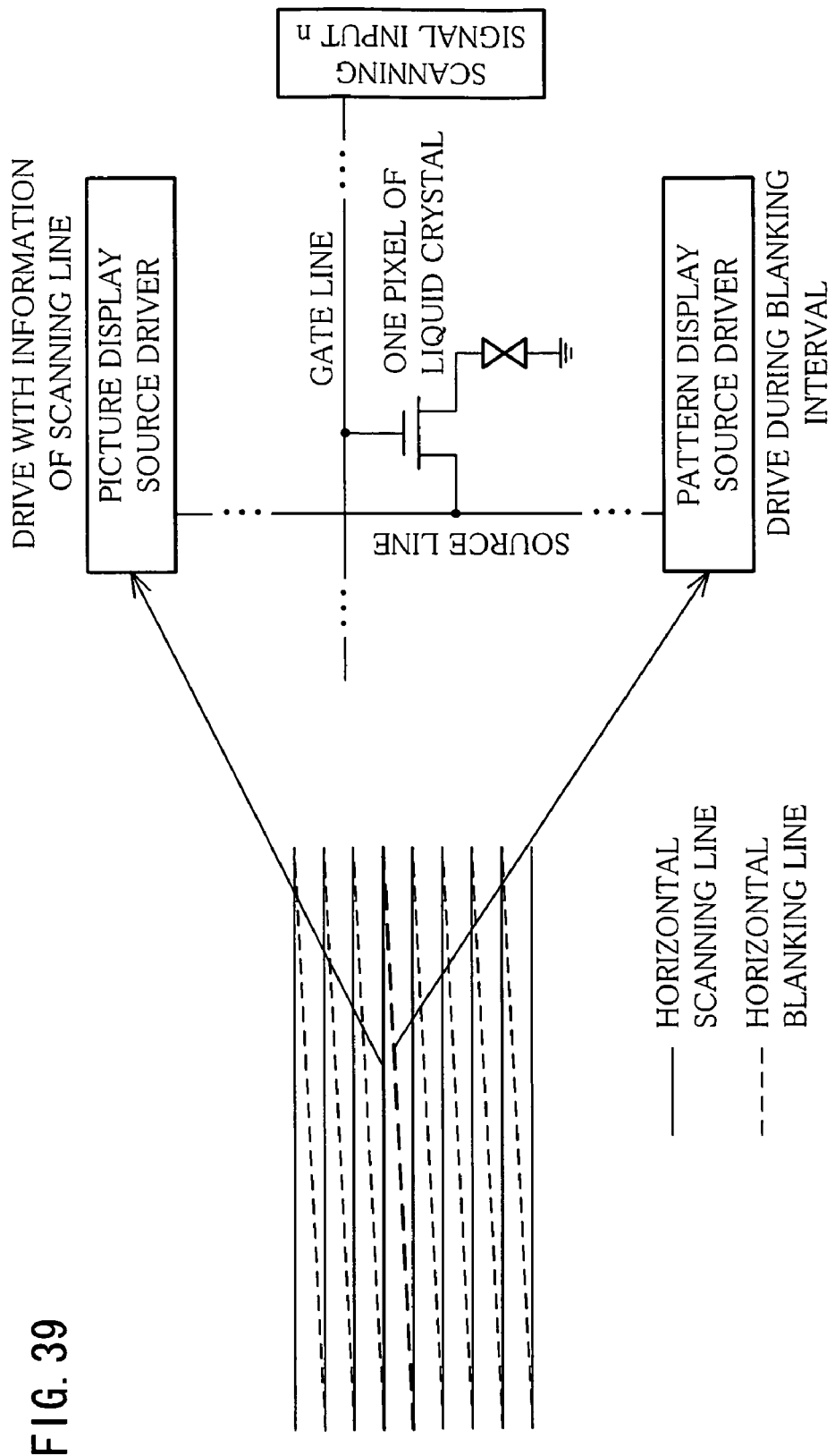
FIG. 39 is an explanatory view illustrating a drive circuit of a display panel in the information terminal illustrated in FIG. 18.

For example, as illustrated in FIG. 39, a source line is shared by pattern display and drawing display, and a drive signal for pattern display may be supplied during a blanking interval which is a period between completion of horizontal scanning of the drive signal of the video signal and the subsequent horizontal scanning.

Figure 40:
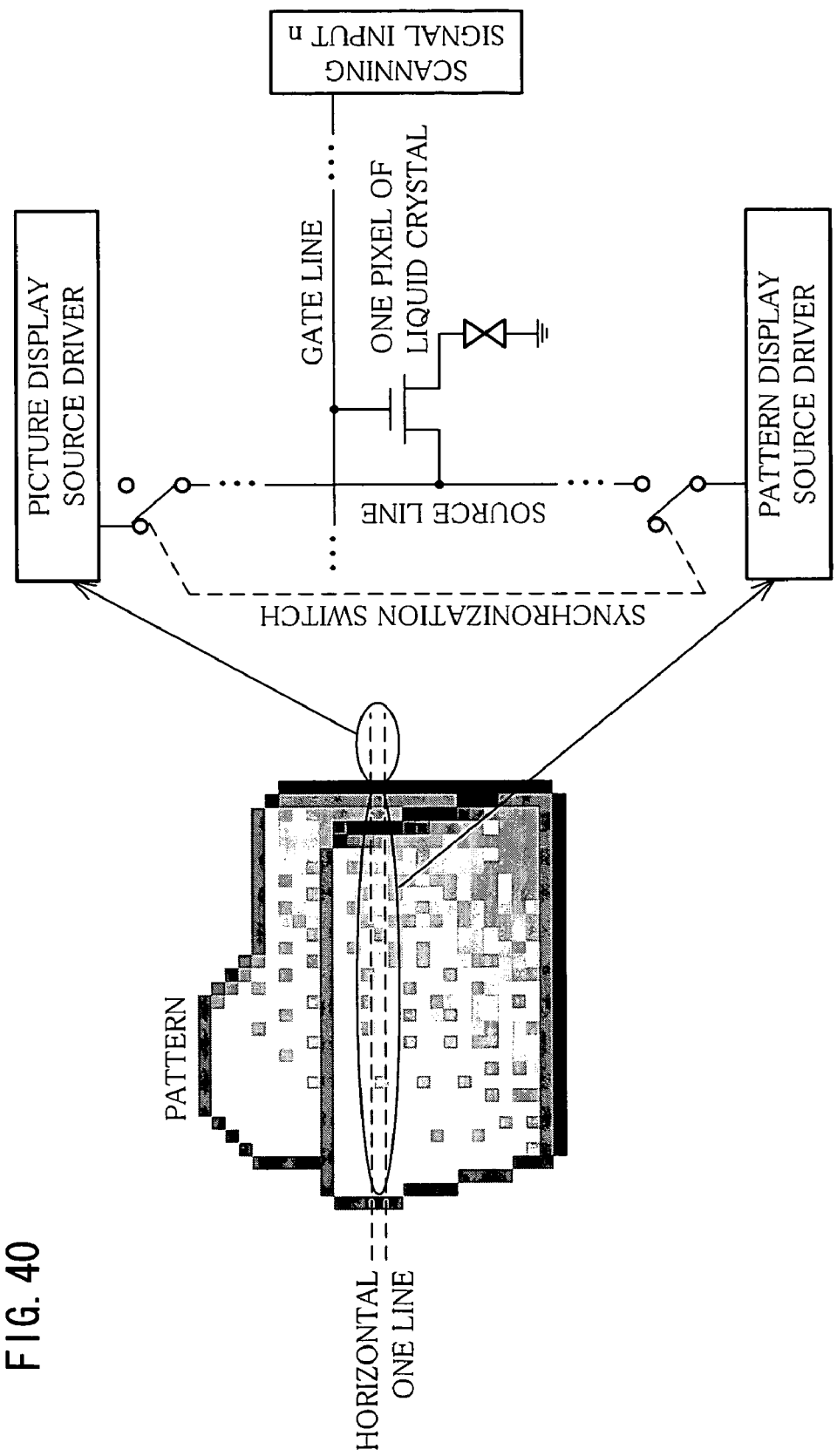
FIG. 40 is an explanatory view illustrating a drive circuit of a display panel in the information terminal illustrated in FIG. 18.

Further, as illustrated in FIG. 40, it may be arranged such that the source line is shared by pattern display and drawing display, and a synchronization switch is provided and switched under control of the pattern display section 52 so that the drive signal for pattern display is supplied to the source line only during a period in which a pattern exists.

Figure 41:
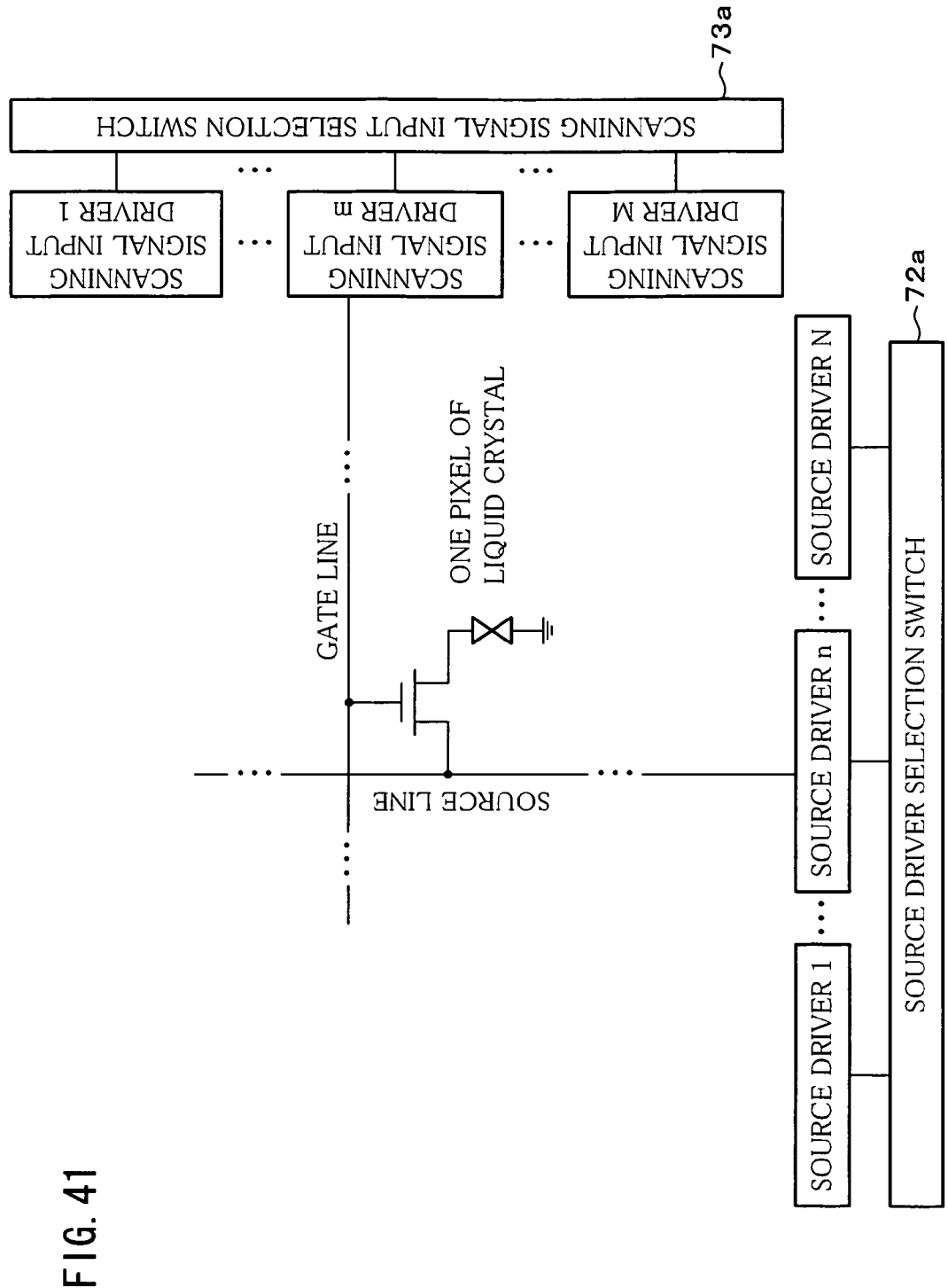
FIG. 41 is an explanatory view illustrating a drive circuit of a display panel in the information terminal illustrated in FIG. 18.

As illustrated in FIG. 41, the pattern display drive circuit 72 and the picture display drive circuit 74 may be comprised of multiple source drivers 1 through N divided by minimum positional specification units with respect to a display coordinate axis, and a source driver selection switch 72*a* which selects a necessary source driver n. Similarly, the scanning signal input circuit 73*a* may be comprised of multiple scanning signal input drivers 1 through M divided by minimum positional specification units with respect to a display coordinate axis, and a scanning signal input selection switch 73*a* which selects a necessary scanning signal input driver m. That is, each of the source driver n and the scanning signal input driver m has a minimum positional specification width to place a pattern or the like.

Then, under control of the pattern display section 52, displays are selectively performed by driving only necessary sections partitioned in picture display or pattern display. Further, to perform a driving operation equal to that of the picture display drive circuit 74, all of the source drivers 1-N and source lines provided therebetween, and scanning signal input drives 1-M and gate lines provided therebetween are driven.

This makes it possible to perform drawing by activating only divided drivers corresponding to the sections required for pattern drawing, to, for a small number of patterns, perform overwrite-drawing by activating a small number of divided drivers during a limited block time of frame returning period, and to, for a main picture, such as still picture, that can be stopped its input, perform drawing by drawing a small number of divided drivers during a limited block time. This facilitates simplification of drawing processing and low power consumption.

Note that, the present embodiment, which does not limit the scope of the present invention, is susceptible of various modifications within the scope of the present invention, and can be arranged as follows.

An information terminal according to the present invention is a display device and may include: a pattern storage section of a picture of a predetermined pattern; and a pattern display processing section which performs display of the pattern with a sufficiently short specifying code, compared to length of a pattern. The foregoing information terminal may be arranged such that the pattern display processing section can display a pattern at any position. The foregoing information terminal may be arranged such that the pattern stored in the pattern storage section may be character shape (font). The information terminal may be arranged such that the pattern stored in the pattern storage section is a drawing component used to perform notification of the status of a device that is a host and operation entry. The foregoing information terminal may include an automatic placement adjustment section which properly places the included pattern to be displayed at a proper position in accordance with a function of an applied device and its notification information. The foregoing information terminal may be arranged such that the automatic placement adjustment section can place similar information at a similar position so that the operator can intuitively know the notification information. The foregoing information terminal may be arranged such that the display panel is provided with an area that is reserved for placement adjustment, whereby the automatic placement adjustment section can perform placement adjustment using this reserved area at the time of placing similar information at a similar position.

Further, the information terminal may include a pseudo file system interface section which can perform either or both of the functions of the pattern display processing section and the automatic placement adjustment section in which the pattern specifying code is generated from program code information for calling a subroutine process and which is functioned and mounted as a circuit, by calling a software module file (library) from the device that is a host. Further, the foregoing information terminal may include a file information storage section and a pseudo file system interface section which can change its internal structure so that the device can be designed without changing information display software having been already realized using a software module.

Further, in the foregoing information terminal, the pattern, after being formed as a different signal input independently from any display information transmitted from other host, may be combined with the signal inside the display section. The foregoing information terminal may be arranged so as to include drivers divided by minimum positional specification units with respect to a display coordinate axis, and a driver switch which selects a necessary driver, wherein displays are selectively performed by driving only necessary sections partitioned in picture display or pattern display. The foregoing information terminal may have varying combinations or all of the pattern storage section, the pattern display processing section, and the automatic placement adjustment section, which are functioned and mounted as circuits, directly provided on a conductor or semiconductor thin film making up the display section. With this arrangement, in the case where the display device is served as a remote controller or the like, the display device can be an extremely thin card-type remote controller having a high-level interface function.

Finally, an object of the present invention can be achieved by: supplying a recording medium storing program codes (execution program, intermediate code program, or source program) of the data transmission program which realizes the foregoing functions so that it is readable by a computer, to the information terminal 1 and the host apparatus 100 (hereinafter they may be referred to as a data transmission system); and reading and executing the program codes stored on the storage medium using computers in the information terminal 1 and the host apparatus 100 (alternatively, CPU, MPU, or DSP (not shown)). In this case, the program codes themselves read out from the recording medium realize the foregoing functions, and the recording medium containing the program codes constitutes the present invention.

Specifically, the pseudo file system interface unit 3 included in the information terminal 1 is realized by executing a predetermined program stored in memory (not shown) of the information terminal 1 using a microprocessor or the like. The link setting section (not shown) included in the host apparatus 100 is realized by executing a predetermined program stored in the memory 102 of the host apparatus 100 using the processor 101 or the like.

A recording medium for supplying the program codes can be arranged such that it can be separated from the data transmission system. Further, the foregoing recording medium may be a medium held fixedly so that it is capable of supplying the program codes. In addition, the foregoing recording medium may be installed in the data transmission system so that the program codes recorded therein can be directly read out by the computer, or may be installed so that the program codes can be read out via a program reading device which is connected to the information terminal 1 as an external storage unit.

For example, as the foregoing recording medium, applicable are: a tape such as magnetic tape and a cassette tape; a disk including a magnetic disk such as floppy disk and hard disk and optical disk such as CD-ROM, MO, MD, DVD, and CD-R; a card such as IC card (including memory card) and optical card; and a semiconductor memory such as mask ROM, EPROM, EEPROM, and flash ROM.

Further, the program codes may be recorded so that the computer can read out them from the recording medium for direct execution, or may be recorded so that after the program codes are transferred from the recording medium to a program storage area of a main storage, the computer can read out them from the main storage for execution.

Further, it may be arranged such that the information terminal 1 and/or the host apparatus 100 can be connected to a communication network (including Internet, Intranet, and others) to supply the program codes via the communication network.

Note that, a program for reading out the program codes from the recording medium to store them in the main storage and a program for downloading the program codes via the communication network are stored in advance in the information terminal 1 and/or the host apparatus 100 so that they can be executed by the computer.

The foregoing functions are realized not only by executing the program codes read out by the computer, but also by partially or fully performing an actual operation using an OS or the like that activates on the computer.

The foregoing functions are also realized by, after the program codes read out from the recording medium are written in a memory which is provided in a function expansion board mounted in the computer or a function expansion unit connected to the computer, partially or fully performing an actual operation using a CPU or the like which is provided in the function expansion board or function expansion unit, in accordance with the instructions from the program codes.

Note that, a data transmitting method of the present invention may be a method including: in an information terminal including a storage device, an emulation process of causing a host apparatus to recognize the storage device as an external file system, the storage device storing therein a substitution code which is a program read out as a code of a subroutine called in a program of the host apparatus and returns to the program of the host apparatus in a normal end state after execution of the subroutine; in the host apparatus, a program execution process of executing a program; a substitution code acquisition process of, during execution of the program, reading out a code of a subroutine from the storage device in a subroutine code read request process; and in the information terminal, a subroutine identification process of identifying a subroutine called by the program of the host apparatus in accordance with a subroutine code read instruction from the host apparatus.

With the foregoing method, ① the information terminal causes the host apparatus to recognize the storage device of the information terminal as a file system. ② The host apparatus makes a read request to read out the code of the subroutine from the storage device of the information terminal. ③ The information terminal identifies a pattern specification in accordance with the subroutine read request from the host apparatus.

Thus, only by loading the code of the subroutine, the host apparatus can notify information that specifies a subroutine called by the host apparatus to the information terminal, without additional data transmission for notifying this information. For example, only by performing exactly the same reading operation as the operation of loading the code of the subroutine from a file system, which is provided in a conventional system, the host apparatus can notify information that specifies the subroutine called by the host apparatus to the information terminal. Then, the information terminal can perform various operations using this information.

Further, to emulate the storage device of the information terminal as a file system of the host apparatus, the host apparatus should be capable of communicating with the file system. That is, this eliminates the need for additional interface for data communications. This enables data transmission between devices realized by low-functionality hardware and software. Note that, even a low-functionality device usually has a function of reading out data from a file system of some kind to store program information and others. Of course, the foregoing data transmitting method can be applied to data transmission between a high-functionality device and a low-functionality device or data transmission between high-functionality devices.

Therefore, data transmission between devices becomes possible without development of a device driver for each device performing data transmission. This facilitates compatibility of hardware and software of the host apparatus. This software includes a software development tool, such as compiler. Further, operations can be distributed between devices by adding the above data transmission midway, so that it is possible to provide a higher-functionality system even with low-functionality hardware and software.

Note that, in the host apparatus, the substitution code, for example, only performs the operation of only transmitting coordinate data necessary for drawing to the information terminal. On the other hand, the operation originally planned by a subroutine is, for example, a button drawing processing itself of reading out a button drawing pattern of GUI from a memory by one dot in accordance with the description of this subroutine, directly transmitting one dot at a time to a display device, performing a proper pattern display, and fully completing the called drawing processing.

Further, a data transmitting method of the present invention may be a method wherein: the substitution code is a program for causing the host apparatus to execute a process of writing data of the host apparatus into the storage device of the information terminal, the data transmitting method further comprising: a data input process of, at the time of executing subroutine, the host apparatus writing data of the host apparatus into the storage device of the information terminal in accordance with the substitution code.

According to the foregoing method, in executing a subroutine, the host apparatus further writes data of the host apparatus into the storage device of the information terminal, in accordance with the loaded substitution code.

Therefore, it is possible to transmit data such as argument of a subroutine from the host apparatus to the information terminal.

Further, a data transmitting method of the present invention may be a method wherein: the substitution code is a program for causing the host apparatus to execute a process of reading out data stored in the storage device of the information terminal, the data transmitting method further comprising: a data output process of, at the time of executing a subroutine, the host apparatus reading out data stored in the storage device of the information terminal in accordance with the substitution code.

According to the foregoing method, in executing a subroutine, the host apparatus further reads out data stored in the storage device of the information terminal in accordance with the loaded substitution code.

Therefore, data, such as a result of the operation performed by subroutine identification, can be transmitted from the information terminal to the host apparatus.

Further, a data transmitting method of the present invention may be a method including: a substitution code generation process of the information terminal generating a substitution code containing data stored in the storage device and the program for causing the host apparatus to read out the data; and a second data output process of, at the time of executing a subroutine, the host apparatus reading out data contained in link data in accordance with the substitution code.

According to the foregoing method, in executing a subroutine, the host apparatus further reads out data embedded in the substitution code having been loaded, whereby data stored in the storage device of the information terminal can be acquired.

Therefore, data, such as a result of the operation performed by subroutine identification, can be transmitted from the information terminal to the host apparatus.

Further, a data transmitting method of the present invention may be a method wherein: the substitution code stored in the storage device is a shared code which is read out as a code of some subroutines or all subroutines called in the program of the host apparatus.

Further, according to the foregoing method, a common substitution code is used for some subroutines or all subroutines. For example, if a code read out as a substance of a subroutine is a process routine for only performing data write/read, it is possible to perform a code sharing and to arrange so that the same substitution code is read out for a plurality of subroutines.

This makes it possible to realize a smaller memory of a software module file (e.g. GUI library) stored in the information terminal.

Further, a data transmission program of the present invention is a computer program which causes computers included in the information terminal and the host apparatus to execute the foregoing processes.

According to the foregoing arrangement, the above data transmission is realized with computers included in a information terminal and a host apparatus, whereby data transmission between the information terminal and the host apparatus can be realized.

This enables data transmission between devices without developing a device driver dedicated for each device performing data transmission, which is the effect of the foregoing data transmitting method. Note that, the device driver is of descriptions of the way of operating the information terminal in order to operate the information terminal from the host apparatus. In the present invention, this is unified as the way of operating a file system.

Further, a computer-readable recording medium containing a data transmission program of the present invention is a computer-readable recording medium which contains the foregoing data transmission program.

According to the foregoing arrangement, with data transmission program read out from the recording medium, data transmission between the foregoing information terminal and the host apparatus can be realized.

Further, an information terminal of the present invention may include a storage device which stores therein a substitution code which is read out as a code of a subroutine called in a program that is executed by the host apparatus and returns to the program executed by the host apparatus in a normal end state after execution of the subroutine; emulation means which emulates a file system of the host apparatus; and subroutine identification means which identifies a subroutine called by the program of the host apparatus in accordance with a subroutine code read instruction from the host apparatus.

According to the foregoing arrangement, the information terminal can perform the foregoing data transmitting method with the host apparatus.

Therefore, data transmission between devices is possible without development of a device driver for each device performing data transmission. This facilitates compatibility of hardware and software of the host apparatus. This software includes a software development tool, such as compiler.

Further, an information terminal of the present invention may be an information terminal wherein: the subroutine identification means performs the identification in accordance with location information specifying a location of the subroutine in the storage device or a character string specifying the subroutine, transmitted as the subroutine code read instruction from the host apparatus.

According to the foregoing arrangement, the information terminal further acquires location information specifying a location of the subroutine in the storage device or a character string specifying the subroutine, as the subroutine code read instruction from the host apparatus. Then, the subroutine can be identified in accordance with this information.

Further, an information terminal of the present invention, wherein the substitution code is a program causing the host apparatus to execute a process of writing data of the host apparatus into the storage device of the information terminal when the host apparatus executes a subroutine, may further include: data input means which reads out data having been written by the host apparatus into the storage device of the information terminal, in accordance with the substitution code.

According to the foregoing method, in executing a subroutine, the host apparatus further reads out data written into the storage device of the information terminal in accordance with the loaded substitution code.

Therefore, it is possible to transmit data such as argument of a subroutine from the host apparatus to the information terminal.

Further, an information terminal of the present invention, wherein the program executed by the host apparatus is a program presenting graphic user interface for use in transmitting a state of the host apparatus or in controlling the host apparatus and is a program providing an instruction for drawing of a component making up a screen by calling a subroutine, may further include: display means which presents graphic user interface; pattern storage means which stores therein image data of components making up the graphic user interface; and pattern display processing means which extracts from the pattern storage means image data of a component corresponding to the subroutine identified by the subroutine identification means and generates a display signal for drawing in the display means.

According to the above arrangement, since the host apparatus provides the instruction for drawing of a component making up a screen by calling a subroutine, the information terminal can perform displays by identifying the subroutine to generate a display signal inside the information terminal. In addition, in the information terminal, drawing of a component can be performed simultaneously with, but completely independent from the processing of the host apparatus, thus enabling parallel operations and distribution of loads.

This eliminates the need for transmission of image data having a large amount of data from the host apparatus to the information terminal, so as to display the graphic user interface of the host apparatus on the information terminal. Further, the information terminal can adjust an actual drawing therein to acquire information which specifies a pattern to be drawn.

Thus, the foregoing data transmitting method is suitable for a data transmitting method when the host apparatus causes the information terminal to present the graphic user interface.

Further, an information terminal of the present invention may further include: pattern adjustment means which adjusts a shape and location of the component of the graphic user interface in accordance with a predetermined rule.

According to the foregoing arrangement, the information terminal can display the component of the graphic user interface with its shape and location changed from those specified by the host apparatus. Note that, as to a rule for change, it is possible to carry out a change to an arrangement that the user adopts at a high frequency, for example.

Further, an information terminal of the present invention may further include: position sensing means which senses a position where a user points in the graphic user interface; and positional information recording means which writes positional information sensed by the position sensing means, wherein: the program executed by the host apparatus is a program providing an instruction for acquisition of the point where the user points by calling a subroutine, and the substitution code is a program which causes the host apparatus to execute a process of, when the host apparatus executes a subroutine, reading out the positional information stored by the positional information recording means in the storage device of the information terminal.

According to the foregoing arrangement, the information terminal further senses a position where the user points in the graphic user interface and writes the position as positional information into the storage device. Then, in executing a subroutine, the host apparatus reads out the positional information stored in the storage device of the information terminal in accordance with the loaded substitution code.

Therefore, the position where the user points in the graphic user interface of the information terminal can be transmitted from the information terminal to the host apparatus.

Further, an information terminal of the present invention may further include: position sensing means which senses a position where a user points in the graphic user interface; reverse converting means which performs a change that is a reverse of a change made by the pattern adjustment means, with respect to positional information sensed by the position sensing means; and positional information recording means which writes the position information converted by the reverse converting means into the storage device, wherein: the program executed by the host apparatus provides an instruction for acquisition of the point where the user points by calling a subroutine, and the substitution code is a program which causes the host apparatus to execute a process of, when the host apparatus executes a subroutine, reading out the positional information stored by the positional information recording means in the storage device of the information terminal.

According to the foregoing arrangement, the information terminal further senses a position where the user points in the graphic user interface and writes the position as positional information into the storage device. At this moment, the positional information is reverse-converted from a display with pattern placement changed by the information terminal to a display specified by the host apparatus. Then, in executing a subroutine, the host apparatus reads out the positional information stored in the storage device of the information terminal in accordance with the loaded substitution code.

Therefore, even when the graphic user interface is displayed with the pattern placement changed in the information terminal, the position where the user points in the graphic user interface of the information terminal can be transmitted from the information terminal to the host apparatus.

Further, in an information terminal of the present invention, the emulation means may be provided so that processing can be changed depending on types of an operating system (OS) of the host apparatus and/or types of a standard of an interface (that is, a standard of an interface of an adopted storage device) connecting between the host apparatus and the information terminal.

According to the foregoing arrangement, the information terminal can further perform data transmission with a plurality of host apparatuses having a mutually different OS or a mutually different standard of an interface connected.

Further, in an information terminal of the present invention, the storage device may store therein the substitution code so as to be shared and read out as a code of some subroutines or all subroutines called in the program of the host apparatus.

According to the foregoing arrangement, a common substitution code is used for some subroutines or all subroutines. For example, if a code read out as a substance of a subroutine is a process routine for only performing data write/read, it is possible to perform a code sharing and to arrange so that the same substitution code is read out for a plurality of subroutines.

This makes it possible to realize a smaller memory of a software module file (e.g. GUI library) stored in the information terminal.

Further, a host apparatus of the present invention is a host apparatus which performs data transmission with the foregoing information terminal, and may include: program execution means which executes a program; and substitution code acquisition means which, during execution of the program, reads out a code of a subroutine from the storage device of the information terminal in a subroutine code read request process.

According to the foregoing arrangement, the host apparatus can perform the foregoing data transmitting method with the information terminal.

Therefore, data transmission between devices is possible without development of a device driver for each device performing data transmission. This facilitates compatibility of hardware and software of the host apparatus. This software includes a software development tool, such as compiler.

Further, a host apparatus of the present invention may include link setting means which sets a storage location for the code of the subroutine in the storage device of the information terminal.

According to the foregoing arrangement, the host apparatus can further change a storage location for the code of the subroutine, so that it is possible to select a device at the other end of data transmission by changing the information on link setting.

Further, a host apparatus of the present invention may further include: link setting means which sets the storage location for the code of the subroutine so as to be selectable between an internal file system of the host apparatus and an external file system.

According to the foregoing arrangement, it is possible to select a destination where the code of the subroutine is read out by changing the link information.

Therefore, it is possible to select a device at the other end of data transmission by changing a link destination to change a destination where the code of the subroutine is read out. Therefore, the host apparatus can perform data transmission with a device selected as appropriate from among a plurality of devices.

Further, a host apparatus of the present invention may be arranged such that the link setting means can select the storage location for the code of the subroutine between the internal file system of the host apparatus and the storage device of the information terminal.

According to the foregoing arrangement, the host apparatus can further read out the code of the subroutine from the file system inside the host apparatus and execute the program by itself. Further, the host apparatus can execute the same program, without additionally making a change to the program, just by selecting the information terminal as a link destination, while collaborating with the information terminal.

For example, depending upon the link destination, execution of the subroutine is selectable between drawing of the GUI only using software-like means stored in the host apparatus and drawing of the GUI using the substitution code of the information terminal and drawing means which is provided independently from the information terminal. Therefore, a GUI program presented in the information terminal can be tested by the host apparatus alone. Further, for example, upon receipt of information from the information terminal that the host apparatus starts operating, the link information setting section can set a link destination to the storage device of the information terminal The present invention is not limited to the aforementioned embodiments and is susceptible of various changes within the scope of the accompanying claims. An embodiment obtained by suitable combinations of technical means disclosed in the different embodiments also fall within the technical scope of the present invention.

Specific embodiments or examples implemented in the description of the embodiments only show technical features of the present invention and are not intended to limit the scope of the invention. Variations can be effected within the spirit of the present invention and the scope of the following claims.

INDUSTRIAL APPLICABILITY

A display device according to the present invention can be used in an electronic device such as information terminal including a display which shows an image of a pattern specified by an external device. As one example, a display device of the present invention is suitably used as a remote controller that the user operates while changing a GUI for each device to control a plurality of devices, especially, as a remote controller for a device such as television set and facsimile machine.

The invention claimed is:

1. A display device including a display section, and obtaining, from a device as a host, a pattern specifying code that specifies an image of a pattern and a display position of the image, so as to cause the display section to display the image in accordance with the pattern specifying code, said display device comprising:

a pattern storage section which stores therein an image of a pattern with which a status of the device as the host is notified to a user, and an image of a pattern through which the user performs entry or operation;

a pattern specifying code input section which externally receives the pattern specifying code in a form of electrical signal from the device;

a pattern display processing section which retrieves the image of the pattern specified by the pattern specifying code from the pattern storage section and then causes the display section to display the image thereon;

an automatic placement adjustment section which holds the display position specified by the pattern specifying code, and changes a display position of an image of a second pattern from the held display position in accordance with a movement of an image of a first pattern, so as to perform placement adjustment with respect to the image of the pattern; and an emulation section configured to emulate a file system of the device as the host so as to deceive the device as the host into believing that a storage device is the device as the host's storage device, the storage device storing therein a substitution code which is a program read out as a code of a subroutine called in a drawing program of the device as the host for drawing the image of the pattern and returns to the drawing program of the device as the host in a normal end state after execution of the subroutine.

2. The display device according to claim 1, wherein:
the pattern storage section stores therein a character font.

3. The display device according to claim 2, wherein:
the pattern display processing section causes the image of the pattern specified by the pattern specifying code to be displayed at a position specified by the pattern specifying code.

4. The display device according to claim 1, wherein:
the pattern specifying code specifies not only the display position but also a display size of the image of the pattern; and
the automatic placement adjustment section which holds the display position and the display size that are specified by the pattern specifying code, and changes a display position and a display size of an image of a second pattern from the held display position and the held display size in accordance with a movement of an image of a first patter, so as to perform placement adjustment with respect to the image of the pattern.

5. The display device according to claim 1, wherein:
a target position to be displayed is set for an image of a pattern that is stored in the pattern storage section and is an object of automatic placement adjustment; and
the automatic placement adjustment section performs placement adjustment so that the image of the pattern that is the object of automatic placement adjustment is displayed at the target position, and performs placement adjustment so that an image that is not the object of automatic placement adjustment is displayed in a space where no image that is the object of automatic placement adjustment is placed.

6. The display device according to claim 5, wherein:
a physically displayable area in the display section is greater than a display area that the pattern specifying code is designed for, and
the automatic placement adjustment section adjusts a display position for the image of the pattern, which is an object of automatic adjustment, within a whole of the physically displayable area in the display section.

7. The display device according to claim 1, wherein:
a relationship of location is specified among a plurality of images; and
the automatic placement adjustment section performs placement adjustment so that the plurality of images between which the relationship of location is specified are displayed in the specified relationship of location.

8. The display device according to claim 1, comprising:
a video signal input section which externally receives a video signal,
wherein:
by independently driving the display section with the video signal received externally and an image signal of the pattern specified by the pattern specifying code, an image displayed in accordance with the video signal received externally by the video signal input section and the image of the pattern specified by the pattern specifying code are superimposed.

9. The display device according to claim 8, wherein:
the display area in the display section is divided into a plurality of sections, and of the plurality of divided sections, at least one section required to display the image of the pattern specified by the pattern specifying code is driven, so as to perform the superimposition.

10. The display device according to claim 1, wherein:
at least one of the pattern storage section, the pattern display processing section, and the automatic placement adjustment section may be provided on a conductor or semiconductor thin film which is a component of the display section.

11. An electronic device including the display device according to claim 10.

12. An electronic device including the display device according to claim 1.

13. The display device according to claim 1, further comprising:
a video signal input section which externally receives a video signal,
wherein:
by independently driving the display section with the video signal received externally and an image signal of the pattern specified by the pattern specifying code, an image displayed in accordance with the video signal received externally by the video signal input section and the image of the pattern specified by the pattern specifying code are superimposed.

14. The display device according to claim 13, wherein:
the display area in the display section is divided into a plurality of sections, and of the plurality of divided sections, at least one section required to display the image of the pattern specified by the pattern specifying code is driven, so as to perform the superimposition.

15. The display device according to claim 14, wherein:
at least one of the pattern storage section, the pattern display processing section, and the automatic placement adjustment section may be provided on a conductor or semiconductor thin film which is a component of the display section.

16. An electronic device including the display device according to claim 14.

17. The display device according to claim 13, wherein:
at least one of the pattern storage section, the pattern display processing section, and the automatic placement adjustment section may be provided on a conductor or semiconductor thin film which is a component of the display section.

18. An electronic device including the display device according to claim 17.

19. An electronic device including the display device according to claim 13.

20. The display device according to claim 1, wherein:
the pattern specifying code input section receives respective pattern specifying codes from a plurality of types of devices; and
the automatic placement adjustment section performs automatic placement adjustment with respect to images of an identical kind, regardless of the types of the devices so that the images are displayed in the display section at an identical position.

21. A data transmitting method comprising:
in an information terminal including a display section, and obtaining, from a host apparatus, a pattern specifying code that specifies an image of a pattern and a display position of the image, so as to cause the display section to display the image in accordance with the pattern specifying code,
the information terminal further including:
a pattern storage section which stores therein an image of a pattern with which a status of the host apparatus is notified to a user, and an image of a pattern through which the user performs entry or operation;
a pattern specifying code input section which externally receives the pattern specifying code in a form of electric signal from the host apparatus;
a pattern display processing section which retrieves the image of the pattern specified by the pattern specifying code from the pattern storage section and then causes the display section to display the image thereon;
pattern adjustment means which holds the display position specified by the pattern specifying code, and changes a display position of an image of a second pattern from the held display position in accordance with a movement of an image of a first pattern, so as to perform placement adjustment with respect to the image of the pattern; and
a storage device,
an emulation process of emulating a file system of a host apparatus so as to deceive the host apparatus into believing that the storage device is the host apparatus's storage device, the storage device storing therein a substitution code which is a program read out as a code of a subroutine called in a drawing program of the host apparatus for drawing the image of the pattern and returns to the drawing program of the host apparatus in a normal end state after execution of the subroutine;
in the host apparatus,
a program execution process of executing the drawing program;
a substitution code acquisition process of, during execution of the drawing program, reading out a code of a subroutine from the storage device in a subroutine code read request process; and
in the information terminal,
a subroutine identification process of identifying a subroutine called by the drawing program of the host apparatus in accordance with a subroutine code read instruction from the host apparatus.

22. The data transmitting method according to claim 21, wherein:
the substitution code is a program for causing the host apparatus to execute a process of writing data of the host apparatus into the storage device of the information terminal, the data transmitting method further comprising:
a data input process of, at the time of executing subroutine, the host apparatus writing data of the host apparatus into the storage device of the information terminal in accordance with the substitution code.

23. The data transmitting method according to claim 22, wherein:
the substitution code stored in the storage device is a shared code which is read out as a code of some subroutines or all subroutines called in the program of the host apparatus.

24. A computer-readable recording medium storing a data transmission program for executing the data transmitting method according to claim 22,
the data transmission program being a program for causing computers included in the information terminal and the host apparatus to execute the foregoing processes.

25. The data transmitting method according to claim 21, wherein:
the substitution code is a program for causing the host apparatus to execute a process of reading out data stored in the storage device of the information terminal,
the data transmitting method further comprising:
a data output process of, at the time of executing a subroutine, the host apparatus reading out data stored in the storage device of the information terminal in accordance with the substitution code.

26. The data transmitting method according to claim 25, wherein:
the substitution code stored in the storage device is a shared code which is read out as a code of some subroutines or all subroutines called in the program of the host apparatus.

27. A computer-readable recording medium storing a data transmission program for executing the data transmitting method according to claim 25,
the data transmission program being a program for causing computers included in the information terminal and the host apparatus to execute the foregoing processes.

28. The data transmitting method according to claim 21, further comprising:
a substitution code generation process of the information terminal generating a substitution code containing data stored in the storage device and the program for causing the host apparatus to read out the data; and
a second data output process of, at the time of executing a subroutine, the host apparatus reading out data contained in link data in accordance with the substitution code.

29. The data transmitting method according to claim 28, wherein:
the substitution code stored in the storage device is a shared code which is read out as a code of some subroutines or all subroutines called in the program of the host apparatus.

30. A computer-readable recording medium storing a data transmission program for executing the data transmitting method according to claim 28,
the data transmission program being a program for causing computers included in the information terminal and the host apparatus to execute the foregoing processes.

31. The data transmitting method according to claim 21, wherein:
the substitution code stored in the storage device is a shared code which is read out as a code of some subroutines or all subroutines called in the drawing program of the host apparatus.

32. A computer-readable recording medium storing a data transmission program for executing the data transmitting method according to claim 31,
the data transmission program being a program for causing computers included in the information terminal and the host apparatus to execute the foregoing processes.

33. A computer-readable recording medium storing a data transmission program for executing the data transmitting method according to claim 21,
the data transmission program being a program for causing computers included in the information terminal and the host apparatus to execute the foregoing processes.

34. An information terminal comprising:
a storage device which stores therein a substitution code which is read out as a code of a subroutine called in a program that is executed by the host apparatus and returns to the program executed by the host apparatus in a normal end state after execution of the subroutine;
emulation means which emulates a file system of the host apparatus and deceives the host apparatus into believing that the storage device is the host apparatus's storage device; and
subroutine identification means which identifies a subroutine called by the program of the host apparatus in accordance with a subroutine code read instruction from the host apparatus, wherein
the program executed by the host apparatus is a program presenting graphic user interface for use in transmitting a state of the host apparatus or in controlling the host apparatus and is a program providing an instruction for drawing of a component making up a screen by calling a subroutine,
the information terminal further comprising
display means which presents graphic user interface;
pattern storage means which stores therein image data of components making up the graphic user interface:
pattern display processing means which extracts from the pattern storage means image data of a component corresponding to the subroutine identified by the subroutine identification means and generates a display signal for drawing in the display means; and
pattern adjustment means which holds the display position specified by the pattern specifying code, and changes a display position of an image of a second pattern from the held display position in accordance with a movement of an image of a first pattern, so as to perform placement adjustment with respect to the image of the pattern.

35. The information terminal according to claim 34, wherein: the subroutine identification means performs the identification in accordance with location information specifying a location of the subroutine in the storage device or a character string specifying the subroutine, transmitted as the subroutine code read instruction from the host apparatus.

36. The information terminal according to claim 35, wherein:
the substitution code is a program causing the host apparatus to execute a process of writing data of the host apparatus into the storage device of the information terminal when the host apparatus executes a subroutine,
the information terminal further comprising:
data input means which reads out data having been written by the host apparatus into the storage device of the information terminal, in accordance with the substitution code.

37. The information terminal according to claim 35, wherein:
the program executed by the host apparatus is a program presenting graphic user interface for use in transmitting a state of the host apparatus or in controlling the host apparatus and is a program providing an instruction for drawing of a component making up a screen by calling a subroutine, the information terminal further comprising:
display means which presents graphic user interface;
pattern storage means which stores therein image data of components making up the graphic user interface; and
pattern display processing means which extracts from the pattern storage means image data of a component corresponding to the subroutine identified by the subroutine identification means and generates a display signal for drawing in the display means.

38. The information terminal according to claim 34, wherein:
the substitution code is a program causing the host apparatus to execute a process of writing data of the host apparatus into the storage device of the information terminal when the host apparatus executes a subroutine,
the information terminal further comprising:
data input means which reads out data having been written by the host apparatus into the storage device of the information terminal, in accordance with the substitution code.

39. The information terminal according to claim 38, wherein:
the program executed by the host apparatus is a program presenting graphic user interface for use in transmitting a state of the host apparatus or in controlling the host apparatus and is a program providing an instruction for drawing of a component making up a screen by calling a subroutine,
the information terminal further comprising:
display means which presents graphic user interface; pattern storage means which stores therein image data of components making up the graphic user interface; and
pattern display processing means which extracts from the pattern storage means image data of a component corresponding to the subroutine identified by the subroutine identification means and generates a display signal for drawing in the display means.

40. The information terminal according to claim 34, further comprising:
position sensing means which senses a position where a user points in the graphic user interface; and
positional information recording means which writes positional information sensed by the position sensing means,
wherein:
the program executed by the host apparatus is a program providing an instruction for acquisition of the point where the user points by calling a subroutine, and
the substitution code is a program which causes the host apparatus to execute a process of, when the host apparatus executes a subroutine, reading out the positional information stored by the positional information recording means in the storage device of the information terminal.

41. The information terminal according to claim 34, further comprising:
position sensing means which senses a position where a user points in the graphic user interface; and
positional information recording means which writes positional information sensed by the position sensing means,
wherein:
the program executed by the host apparatus is a program providing an instruction for acquisition of the point where the user points by calling a subroutine, and the substitution code is a program which causes the host apparatus to execute a process of, when the host apparatus executes a subroutine, reading out the positional information stored by the positional information recording means in the storage device of the information terminal.

42. The information terminal according to claim 34, further comprising:
position sensing means which senses a position where a user points in the graphic user interface;
reverse converting means which performs a change that is a reverse of a change made by the pattern adjustment means, with respect to positional information sensed by the position sensing means; and
positional information recording means which writes the position information converted by the reverse converting means into the storage device,
wherein:
the program executed by the host apparatus provides an instruction for acquisition of the point where the user points by calling a subroutine, and
the substitution code is a program which causes the host apparatus to execute a process of, when the host apparatus executes a subroutine, reading out the positional information stored by the positional information recording means in the storage device of the information terminal.

43. The information terminal according to claim 34, wherein:
the emulation means is provided so that processing can be changed depending on types of an operating system of the host apparatus and/or types of a standard of an interface connecting between the host apparatus and the information terminal.

44. The information terminal according to claim 34, wherein:
the storage device stores therein the substitution code so as to be shared and read out as a code of some subroutines or all subroutines called in the program of the host apparatus.

45. A host apparatus which performs data transmission with the information terminal according to claim 34,
the host apparatus comprising:
program execution means which executes a program; and
substitution code acquisition means which, during execution of the program, reads out a code of a subroutine from the storage device of the information terminal in a subroutine code read request process.

46. The host apparatus according to claim 45, further comprising:
link setting means which sets a storage location for the code of the subroutine in the storage device of the information terminal.

47. The host apparatus according to claim 45, further comprising:
link setting means which sets the storage location for the code of the subroutine so as to be selectable between an internal file system of the host apparatus and an external file system.

48. The host apparatus according to claim 47, wherein:
the link setting means can select the storage location for the code of the subroutine between the internal file system of the host apparatus and the storage device of the information terminal.

* * * * *